United States Patent [19]

Murayama et al.

[11] Patent Number: 4,903,067

[45] Date of Patent: Feb. 20, 1990

[54] MULTIIMAGE FORMING APPARATUS

[75] Inventors: Yasushi Murayama; Osamu Hoshino, both of Tokyo; Kazuyoshi Chiku, Yokohama; Yukio Sato, Chigasaki; Yoichi Kubota, Kawasaki; Ken Miyagi; Yoshihiko Hirose, both of Yokohama; Kunihiko Matsuzawa; Hiroyuki Miyake, both of Kawasaki; Tomohiro Aoki, Yokohama; Takashi Uchida, Yokohama; Kazunori Kanekura, Yokohama, all of Japan

[73] Assignee: Canon Kabushiki Kaisha, Tokyo, Japan

[21] Appl. No.: 187,078

[22] Filed: Apr. 27, 1988

[30] Foreign Application Priority Data

Apr. 28, 1987 [JP] Japan .................................. 62-107011
Jun. 30, 1987 [JP] Japan .................................. 62-161273
Nov. 30, 1987 [JP] Japan .................................. 62-300006
Nov. 30, 1987 [JP] Japan .................................. 62-300008

[51] Int. Cl.$^4$ ............................................. G03G 15/00
[52] U.S. Cl. ................................... 346/160; 355/326; 355/271; 346/157
[58] Field of Search ................. 355/4, 3 TR; 346/157, 346/160; 358/75

[56] References Cited

U.S. PATENT DOCUMENTS

| | | | |
|---|---|---|---|
| 3,472,587 | 10/1969 | Liguori | 353/35 |
| 3,801,197 | 4/1974 | Akiyama | 355/4 |
| 4,132,401 | 1/1979 | Gauronski | 271/245 |
| 4,239,370 | 12/1980 | Kurita | 355/4 |
| 4,241,990 | 12/1980 | Fisli | 355/11 |
| 4,401,024 | 8/1983 | Frentress | 346/157 X |
| 4,531,828 | 7/1985 | Hoshino | 355/4 X |
| 4,558,356 | 12/1985 | Toda et al. | 358/75 |
| 4,569,584 | 2/1986 | St. John et al. | 346/157 X |
| 4,660,077 | 4/1987 | Kawamura | 358/75 |
| 4,662,739 | 5/1987 | Sakai et al. | 355/4 X |
| 4,690,542 | 9/1987 | Furuta et al. | 355/4 |
| 4,788,574 | 11/1988 | Matsumoto et al. | 355/4 |

FOREIGN PATENT DOCUMENTS 192119 8/1986 European Pat. Off. .
1911775 10/1970 Fed. Rep. of Germany .

Primary Examiner—R. L. Moses
Attorney, Agent, or Firm—Fitzpatrick Cella Harper & Scinto

[57] ABSTRACT

There is provided a multiimage forming apparatus for forming image data onto photo sensitive drums by an electrophotographic system. This apparatus comprises: an image forming circuit to form different images onto the photo sensitive drums; a transfer device to transfer the images on the drums onto the same transfer paper; a conveying belt to convey the transfer paper; a control circuit to control the image forming circuit so as to form registration marks to match the positions of the images onto the drums; CCD detectors to detect the recording positions of the marks; and a correcting circuit to correct at least two of the positional direction in the conveying direction of the belt, the positional deviation in the direction perpendicular to the belt conveying direction, the magnification of the image, and the inclination of the image on the basis of the detection outputs of the detectors. With this apparatus, the positional deviations of the images which occur during the image formation can be accurately corrected, so that the images can be accurately formed on the transfer paper by reading and matching the position matching registration marks.

59 Claims, 40 Drawing Sheets

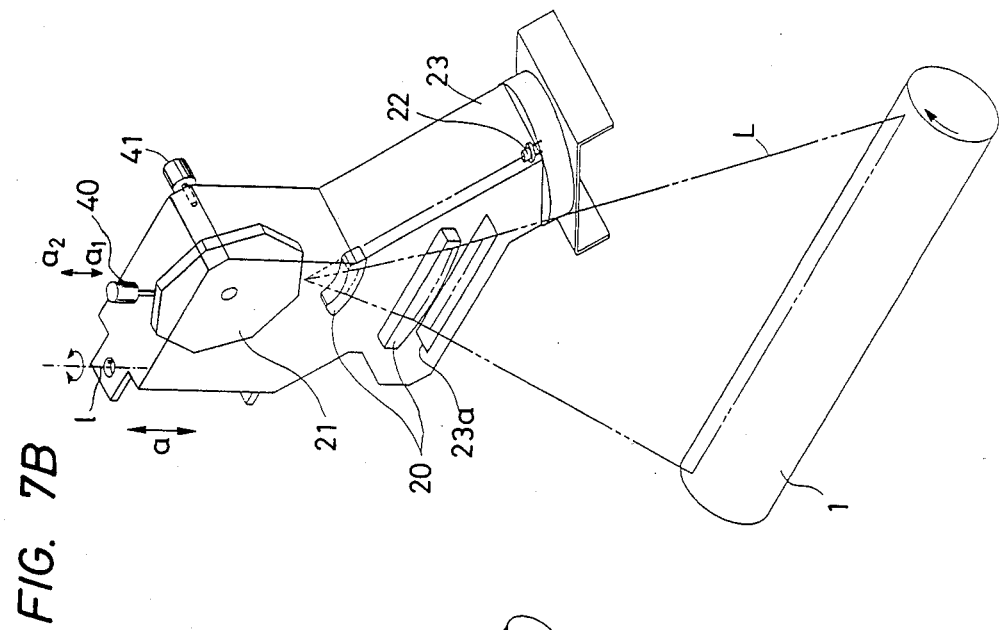
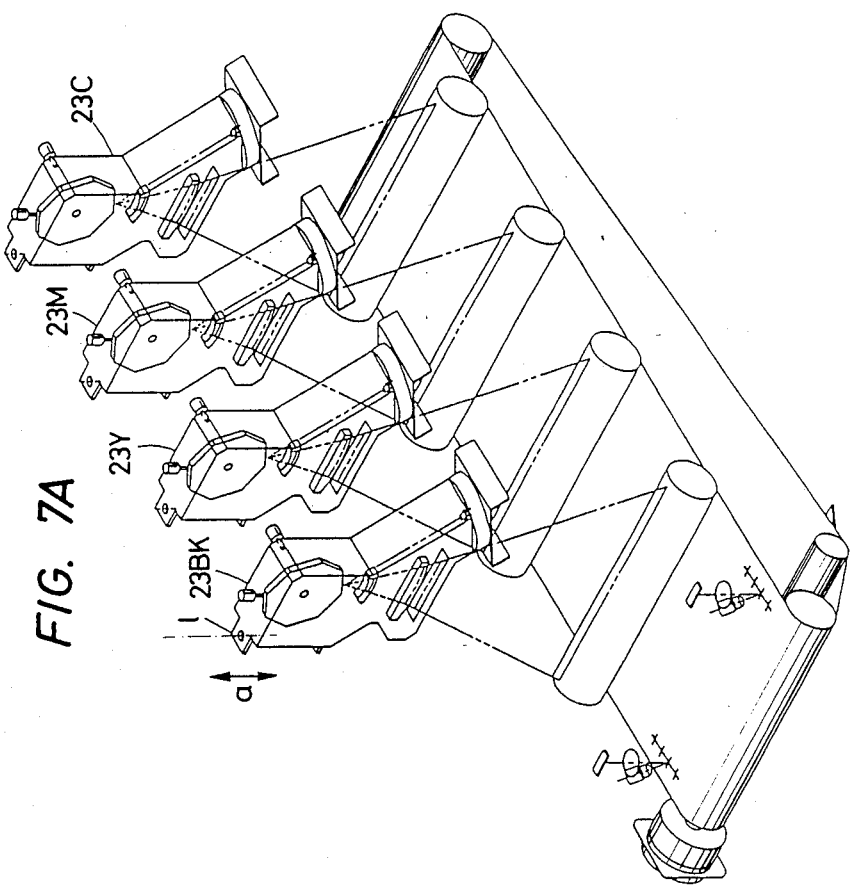

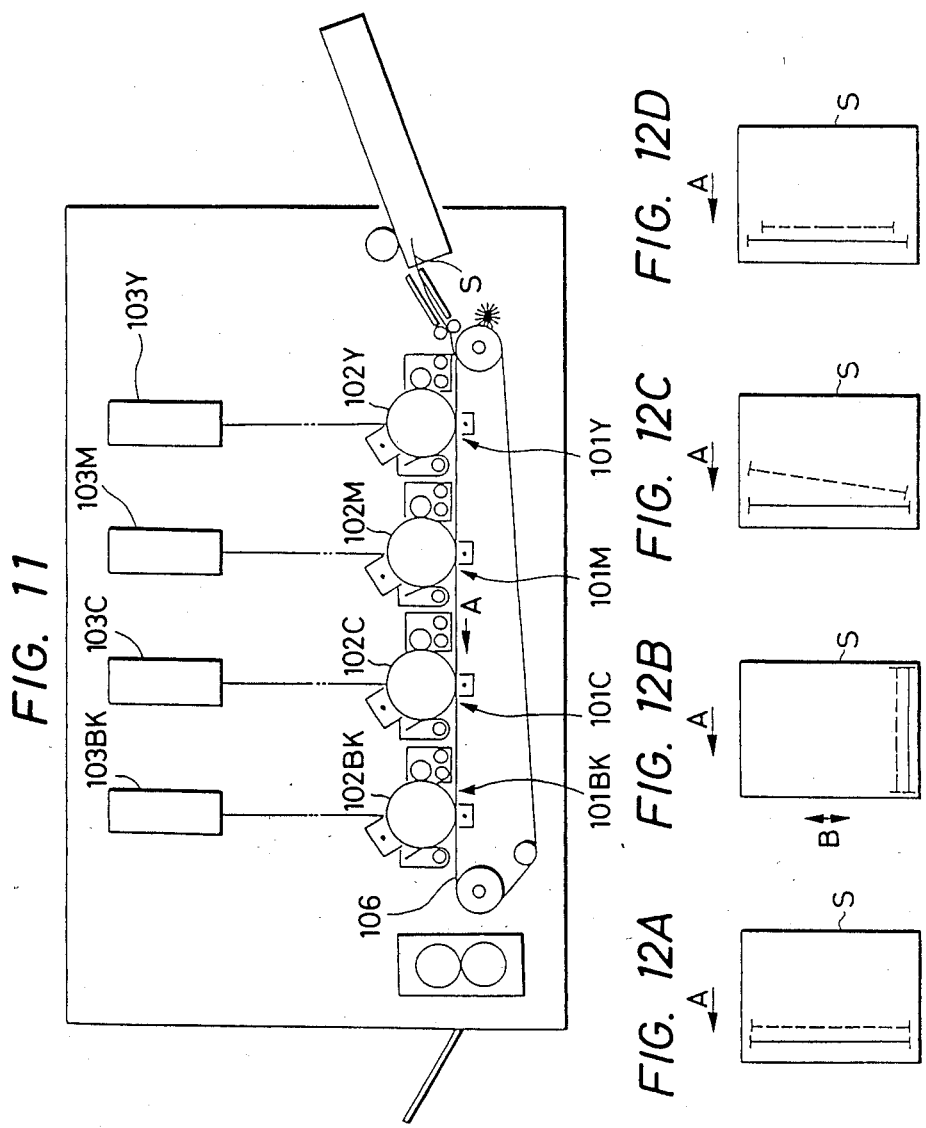

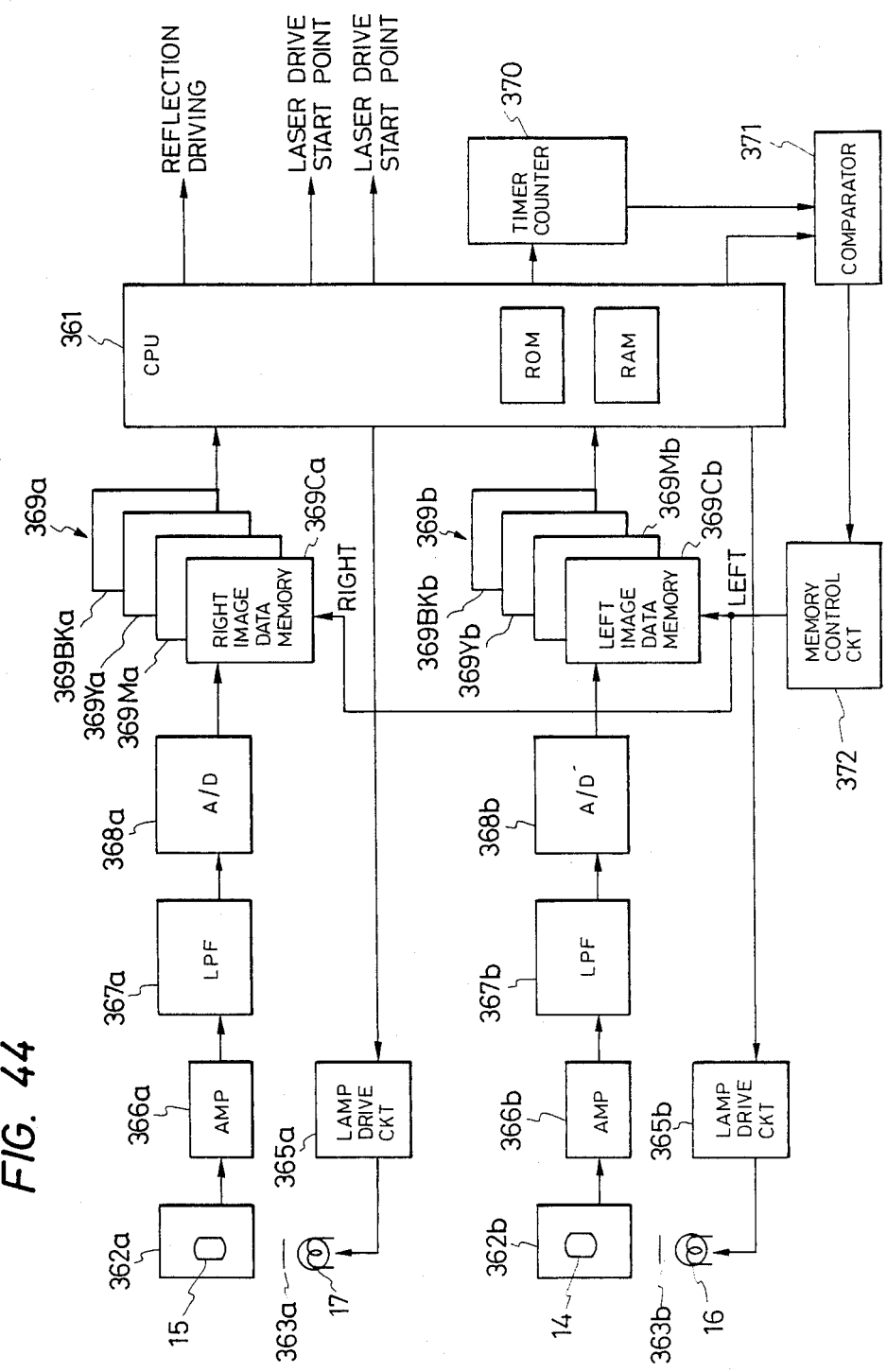

MULTIIMAGE FORMING APPARATUS

BACKGROUND OF THE INVENTION

1. Field of the Invention

The present invention relates to an image forming apparatus for forming image information onto, e.g., a transfer device by using, e.g., an electrophotographic system or the like.

2. Related Background Art

The applicant of the present invention has proposed a number of color image forming apparatuses for obtaining a full color image by arranging a plurality of image holding devices (photo sensitive drums or the like) in parallel {Japanese Unexamined Patent Publication (Kokai) No. 58-23074 and Japanese Unexamined Patent Publication (Kokai) No. 58-95361 (corresponding to U.S. Pat. No. 4,591,903), Japanese Unexamined Patent Publication (Kokai) No. 58-95362, Japanese Unexamined Patent Publication (Kokai) No. 58-154856, Japanese Unexamined Patent Publication (Kokai) No. 58-207021, and Japanese Unexamined Patent Publication (Kokai) No. 59-31976 (corresponding to U.S. patent application No. 521,832 applied on Aug. 10, 1983), Japanese Unexamined Patent Publication (Kokai) No. 59-46659, Japanese Unexamined Patent Publication (Kokai) No. 59-50460, Japanese Unexamined Patent Publication (Kokai) No. 59-42879, etc.}.

In the image forming apparatus of this type, an overlapping aberration (chromatic aberration) among respective colors at the time of the multitransfer becomes an extremely large problem.

To solve this problem, the applicant of the present invention has proposed methods for improving the chromatic aberration by a mechanical structure {Japanese Unexamined Patent Publication (Kokai) No. 59-155870, Japanese Unexamined Patent Publication (Kokai) No. 59-155869, Japanese Unexamined Patent Publication (Kokai) No. 59-155871, Japanese Unexamined Patent Publication (Kokai) No. 59-204069, Japanese Unexamined Patent Publication (Kokai) No. 59-155870, Japanese Unexamined Patent Publication (Kokai) No. 59-168467, and Japanese Unexamined Patent Publication (Kokai) No. 59-182139 (corresponding to U.S. Pat. No. 4,531,828), and Japanese Utility Model Application No. 62-12253 filed on Jan. 30, 1987}.

The chromatic aberration was fairly improved by these methods proposed. However, a problem still remains with regard to a point that the mechanical structure is stably moved within a range from 0.15 mm to 0.1 mm as an allowable difference of the chromatic aberration.

For example, finer slight unstabilities such as stability in running of a belt, reproducibility of attachment/detachment of photo sensitive drums, and instabilities of the horizontal and vertical sinks in the case of an LBP (laser beam printer) newly appear as problems as the other technical elements are completed. On the other hand, with respect to the relations among the main unit, optical system, photo sensitive drums, and the like which have been once adjusted when the main unit was installed, if the shape of floor is not the same plane, a distortion occurs in the main unit due to, e.g., the movement of the main unit to another location or the like. In such a case, the very complicated and difficult adjustment must be again performed. On the other hand, the misregistration which is caused by the thermal expansion based on a change in room temperature of the main unit cannot be ignored in the high accurate printer.

In addition, methods whereby the image forming timing is individually adjusted every color have already been proposed {Japanese Unexamined Patent Publication (Kokai) No. 59-163971, (corresponding to U.S. Pat. No. 4,660,077) and Japanese Unexamined Patent Publication (Kokai) No. 58-226559}. On one hand, methods whereby an amount of chromatic aberration on an image is measured have also already been proposed {Japanese Unexamined Patent Publication (Kokai) No. 52-2604, Japanese Unexamined Patent Publication (Kokai) No. 53-21605, Japanese Unexamined Patent Publication (Kokai) No. 53-49514, Japanese Unexamined Patent Publication (Kokai) No. 56-157367, and Japanese Unexamined Patent Publication (Kokai) No. 58-14752}.

However, none of these methods proposed an organic system such that an amount of chromatic aberration detected is fed back to writing means. Therefore, it is the present situation such that the apparatus which can highly accurately improve the chromatic aberration is not proposed yet.

SUMMARY OF THE INVENTION

It is the first object of the present invention to provide an image forming apparatus which can solve the foregoing problems and can extremely accurately form an image onto a material to be recorded.

The second object of the invention is to provide an image forming apparatus in which even when a deviation of the recording position caused on a material to be recorded changes due to circumstances, this change can be corrected and the high accuracy can be held.

Under such objects, according to a preferred embodiment of the invention, there is provided a multi-image forming apparatus comprising: image forming means for forming different images on a plurality of image holding devices; transfer means for transferring the images on the plurality of image holding devices onto the same transfer material; conveying means for conveying the transfer material; control means for controlling the image forming means so as to form a mark to match the positions of the images onto the plurality of image holding devices; detecting means for detecting the recording position of the mark; and correcting means for correcting at least two of the positional deviation in the moving direction of the transfer material of each image, the positional deviation in the direction perpendicular to the moving direction, the magnification of image, and the inclination of image on the basis of a detection output of the detecting means.

Still another object of the invention is to provide an image forming apparatus which can preferably correct a positional deviation caused during the image formation.

Still another object of the invention is to provide an image forming apparatus in which even if a plurality of kinds of positional deviations are caused in a complex manner, it can be preferably corrected.

Under such an object, according to another preferred embodiment of the invention, there is provided an image forming apparatus comprising: image writing means for continuously writing a registration mark while an image is being written onto an image holding device; transfer means which moves so as to transfer the image and registration mark on the image holding device at a transfer position; detecting means for detecting the position of the registration mark on the transfer means during the formation of the image; and correcting means for correcting the position of the image on the image holding device on the basis of a detection signal from the detecting means during the formation of the image.

Still another object of the invention is to provide an image forming apparatus which can preferably perform the registration matching without adding a registration mark to a transfer material.

The above and other objects and features of the present invention will become apparent from the following detailed description and the appended claims with reference to the accompanying drawings.

BRIEF DESCRIPTION OF THE DRAWINGS

FIG. 7A is a perspective view of the second embodiment;

FIG. 7B is a perspective view of the main section in the second embodiment;

FIGS. 9 to 11 show other embodiments;

FIGS. 12A, 12B, 12C, and 12D are explanatory diagrams showing each image aberration;

FIG. 44 is a block diagram for explaining an example of a registration correction processing circuit;

DETAILED DESCRIPTION OF THE PREFERRED EMBODIMENTS

Figure 1:
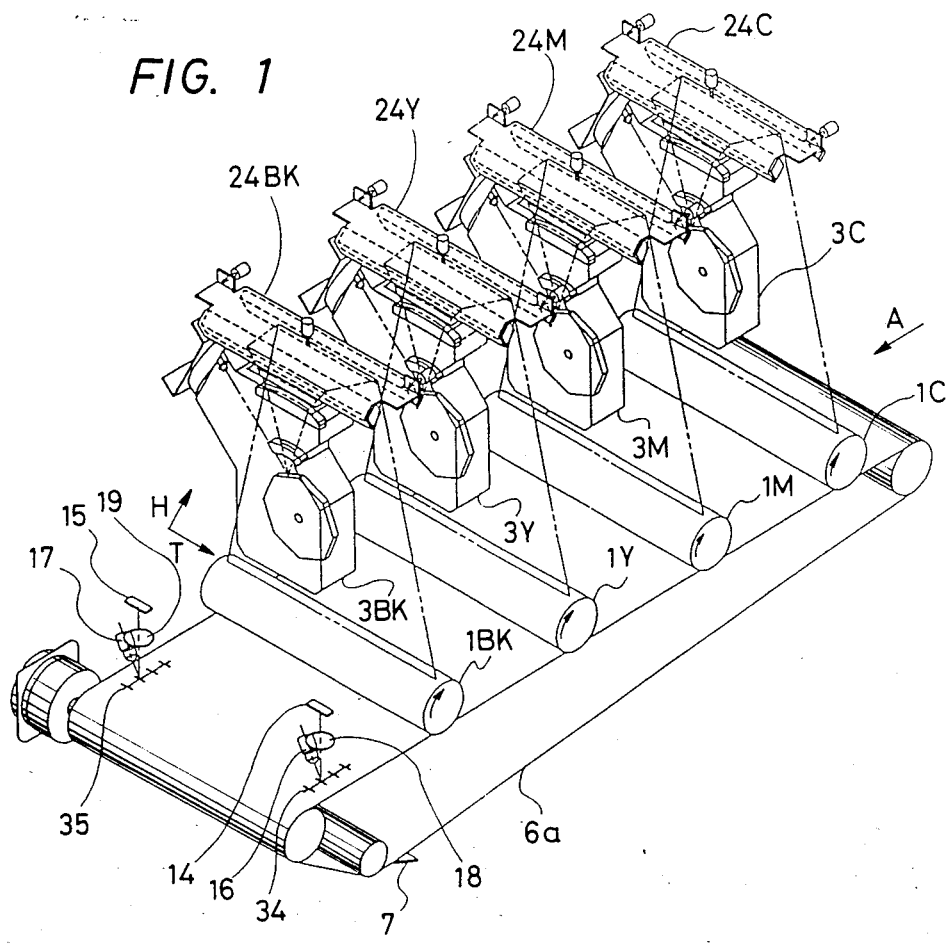
FIG. 1 is a perspective view of the first embodiment of an image forming apparatus according to the present invention.

Prior to explaining an embodiment of the present invention in detail, a structure of a conventional apparatus to which the invention can be applied and a positional deviation which may occur in such an apparatus will be described hereinbelow with reference to FIGS. 11 to 16.

FIG. 11 is a schematic diagram showing an image forming apparatus of the 4-drum full color type. In the diagram, reference numerals 101C, 101M, 101Y, and 101BK denote image forming stations to form images of the colors of cyan, magenta, yellow, and black, respectively. The image forming stations 101C, 101M, 101Y, and 101BK have photo sensitive drums 102C, 102M, 102Y, and 102BK, optical scanning means 103C, 103M, 103Y, and 103BK, developers, and cleaners. These image forming stations sequentially transfer images 31C, 31M, 31Y, and 31BK of cyan, magenta, yellow, and black onto a transfer material S which is moved in the direction of an arrow A by a transfer belt 106, thereby forming a color image.

In the apparatus having a plurality of image forming stations, images of different colors are sequentially transferred onto the same surface of the same transfer material S. Therefore, when the position of the transfer image in each image forming station is deviated from the ideal position, for example, in the case of a multicolor image, this positional deviation results in a deviation of the interval between the images of the different colors or results in an overlap thereof. On the other hand, in the case of a color image, such a positional deviation appears as a difference of color tone. Further, when the positional deviation is large, it appears as a chromatic aberration. Thus, the image quality is remarkably deteriorated.

As the kinds of positional deviations of the transfer images which occur in this apparatus, as shown in FIGS. 12A, 12B, 12C, and 12D, there are: the positional deviation (top margin) in the conveying direction (the direction of A in the diagram) of the transfer material S (FIG. 12A); the positional deviation (left margin) in the scan direction (the direction of B perpendicular to the direction of A in the diagram) (FIG. 12B); the inclination deviation in the oblique direction (FIG. 12C); and the deviation of the magnification difference (FIG. 12D). Actually, these four kinds of deviations are multiplexed and appear as an image aberration.

Figure 15:
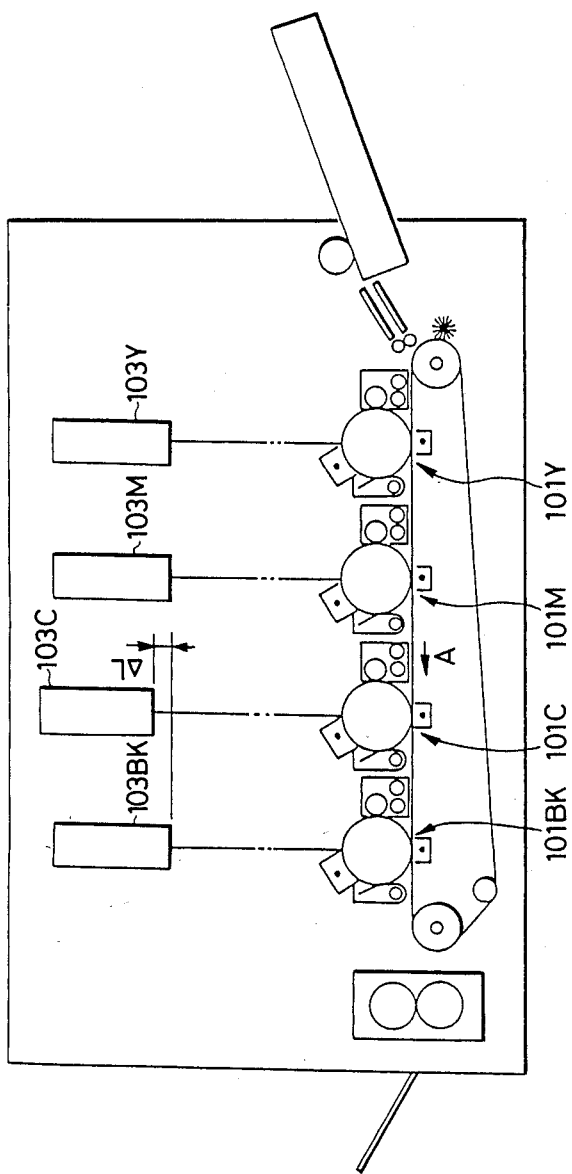
FIG. 15 is an explanatory diagram showing a difference of a length of optical path.
Figure 16:
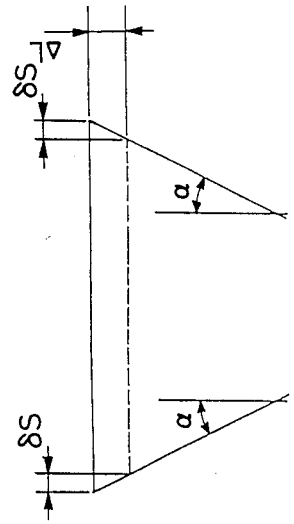
FIG. 16 is an explanatory diagram showing a magnification difference due to the optical path length difference.

The main causes of the above image aberration are as follows. In the case of the top margin of FIG. 12A, a deviation of the image writing times in each image forming station is the main cause. In the case of the left margin of FIG. 12B, a deviation of the writing timing of each image in each image forming station, that is, the scan start timings in one scan line is the main cause. In the case of the inclination deviation in the oblique direction of FIG. 12C, an attaching angle deviation $\theta_1$ (formed in accordance with the order of FIGS. 13A, 13B, and 13C) of the scan optical system or an angle deviation $\theta_2$ (formed in accordance with the order of FIGS. 14A, 14B, and 14C) of a rotary axis of the photo sensitive drum is the main cause. In the case of the deviation by the magnification difference of FIG. 12D, a deviation $(2 \times \delta_S)$ of the length of the scan line due to a difference $\Delta L$ of the optical path length from the scan optical system to the photo sensitive drum in each image forming station is the main cause (FIGS. 15 and 16).

To eliminate the foregoing four kinds of deviations, with respect to the top margin and left margin, the timings for the light beam scan are electrically adjusted, thereby correcting the deviations. With regard to the inclination deviation and magnification difference deviation, when the optical scanning means and photo sensitive drums are assembled into the apparatus, their positions are carefully accurately adjusted and attached so as not to cause the deviations of the attaching positions and attaching angles. That is, the inclination deviation and magnification difference deviation which vary depending on the attaching positions, angles, and the like of the optical scanning means (scanner or the like) and the photo sensitive drum are adjusted by changing the attaching positions or angles of the optical scanning means (scanner), photo sensitive drum, or reflecting mirror in the light beam optical path.

However, in such a conventional apparatus, although the top margin and left margin which can be electrically adjusted can be almost completely eliminated, it is difficult to adjust the inclination deviation and the magnification difference deviation which depend on the adjustment of the attaching positions of the optical scanning means (scanners), photo sensitive drums, or the reflecting mirrors in the light beam optical path. There is a problem such that it takes much labors for such adjustment.

Further, the stability of the positional deviation of images can be mentioned as a very significant problem. Namely, a positional deviation occurs by a fine fluctuation due to the running stability (snaking, one-sided motion) of the transfer belt as a moving object, positional reproducibility in the attachment or detachment of the photo sensitive drum, instabilities of the top margin and left margin in the case of a laser beam printer, and the like. Thus, the picture quality is largely influenced by this positional deviation.

With respect to the relations among the main unit, optical system, photo sensitive drums, and the like which have once been adjusted when the main unit was installed, for example, the complicated difficult readjustments are needed due to a slight distortion or the like which is caused when the main unit is moved to another floor.

On the other hand, in an apparatus for extremely accurately forming an image as compared with such a conventional electrophotographic recording apparatus, a positional deviation of the frame of the main unit due to the thermal expansion or contraction by the ambient temperature and a positional deviation due to a time-dependent change or the like are also large problems.

An image forming apparatus which can solve such problems will now be explained hereinbelow.

FIG. 1 is a constitutional diagram showing an image forming apparatus of the 4-drum full color type in the embodiment. In the diagram, 1C, 1M, 1Y, and 1BK denote photo sensitive drums in the image forming stations having developers (toners) of the respective colors of cyan, magenta, yellow, and black. These photo sensitive drums rotate in the directions indicated by arrows in the diagram. Primary charging devices to uniformly charge the surfaces of the drums, scan optical devices 3C, 3M, 3Y, and 3BK serving as image writing means (latent image forming means), developing devices to develop the latent images by the toners, cleaners, and transfer charging devices are respectively arranged around the photo sensitive drums 1C, 1M, 1Y, and 1BK. On the other hand, the transfer material S is supported on a transfer belt 6a and conveyed in the direction of an arrow A. In each image forming station, the toner images of the respective colors are sequentially transferred onto the transfer material S, thereby forming a color image. After completion of this transfer process, the image is fixed by a fixing device and, thereafter, the transfer material S is ejected out onto a tray.

On the other hand, image registration marks 34 and 35 to detect the position of the image are formed on the transfer belt 6a at regular intervals every color by the electrophotographic process separately from the image which is formed on the transfer material S. In this embodiment, the cross-shaped registration marks are used as shown in FIG. 1. Reference numerals 14 and 15 denote sensors to read the registration marks. In general, a CCD is used as the sensor. The CCD is the linear sensor to convert the photo signal into the electric signal and is generally used in a facsimile apparatus or the like and is similar to the well-known image reading sensor. The chromatic aberrations of the registration marks 34 and 35 formed on the transfer belt 6a are read by the CCDs 14 and 15 through lamps 16 and 17 and condensor lenses 18 and 19 arranged on the downstream side than the final station. These chromatic aberrations are corrected by a feedback control, which will be explained hereinlater.

Figure 2:
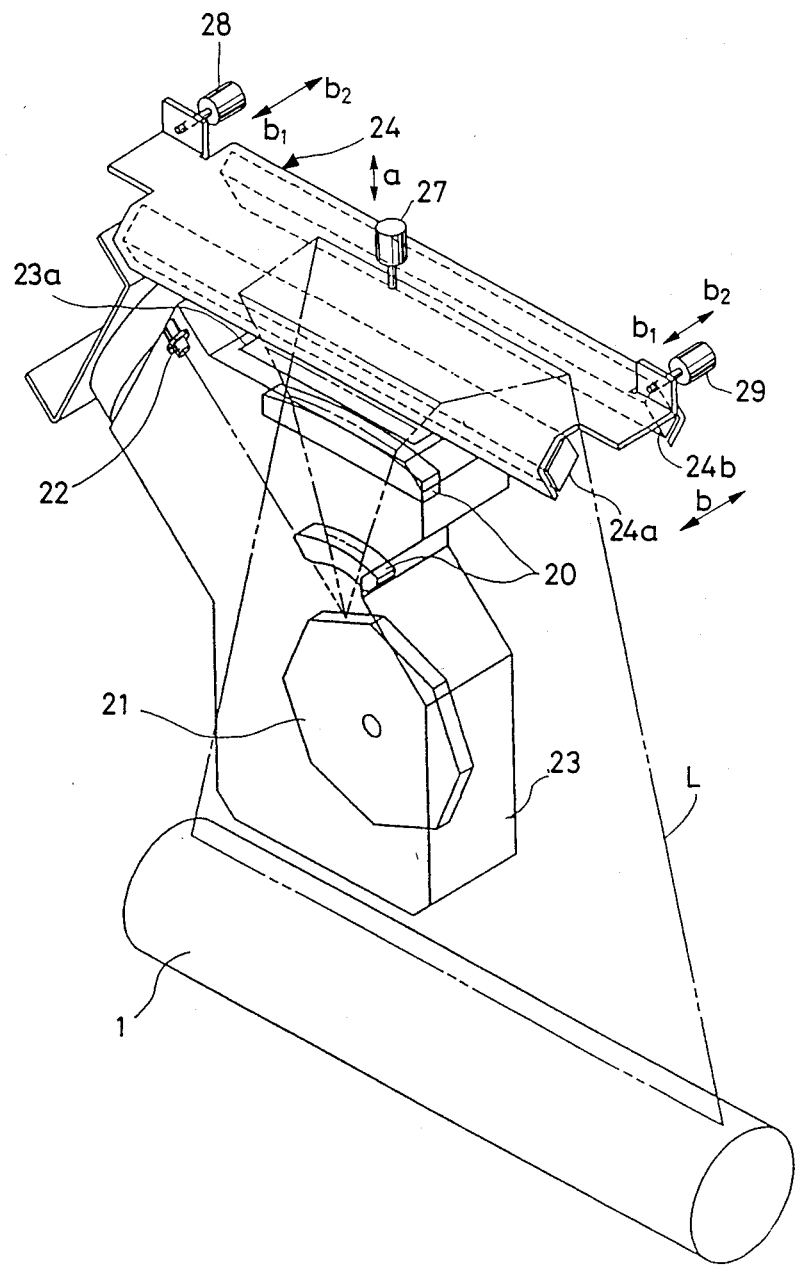
FIG. 2 is a perspective view of the main section in the first embodiment.

As shown in FIG. 2, in each of the scan optical devices 3C, 3M, 3Y, and 3BK, an fθ lens 20, a polygon mirror 21, and a laser light source 22 are arranged at predetermined positions in an optical box 23. A light beam L irradiated from the laser light source 22 is reflected and scanned by the polygon mirror 21 and is emitted from an opening portion 23a of the optical box 23 through the fθ lens 20. On the other hand, a first reflecting mirror 24a and a second reflecting mirror 24b are attached to a reflector 24 serving as light reflecting means so as to face almost perpendicularly each other. The reflector 24 is arranged above the optical box 23 and fixed to a main unit (not shown) of the apparatus such that the first reflecting mirror 24a is located over the opening portion 23a. The light beam L emitted from the optical box 23 is transmitted through the first and second reflecting mirrors 24a and 24b in accordance with this order and reaches onto the photo sensitive drum 1. The attaching position of the reflector 24 can be independently adjusted in the directions of arrows a and b to the apparatus main unit. As adjusting means for performing these adjustments, actuators 27, 28, and 29 such as linear stepping actuators or the like having stepping motors as drive sources which rectilinearly move in a stepwise manner are provided.

In a linear stepping actuator used in this embodiment, an output axis of the stepping motor is rectilinearly moved. This actuator has a structure such that trapezoidal screws are formed in the motor rotor and for the output axis. In general, such an actuator is used to feed the head in the case of a floppy disk or the like. On the other hand, as another system similar to this structure, a lead screw shaft (a screw is formed on the shaft) is used as an axis of the stepping motor and a movable member on which a screw corresponding to that screw shaft is formed is used, thereby enabling the similar actuator function to be realized.

For example, assuming that the screw formed on the lead screw is set to 4P0.5 (the nominal diameter is 4 mm and the pitch is 0.5 mm) and the step angle of the stepping motor is 48 steps/round, the feed amount can be controlled with the accuracy of $S = 0.5/48 = 10.42$ μm/steps as an advance amount S of the output unit.

Figure 3A:
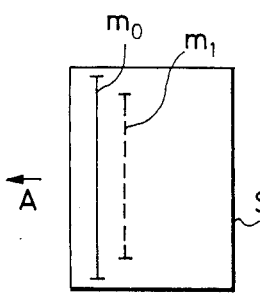
FIGS. 3A, 3B, and 3C are explanatory diagrams showing each image aberration on a transfer material.

In this specification, these devices are all referred to as actuators. By driving the actuator 27 in the direction of $a_1$ as the emitting direction of the light beam L from the scan optical device, the reflector 24 is moved in almost parallel in the direction of a. By reducing the optical path length until the photo sensitive drum 1 and by driving the actuator 27 in the direction of $a_2$, the optical path length can be adjusted to be long. By adjusting the optical path length in this manner, a length of scan line on the photo sensitive drum of the light beam L having a predetermined spreading angle can be changed, e.g., from $m_0$ to $m_1$ as shown in FIG. 3A.

Figure 3B:
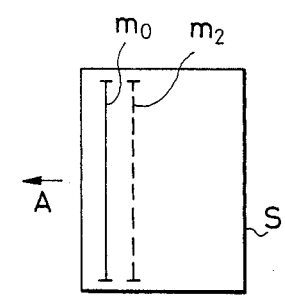
Figure 3C:
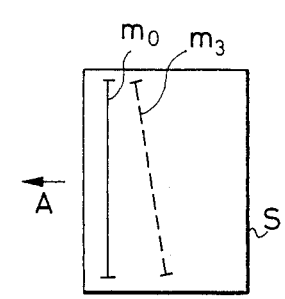

On the other hand, by simultaneously driving the actuators 28 and 29 in the same direction, e.g., in the direction of $b_1$, the reflector 24 is moved in parallel in the direction of b which is almost perpendicular to the direction of $a_1$. Thus, the scan line $m_0$ in FIG. 3B can be moved in parallel to the position of a scan line $m_2$. When either one of the actuators 28 and 29 is moved, or when the actuators are driven in the opposite directions in a manner such that the actuator 28 is moved in the direction of $b_1$ and the actuator 29 is moved in the direction of $b_2$, the angle of inclination of the scan line $m_0$ in FIG. 3C can be changed as shown by a scan line $m_3$.

As mentioned above, the reflector 24 in which a pair of reflecting mirrors are almost perpendicularly assembled is arranged in the light beam optical path from the scan optical device to the photo sensitive drum. The position of the reflector 24 is adjusted by the actuator 27 or by the actuators 28 and 29. Thus, the optical path length or optical beam scanning position can be independently adjusted. That is, by moving the reflector 24 having the pair of reflecting mirrors arranged like a /\ in the direction of a, only the optical path length of the light beam L can be corrected without changing the position of the scan line formed on the photo sensitive drum. In addition, by moving the reflector 24 in the direction of b, the image forming position and angle on the photo sensitive drum can be corrected without changing the optical path length of the light beam L.

In this embodiment, the 4-drum color printer has the reflector and the means for adjusting the position of the reflector. The inclination of the scan line on the photo sensitive drum, magnification difference based on the optical path length, and top margin and left margin are independently corrected every image forming means, thereby eliminating the chromatic aberration among the toners which are sequentially transferred to the transfer material S.

The actual method of reading the registration marks and feedback system will now be described in detail hereinbelow with respect to a cyan image as an example.

Figure 4:
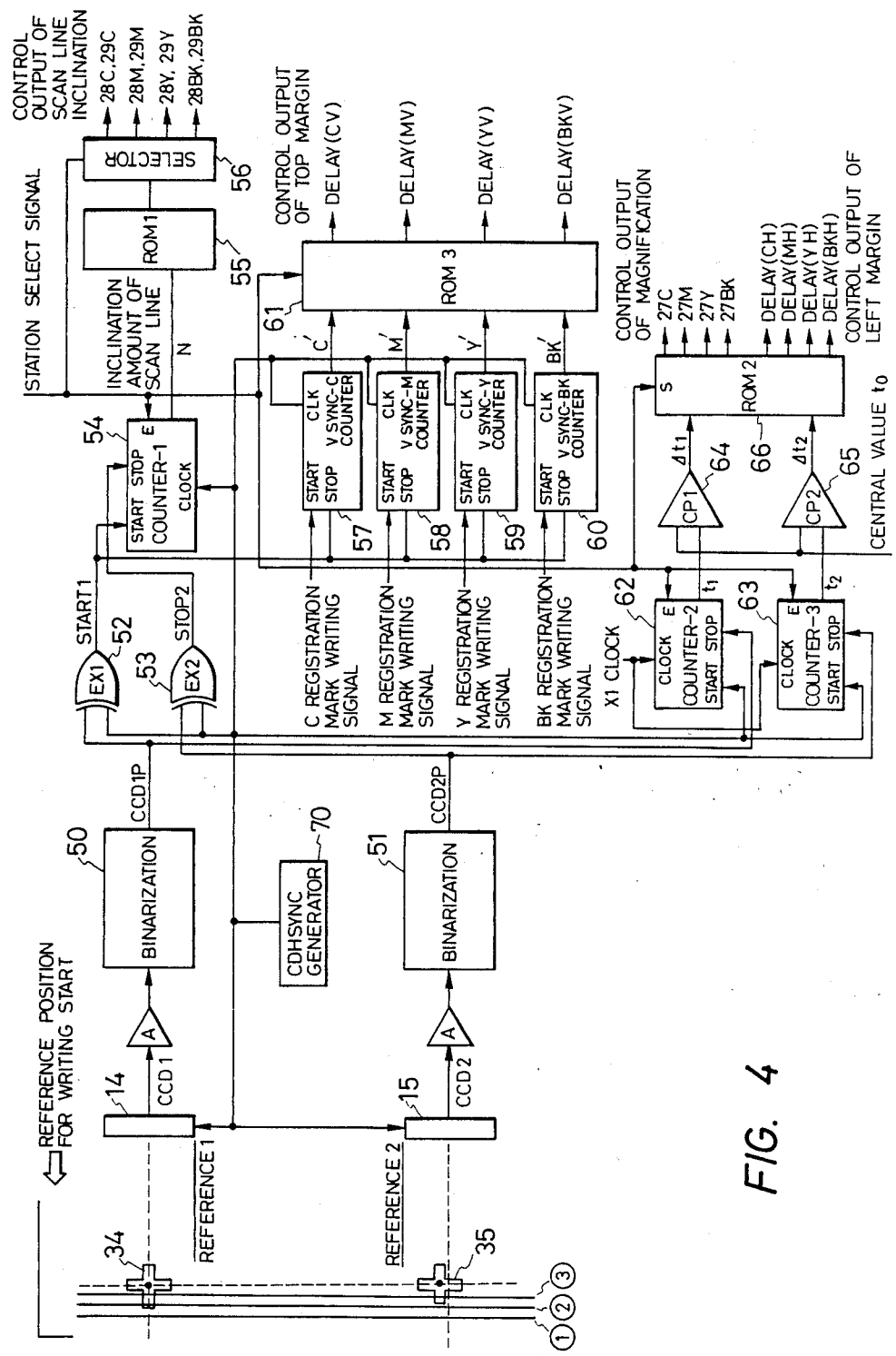
FIG. 4 is a block diagram showing a feedback control in the embodiment.

FIG. 4 shows a block diagram of a registration mark detecting unit and a unit to perform the feedback control to each station after detection of the registration marks.

FIG. 4 shows an example for reading the registration marks written in the state in which the foregoing inclination of the scan lines and the magnification difference occur.

CCDs 1 and 2 are used as the sensors 14 and 15 to read the registration marks 34 and 35. Since the outputs of the CCDs 1 and 2 converted into the electric signals are set to very low signal levels, they are amplified by amplifiers A, thereby obtaining electric signals CCD1P and CCD2P corresponding to the accurate positions of the registration marks by binarization circuits 50 and 51. The CCDs 1 and 2 are attached to the predetermined positions of reference lines (or positions) 1 and 2 corresponding to the positions at which the registration marks are previously written, respectively. Further, the CCDs 1 and 2 are arranged at positions in a manner such that when the registration marks are accurately formed at the normal positions without the scan line inclination and magnification difference for the writing start reference positions, the centers of the marks can be read by the central pixels of the CCDs 1 and 2. On the other hand, the directions of the CCDs 1 and 2 are also set such that the main scan start positions (left margins) of the CCDs are started from the reference lines 1 and 2.

Figure 5:
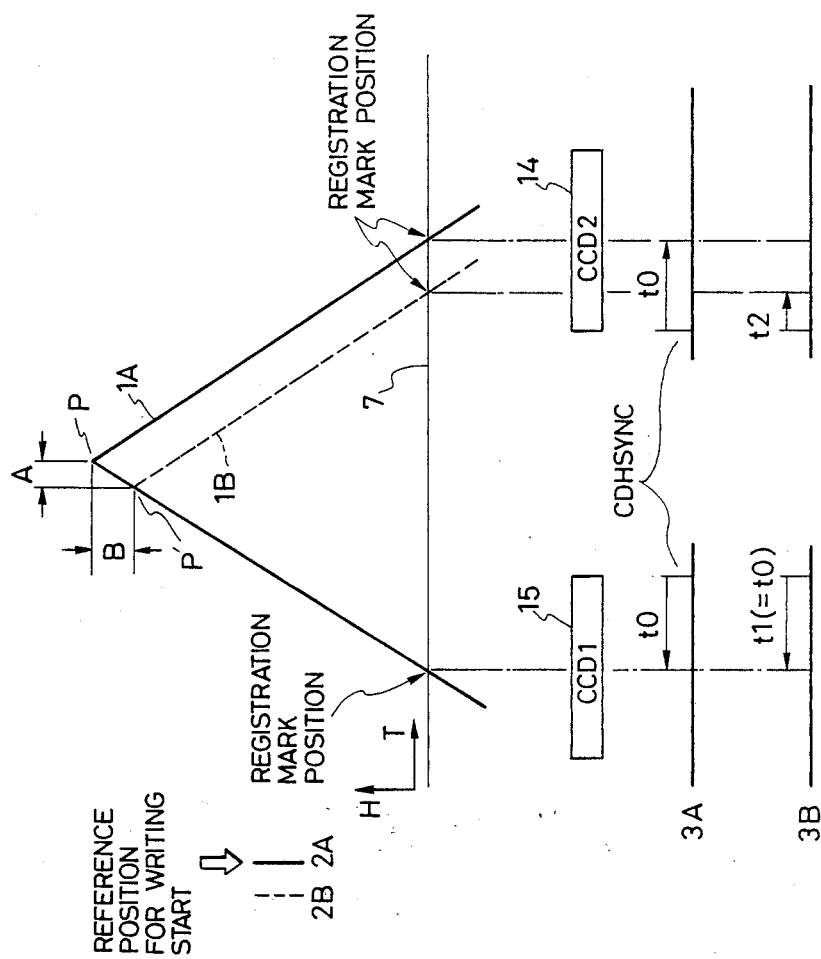
FIG. 5 is an explanatory diagram of a CCD reading unit.

FIG. 5 shows examples in the case 1B where both of a magnification difference B and a left margin deviation A occur and the case 1A where the registration marks are normally written. FIG. 5 also shows the positional relation between the CCDs 1 and 2. In FIG. 5, 1A denotes an output indicative of a locus when the registration mark is written at the normal position of a raster beam 7 and 1B represents an output indicative of a locus in the case where the raster beam 7 is short and the deviation occurs.

In the case 1A, P denotes a position indicative of the center of the scan of the light flux which is scanned by reflecting a laser beam emitted from the laser light source 22 by the polygon mirror 21. In the case of 1B, a position P' is deviated by only the distance A in the height direction H (shown in FIG. 1) and by only the distance B in the lateral direction T (shown in FIG. 1) from the normal position P.

Reference numerals 3A and 3B denote output waveforms after the binarization of the CCDs 1 and 2 when the registration marks 34 and 35 on both sides are read after they were written as shown at 1A and 1B. Since the output 3A obtained by 1A relates to the normal position, the outputs of the CCDs 1 and 2 are derived as the image signals of the registration marks at the time positions of $t_0$ before and after a main scan start position (hereinafter, referred to as a CDHSYNC). However, as shown at 3B, in the case of the registration marks written at the deviated position as shown at 1B, the image signals of the registration marks are derived at the normal position on the side of the CCD 1 and at the inside position than the normal position on the side of the CCD 2, i.e., at a time of $t_2$ shorter than $t_0$. Thus, when $t_0$ is longer than $t_2$, the magnification is small. On the other hand, when the magnification is adjusted to the normal value, it can be predicted that the left margin is also deviated from a reference position 2A to a position 2B.

Figure 6:
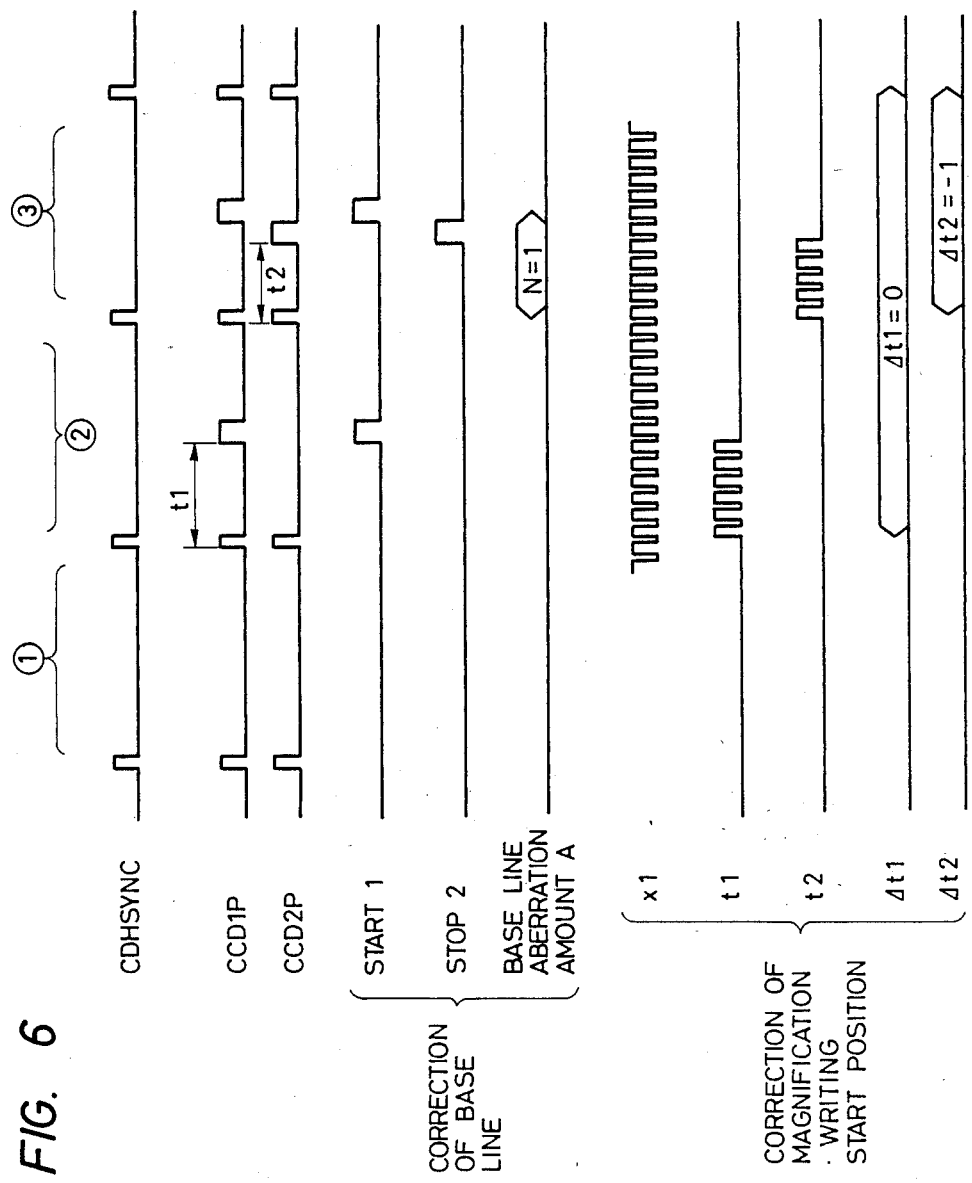
FIG. 6 is a timing chart showing a feedback control in the embodiment.

In FIG. 4, a method of detecting the magnification difference and left margin deviation amount and a method of correcting them will now be described further in detail with reference to a timing chart of FIG. 6.

One main scan period signal CDHSYNC is given from a CDHSYNC generator 70 to the CCDs 1 and 2. The outputs thereof can be converted into the image signals at this period. The registration marks 34 and 35 are sequentially read by the CCDs 1 and 2 in accordance with the order of the CDHSYNC signals ①, ②, and ③. The resultant signal outputs are set to CCD1P and CCD2P in FIG. 6. In the cycle of the CDHSYNC of ①, no registration mark is read by both of the CCDs, so that no image signal is derived. Next, in the cycle of the CDHSYNC of ②, the image signal of CCD1P is obtained at the position of $t_1$ as an output on the side of the CCD 1. As mentioned in the example of FIG. 5, the time $t_1$ is equal to the time of $t_0$ at a predetermined position.

Further, in the cycle of the CDHSYNC of ③, the image signal of CCD2P is obtained at the position of $t_2$ as an output of the CCD 2. As explained in the example of FIG. 5, the time $t_2$ is shorter than the time $t_0$. The times $t_1$ and $t_0$ are measured by a counter 2 (62) and a counter 3 (63). The counters 62 and 63 have CLOCK terminals. A clock X1 CLOCK is input to these terminals. A frequency of the clock $X_1$ CLOCK is preferably set to a high frequency because a deviation amount is checked on the basis of this frequency. A CDHSYNC signal from the generator 70 is input to START signal terminals of a counter 1 (54) and the counter 2 (62). On the other hand, the output signal CCD1P is input to a STOP signal terminal of the counter 2 (62). The output signal CCD2P is input to a STOP signal terminal of the counter 3 (63). Therefore, the counter 2 starts counting the clock frequency $X_1$ in response to the CDHSYNC and stops the counting operation when the image signal CCD1P is input. The count value is obtained as an output $t_1$. The counter 3 starts counting the clock frequency $X_1$ in response to the CDHSYNC and stops the counting operation when the image signal CCD2P is input. The count value is derived as an output $t_2$. The values of the outputs $t_1$ and $t_2$ obtained are compared with a central value $t_0$ by comparators $CP_1$ and $CP_2$. The difference $\Delta t_1$ between the $t_1$ and $t_0$ becomes $\Delta t_1 = 0$. The difference $\Delta t_2$ between the $t_2$ and $t_0$ becomes $\Delta t_2 = -1$. In accordance with the values of $\Delta t_1$ and $t_2$, the optimum movement control value of the actuator 27 to control the magnification difference is selected and output as the first control amount from an ROM 2 (66) in which the magnification movement amounts and left margin movement amounts are previously set. Further, the left margin movement amount as the second control amount is also selected and output as DELAY (CH).

Therefore, due to this correction, the magnification difference and the left margin deviation can be corrected to the normal position. By also repeating these series of operations with regard to the registration marks of magenta, yellow, and black which are subsequently detected, the corrections of all of the image forming stations are performed. For this selection, station select signals are input to E terminals of the counters 2 (62) and 3 (63) and to an S terminal of the ROM 2 (66).

The correction of the inclination amount of the scan line will now be described.

In the cycle of CDHSYNC of ②, the CCD 1 reads the registration mark 34, so that the CCD1P is derived. The CDHSYNC signal is then erased by an exclusive OR (52) of EX1, so that a START1 signal is derived. By inputting this signal to the START signal terminal of the counter 1, the counting of the CDHSYNC signal input to the CLOCK terminal is started. Next, in the cycle of CDHSYNC of ③, the CCD 2 reads the registration mark 35, thereby obtaining the signal CCD2P. Similarly to the above, a STOP 2 signal is derived by an exclusive OR (53) of EX2. By inputting this signal to the STOP terminal of the counter 1, the counting of the CDHSYNC is stopped. Therefore, the numerical value of CDHSYNC, i.e., an inclination about N of scan line is obtained as an output of the counter 1. In this embodiment, N=1. In accordance with this deviation amount, the optimum control values of the actuators 28 and 29 to move the scan line in the designated direction are selected from an ROM 1 (55) in which which control values are previously stored. The station is designated by the selector, thereby driving the actuators 28 and 29. Therefore, by this correction, the inclination amount of scan line is corrected and the scan line is moved to the normal position. By repeating these series of operations with regard to the subsequent registration marks of magenta, yellow, and black, the correction of all of the stations is executed. For this selection, a station select signal is input to the E terminal of the counter 1.

The correction of the top margin deviation will now be described.

A VSYNC-C counter (57) detects the position of the registration mark which is first written by the first station. By inputting a timing signal by which the registration mark was written to the START terminal, the counting of the CDHSYNC input to the CLK terminal is started. This signal is not limited to the CDHSYNC. If a further high different frequency signal is used, the resolution can be further improved. By stopping the operation by the START signal of the registration mark which has first been read by the CCD 1, the counting of the CDHSYNC is stopped. A count value C' of the counter 57 is input to an ROM 3 (61). In the ROM 3, the value C' is compared with the value obtained when the registration mark is written at a predetermined position. The difference amount obtained is selected and output from the ROM 3. Thus, a top margin control signal of DELAY (CV) is output from the ROM 3. Thus, due to this correction, the top margin deviation is corrected and the top margin is moved to the normal position. By also repeating these series of operations with respect to the subsequent registration marks of magenta, yellow, and black, the correction of all of the stations is executed. In the operation of each of VSYNC counters (57, 58, 59, and 60), control signals are obviously needed so as not to stop the operations by the registration mark signal at the unnecessary position, although not shown, because the registration marks are continuously detected. On the other hand, even if the control value selected from the ROM 3 is used as the control values for the actuators 28 and 29, the top margin deviation can be also likewise corrected.

By the combination of the operations mentioned above, the image having various chromatic aberrations can be automatically promptly corrected.

On the other hand, after the registration marks formed on the transfer belt passed through the CCD reading unit, they are cleaned by a belt cleaning device such as a cleaning blade 7 shown in, e.g., FIG. 1, thereby enabling the next registration marks to be written.

[Embodiment 2]

FIGS. 7A and 7B show the second embodiment of the present invention. In this embodiment, the inclination of scan line of the chromatic aberration, magnification difference, and the like mentioned above can be corrected by position moving means. The attaching position of the position moving means can be adjusted for the apparatus main unit. The position moving means is attached to the optical box 23 (the box in which the $f\theta$ lens 20, polygon mirror 21, and laser light source 22 are integrally assembled) serving as the scan optical device (i.e., the scanner). The mechanism of the position moving means will now be explained hereinbelow.

In FIGS. 7A and 7B, reference numerals 40 and 41 denote stepping motors or actuators such as linear stepping actuators described in the embodiment 1.

By driving the actuator 40 in the direction of $a_1$ as the emitting direction of the light beam L from the scan optical device, the optical box 23 is moved almost in parallel along an axis ( in the direction of a. Thus, the optical path length until a photo sensitive drum 1 can be reduced. On the other hand, by driving the actuator 40 in the direction of $a_2$, the optical path length can be adjusted to a long length. In this manner, the magnification difference can be corrected similarly to the embodiment 1.

On the other hand, by driving the actuator 41, the optical box 23 is moved around the axis l as a rotational center, so that the inclination amount of scan line can be adjusted.

As mentioned above, the foregoing chromatic aberration amount can be also corrected by correcting the position of the scan optical device itself. All of the feedback control of the correction amounts to the actuators 40 and 41 by reading the registration marks, the reading system and the like are the same as those explained in the embodiment 1.

[Embodiment 3]

Figure 8A:
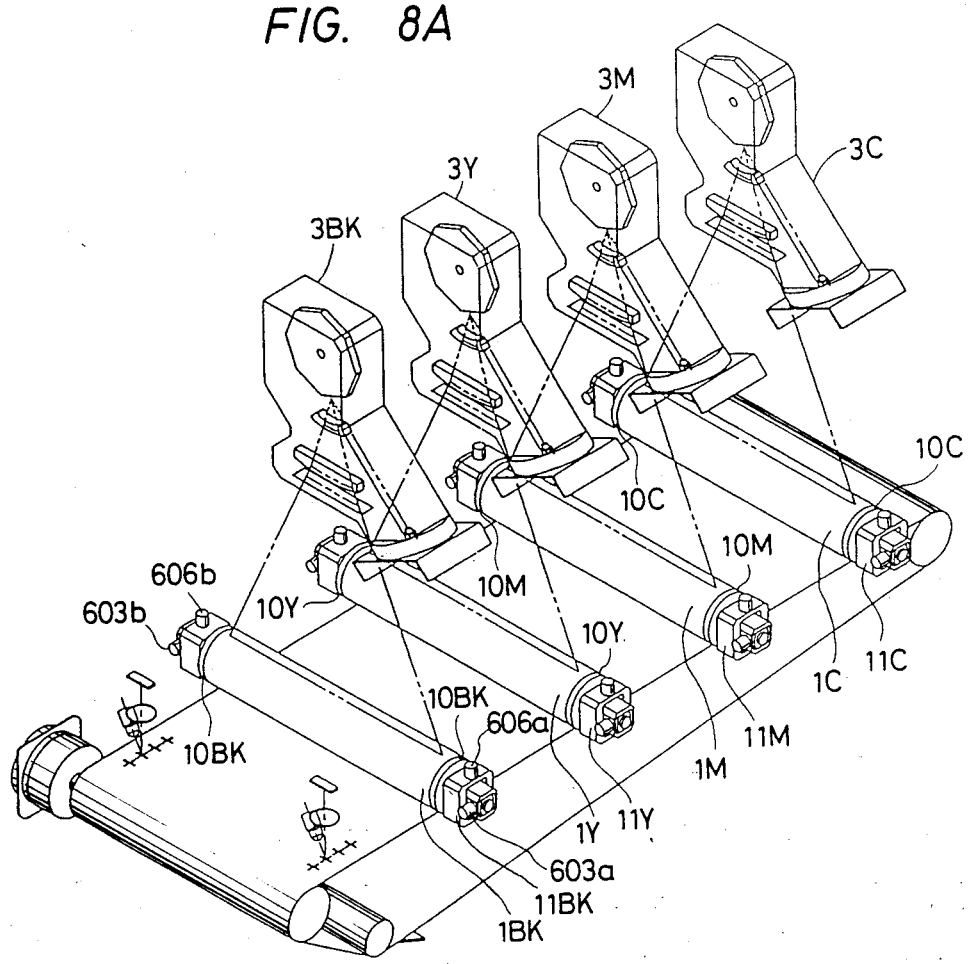
FIG. 8A is a perspective view of the third embodiment.

FIG. 8A shows the third embodiment of the invention. In this embodiment, the inclination of scan line, magnification difference, and the like of the chromatic aberration mentioned above can be corrected by the position moving means of the image holding device (i.e., the photo sensitive drum). The mechanism of the position moving means will now be described hereinbelow.

In FIG. 8A, reference numerals 10C, 10M, 10Y, and 10BK denote flanges fixed to both end portions of the photo sensitive drums 1C, 1M, 1Y, and 1BK, respectively. These flanges are axially supported by axial supporting devices 11C, 11M, 11Y, and 11BK shown in FIG. 8B. These axial supporting devices are fixed to supporting members corresponding to the photo sensitive drums. The photo sensitive drums are driven by a drive propagating mechanism (not shown).

Figure 8B:
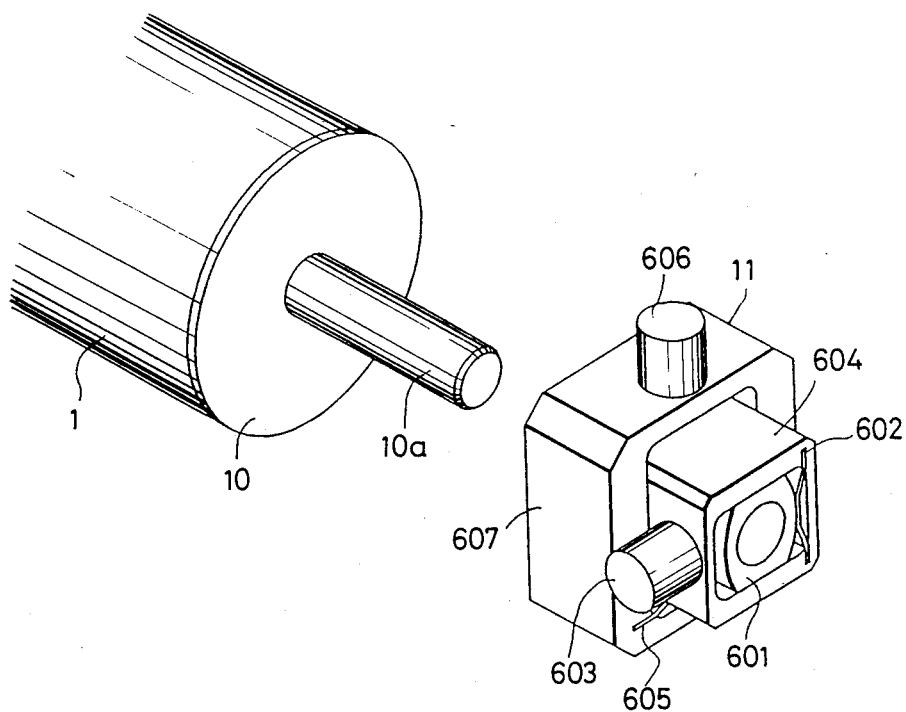
FIG. 8B is a perspective view of the main section in the third embodiment.
Figure 8C:
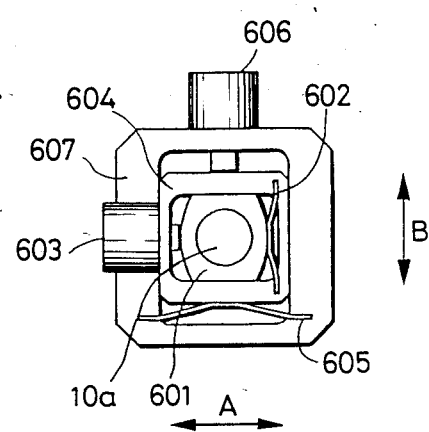
FIG. 8C is a cross sectional view of the main section in the third embodiment.

FIGS. 8B and 8C are detailed diagrams of an axial supporting device 11. In these diagrams, an axis 10a of each flange 10 is supported by a bearing 601. The bearing 601 is supported in an inner casing 604 so as to be movable in the directions of arrows A by a guide groove (not shown). THe bearing 601 is urged to a spring 602 by an actuator 603. The inner casing 604 is also supported to an outer casing 607 so as to be movable by a guide groove (not shown) in the directions of arrows B which are perpendicular to the directions of the arrows A. The inner casing 604 is urged to a spring 605 by an actuator 606. In this case, the linear stepping actuators or the like are preferably used as the actuators 603 and 606 as explained in the foregoing embodiment.

The axial supporting device 11 is attached by setting the A direction to the horizontal direction and the B direction to the vertical direction as shown in, e.g., FIG. 8A. A front side actuator 606a and a rear side actuator 606b are simultaneously driven in the same direction, i.e., in the B direction. Thus, the photo sensitive drum 1 is moved almost in parallel with the emitting direction of the light beam L from the scan optical device and the optical path length is changed. In this manner, the magnification difference can be corrected.

On the other hand, in the case of driving either one of the actuators 603a and 603b, or by driving the actuators 603a and 603b in the opposite directions, the inclination amount of scan line can be corrected.

Further, by simultaneously driving the actuators 603a and 603b in the same direction, this results in the parallel movement of the scan line. That is, the top margin can be also adjusted.

As mentioned above, even by the correction of the position of the photo sensitive drum itself, the foregoing chromatic aberration amount can be also corrected. All of the feedback control of the correction amounts to the actuators 603 and 606 by reading the registration marks, the reading system and the like are the same as those explained in the embodiment 1.

Figure 9:
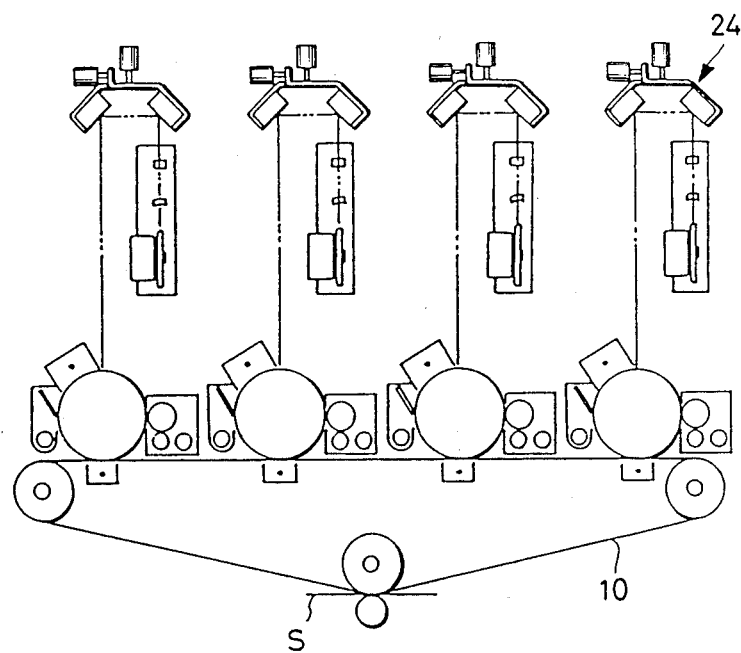
Figure 10:
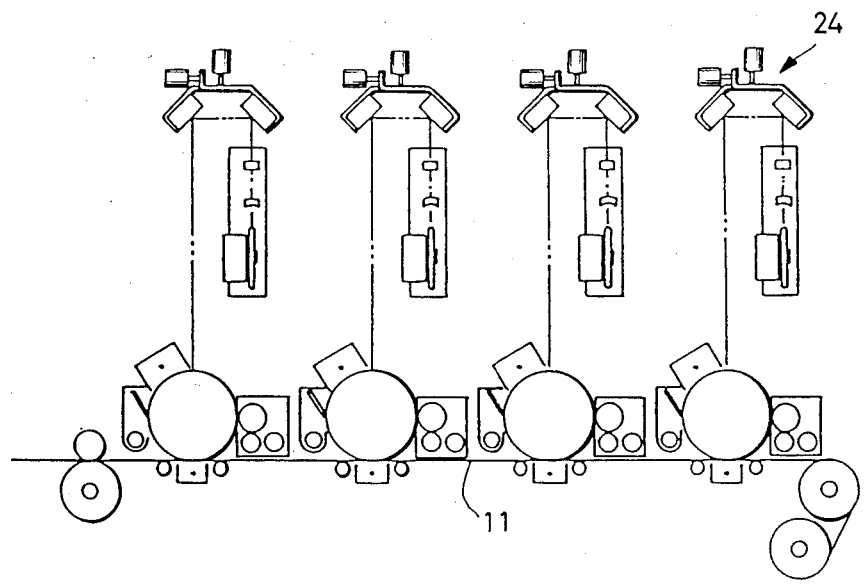
Figure 13A:
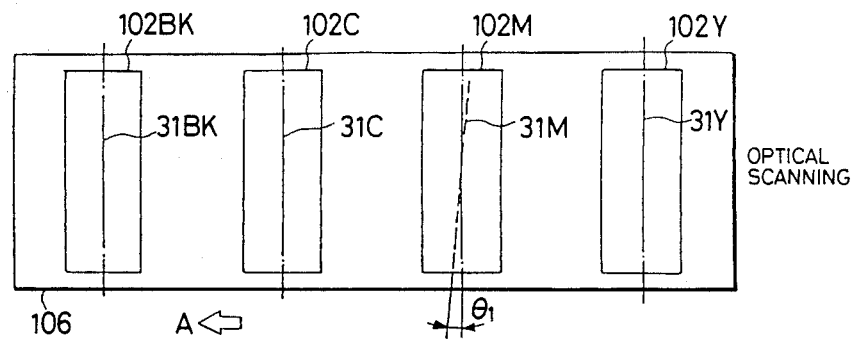
FIGS. 13A, 13B, and 13C are explanatory diagrams of each image aberration due to the positional deviation of an optical scan device.
Figure 13B:
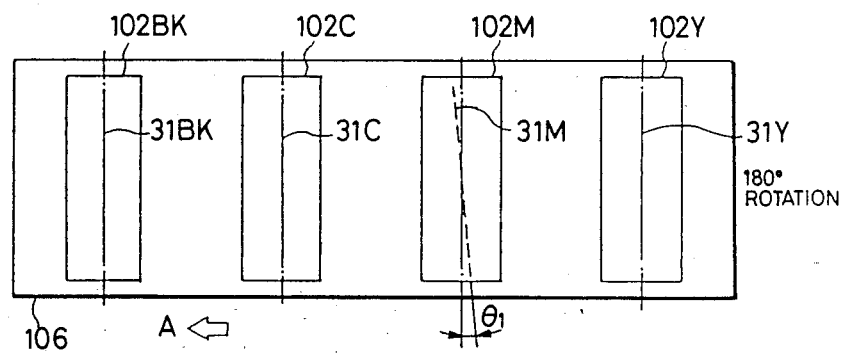
Figure 13C:
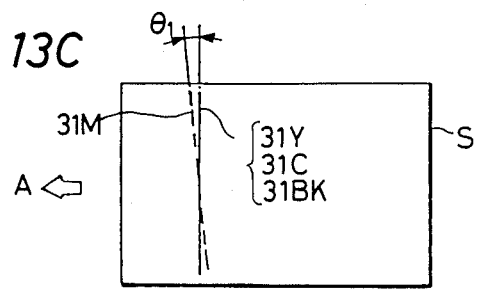
Figure 14A:
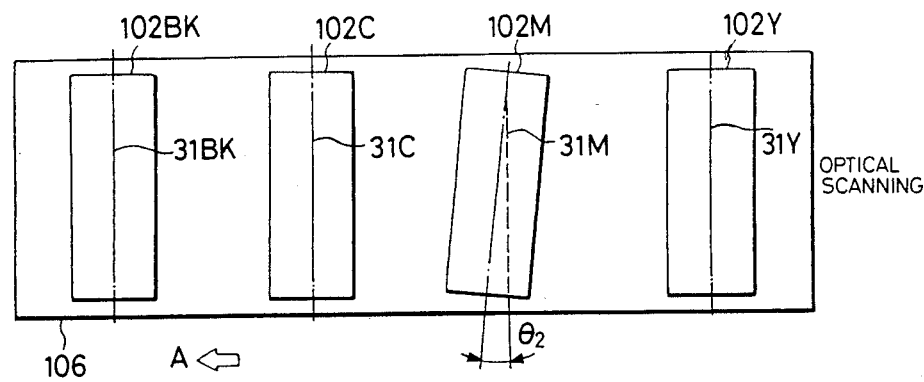
FIGS. 14A, 14B, and 14C are explanatory diagrams of each image aberration due to the axial deviation of a photo sensitive drum.
Figure 14B:
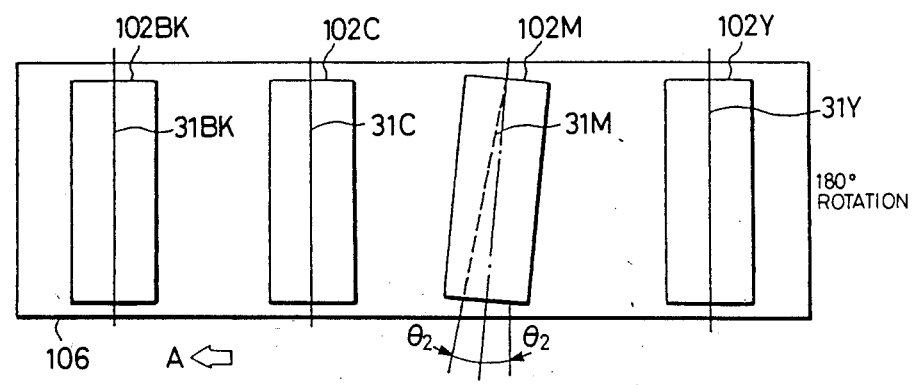
Figure 14C:
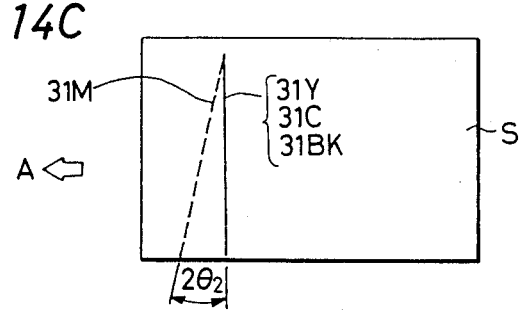

The foregoing system can be also applied to other image forming apparatuses such as image forming apparatus having an intermediate transfer device 10 as shown in FIG. 9, an image forming device having a roll paper 11 as a transfer material as shown in FIG. 10, and the like. In the case of FIG. 9, registration marks are formed on the intermediate transfer device 10 or transfer material S. In the case of FIG. 10, registration marks are formed on the roll paper 11.

On the other hand, the invention is not limited to the 4-drum color printer but can be also applied to a multicolor image forming apparatus of, e.g., two or three colors and to a multiimage forming apparatus.

Further, the first embodiment has been described with respect to the case where the reflector having the reflecting mirrors arranged like a / \ shape is used as an optical system to specify the optical path of the light beam L. However, the invention is not limited to this structure. The attaching positions and angles of the reflecting mirrors and the number of reflecting mirrors can be arbitrarily set. It is also possible to use a pair of reflecting mirrors which are integrally formed like an L shape.

On the other hand, each of the foregoing embodiments has been described with regard to the example in which the linear stepping actuators are used as the actuators. However, it is also possible to use other devices capable of accomplishing the similar function such as ordinary stepping motor having a screwed shaft, cam, linear motor, and the like.

On the other hand, the registration marks can be formed at any positions on a moving object if they can be formed by the electrophotographic recording system. In addition, the shape of the registration marks is not limited to the cross shape used in the embodiments but can be set to an arbitrary shape by which the foregoing image aberration can be detected.

Further, the cleaning means for cleaning the registration marks written on the belt is not limited to the cleaning blade system used in the embodiments. If the fur brush system or air attracting system is used, the registration marks can be more effectively cleaned.

Further, as the number of sensors such as CCDs which are used to read the image, it has been set to two in the embodiments. Namely, the image is read by the two front side and rear side sensors. However, if three or four sensors are used the image aberration can be further accurately detected.

The embodiments have been constituted and functioned as explained above. By providing the detecting means for detecting the marks for detection of the positional deviation and the correcting means for correcting a plurality of positional deviation elements on the basis of the marks detected, the positional deviations among a plurality of images on the transfer material can be fairly easily eliminated. Thus, there is an advantage such that the image of a very high quality can be formed.

In the next embodiment, there will be explained an image forming apparatus in which the registration mark 34 shown in FIG. 1 is continuously transferred simultaneously with the image transfer, this registration mark is always monitored during the image formation to measure a misregistration amount, and the image formation is corrected on the basis of the misregistration amount, so that the image in which not only the edge portions but also the intermediate and rear edge portions are stable can be formed.

Figure 17:
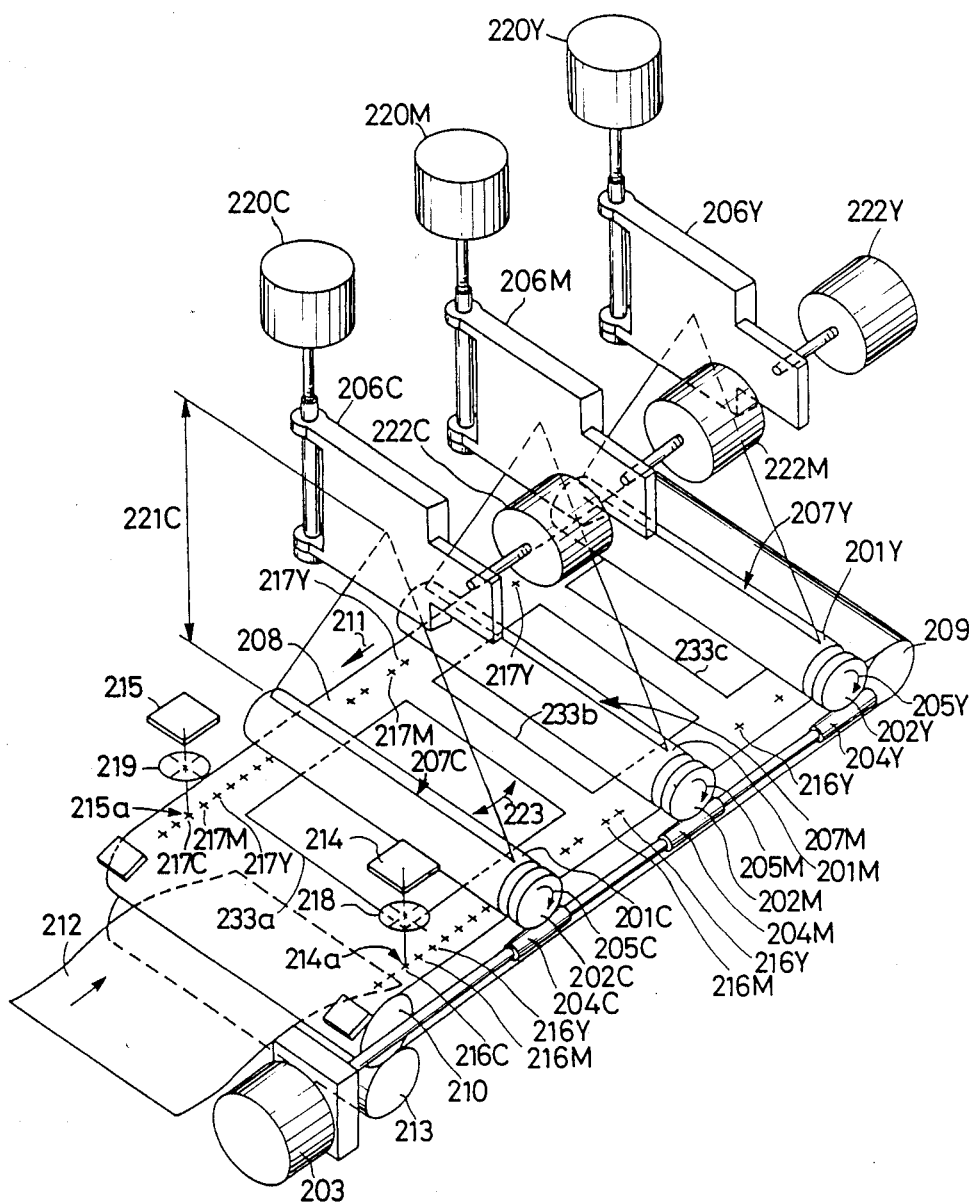
FIG. 17 is a perspective view of a color printer of the type in which photo sensitive drums are arranged in parallel according to still another embodiment of the invention.

FIG. 17 shows a perspective view of a color printer of the type in which photo sensitive drums are arranged in parallel.

Reference numerals 201Y, 201M, and 201C denote photo sensitive drums to form images of yellow, magenta, and cyan. A motor 203 drives worm wheels 202Y, 202M, and 202C through worms 204Y, 204M, and 204C, so that the photo sensitive drums and worm wheels are integrally driven in the directions of arrows 205Y, 205M, and 205C in FIG. 17. Optical boxes 206Y, 206M, and 206C having therein laser light sources and polygon scanners emit raster beams 207Y, 207M, and 207C of laser beams, thereby exposing the photo sensitive drums, 201Y, 201M, and 201C, respectively.

Well-known Carlson processes are arranged around the photo sensitive drums 201Y, 201M, and 201C and they are omitted in this diagram.

An intermediate transfer belt 208 arranged under the photo sensitive drums 201Y, 201M, and 201C is wound around rollers 209 and 210 and conveyed in the direction of an arrow 211. The Y, M, and C images (by combining these images, a color image to be reproduced is obtained) formed on these drums by the Carlson processes are successively overlappingly transferred onto the intermediate transfer belt 208 by a corona transfer method or pressure transfer method. These images are further transferred again onto a transfer paper 212 between a pair of rollers 210 and 213 with a predetermined pressure, so that color images (233a, 233b, 233c, . . . ) are derived. One- or two-dimensional image pickup devices 214 and 215 serving as the position detecting means in the invention consist of CCDs, MOSs, or the like. In association with the movement of the belt 208, these image pickup devices read registration marks (216Y, 217Y, etc.) formed on both sides of the belt 208 through lenses 218 and 219 around image pickup points 214a and 215a as centers. Registration marks 216Y, 216M, 216C, 217Y, 217M, and 217C are formed on the belt 208 simultaneously with the formation of the images 233a, 233b, and 233c.

The optical boxes 206Y, 206M, and 206C have motors to control the positions, respectively. Motors 220Y, 220M, and 220C to adjust the optical path lengths among those motors change the optical path lengths (e.g., 221C) from the laser light sources of the optical boxes 206 to the drums of the laser beams.

Motors 222Y, 222M, and 222C to rotate the optical boxes rotate the optical boxes 206 around the rotary shafts of the motors 220Y, 220M, and 220C as rotational centers, thereby rotating, for instance, the raster beam 207C in the directions of arrows 223.

Figure 18:
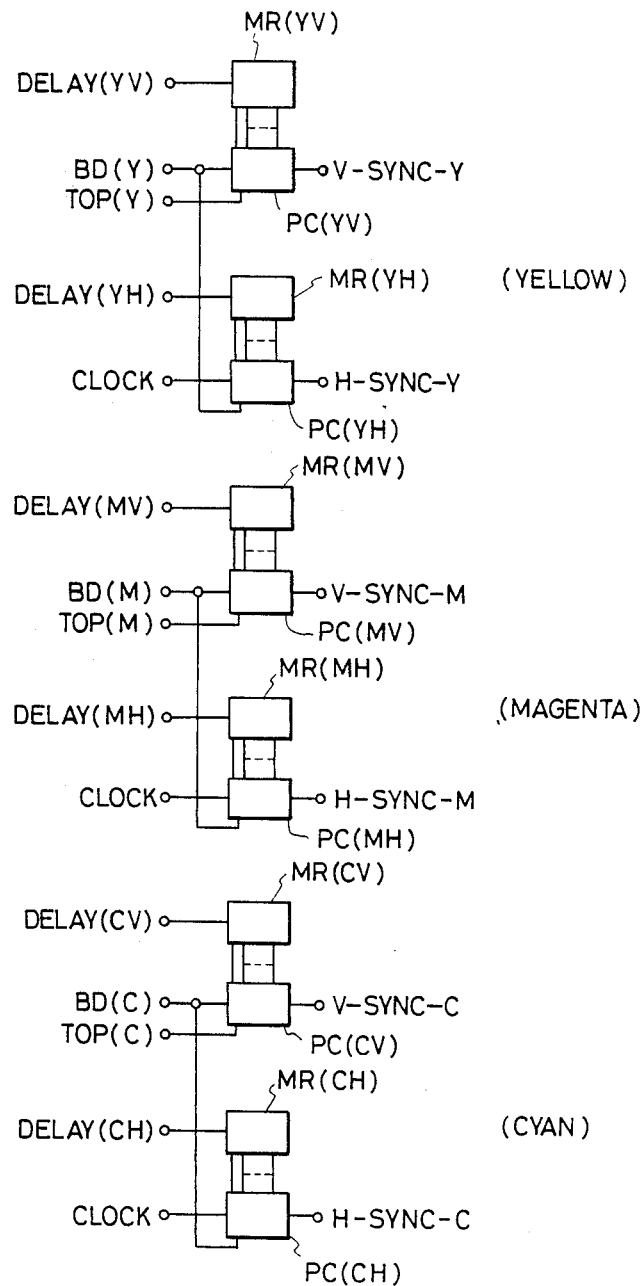
FIG. 18 is a circuit diagram to produce horizontal and vertical sync signals of each color.

FIG. 18 shows a part of circuits to produce a horizontal sync (H-SYNC) signal and a vertical sync (V-SYNC) signal of each color.

FIG. 18 shows fine adjusting circuits of the H-SYNC and V-SYNC signals regarding yellow (Y), magenta (M), and cyan (C). The signals which are input to these circuits are obtained from a sequence controller (Japanese Unexamined Patent Publication (Kokai) No. 59-163971 corresponding to U.S. Pat. No. 4,660,077) consisting of a well-known circuit arrangement.

TOP(Y), TOP(M), and TOP(C) signals indicative of the rough vertical timings (the image forming timings in the conveying direction of the belt) of each color and BD(Y), BD(M), and BD(C) signals representative of the rough horizontal timings (the image forming timings in the direction perpendicular to the conveying direction of the belt) of each color are input to the fine adjusting circuits from the sequence controller.

Further, DELAY(YV), DELAY(MV), and DELAY(CV) signals representative of the delay amounts to be finely adjusted with respect to the belt conveying direction are stored into margin registers MR(YV), MR(MV), and MR(CV), respectively. In a manner similar to the above, DELAY(YH), DELAY(MH), and DELAY(CH) signals indicative of the delay amounts to be finely adjusted with regard to the direction perpendicular to the belt conveying direction are stored into margin registers MR(YH), MR(MH), and MR(CH).

For example, the vertical sync signal V-SYNC-Y regarding yellow (Y) (the same shall apply hereinbelow) is calculated by a program counter PC(YV) from the BD(Y) and TOP(Y) signals and the value of the margin register MR(YV) and output at a desired timing. In a manner similar to the above, the vertical sync signals V-SYNC M and V-SYNC-C regarding magenta (M) and cyan (C) and the horizontal sync signal H-SYNC-Y with respect to Y (the same shall apply hereinafter), and the H-SYNC-M and H-SYNC-C signals of M and C are derived. The images of the respective colors are overlappingly formed at the same image position on the conveying belt 208.

Figure 19:
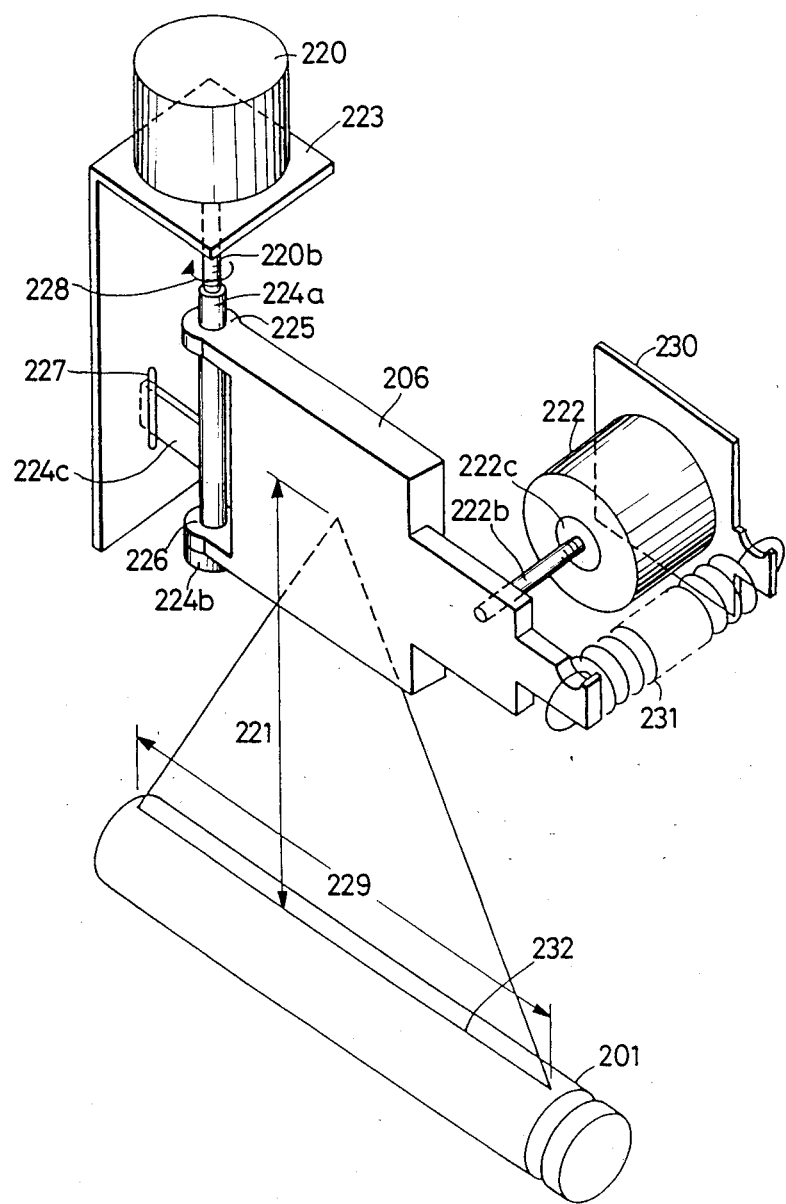
FIG. 19 is a diagram showing an adjustment state of an optical box.

FIG. 19 is a diagram showing an adjusting method of one optical box 206 of each color (the same shall apply to the other colors).

An optical path adjusting motor 220 consists of a pulse motor and is fixed to a stay 223 which is integrally formed with the frame of the main body. A collar 224a is fitted into holes 225 and 226 formed at the edges of the optical box 206. A stopper 224b is integrally attached to the bottom edge of the collar 224a, thereby supporting the optical box 206 from the bottom.

A rotation stopper 224c is integrally attached at the intermediate position of the collar 224a and fitted into a hole 227 formed in the stay 223. Since the hole 227 is longer than the height of the collar 224a, the hole 227 allows the vertical movement thereof, while preventing the rotation of the collar 224a.

A male screw is formed on a shaft 220b of the motor 220. A female screw is formed on the inner periphery of the collar 224a. The shaft 220b is screwed into the collar 224a. Assuming that both of these screws are the right handed screws, by rotating the shaft 220b in the direction of an arrow 228, the optical box 206 ascends. By rotating the shaft 220b in the direction opposite to the arrow 228, the optical box 206 descends. Thus, an optical path length 221 changes and an image size 229 also changes.

On the other hand, a pulse motor 222 is fixed to a stay 230. A tension coil spring 231 is attached between the stay 230 and the optical box 206. A female screw is formed on a rotor 222c of the motor 222. A shaft 222b on which a male screw is formed is screwed onto the rotor 222c. By rotating the rotor 222c of the motor 222, the shaft 222b is moved forward or backward.

A base end of the shaft 222b is fixed to the optical box 206, so that the optical box 206 can be swung around the shaft 220b as a center by the rotation of the motor 222. Thus, a scan line 232 can be inclined to a base line of the photo sensitive drum 201.

A method of correcting the chromatic aberration will now be described with respect to a cyan image. Substantially the same shall apply to the other colors.

FIGS. 20, 21, 22, and 23 show diagrams when the image pickup points 214a and 215a on the belt 208 in FIG. 17 are seen from the top.

Figure 20:
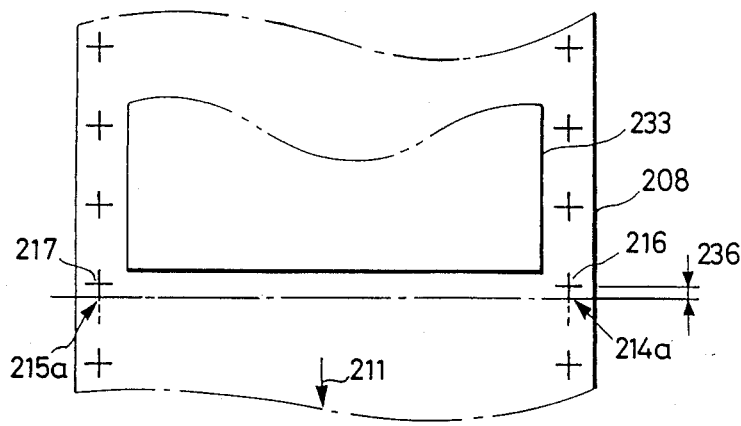
FIGS. 20, 21, 22, and 23 are diagrams showing image pickup points on a belt.

In FIG. 20, an image 233 is formed on the belt 208. Cross-shaped registration marks 216 and 217 are continuously formed out of the image area (on both sides of the image 233) in the belt moving direction (simultaneously with the formation of the image) by the electrophotographic method. The belt 208 is conveyed in the direction of the arrow 211 in the diagram.

In response to a sequence signal from the sequence controller, the image pickup devices 214 and 215 pickup the registration marks 216 and 217 at the timings when these registration marks should inherently pass through the (fixed) image pickup points 214a and 215a. FIG. 20 shows the case where the arrival timings of the marks 216 and 217 to the image pickup points are delayed from the ideal timings. Therefore, a delay amount 236 is detected from the image pickup signals of the marks at the timings when the marks should inherently pass. On the basis of this delay amount, the phase of the DELAY(CV) signal in FIG. 18 is advanced and the value of the margin register MR(CV) is reduced, thereby setting the timing of the V-SYNC-C signal to an early point. Due to this, the chromatic aberration can be corrected.

Figure 21:
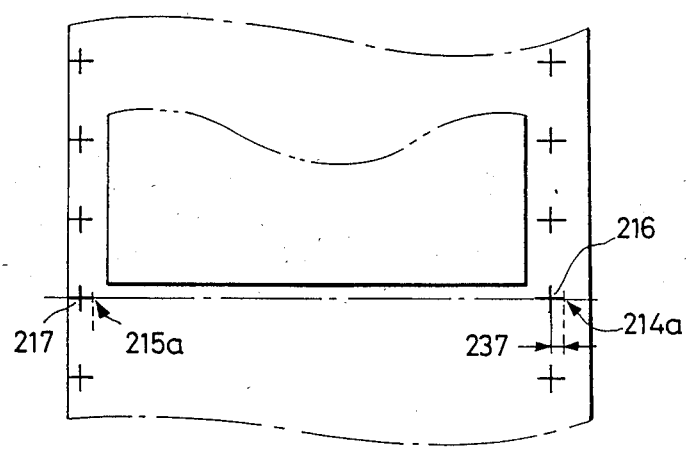

FIG. 21 shows the case where the image 233 is laterally deviated for the belt 208.

In this case, a lateral deviation amount 237 between the image pickup point 214a and the registration mark 216 is detected by the signals from the image pickup devices. On the basis of this lateral deviation amount, the value of the register MR(CH) is reduced by the DELAY(CH) signal, thereby setting the timing of the H-SYNC-C signal to an early point. Thus, the lateral deviation can be corrected.

Figure 22:
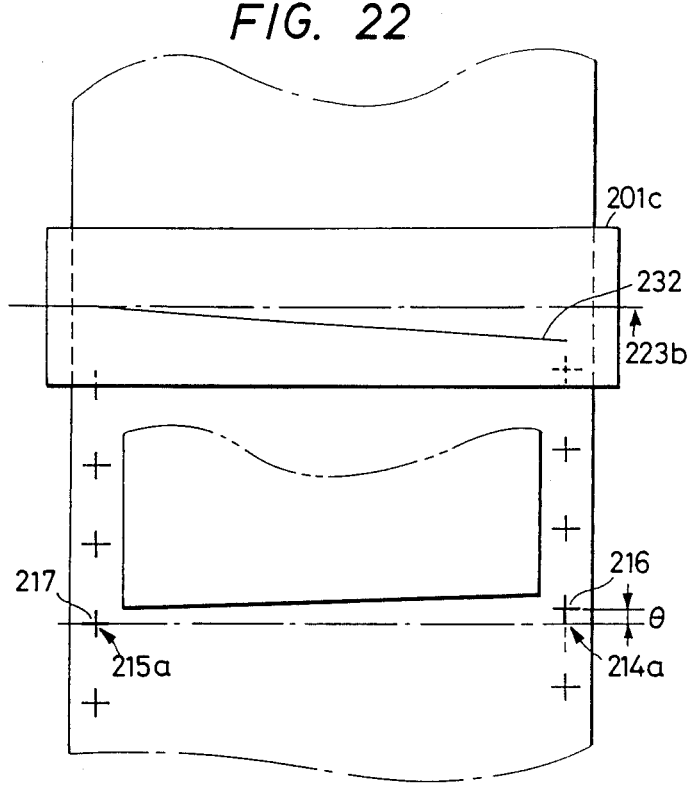

FIG. 22 shows the case where the center line of the drum 201c does not coincide with the optical scan line 232 but is inclined.

In this case, an inclination angle $\theta$ between the registration marks 216 and 217 is detected by the signals from the image pickup devices. The scan line 232 is rotated in the direction of an arrow 223b by the amount of the detected angle $\theta$. That is, in FIG. 19, by rotating the pulse motor 222 and moving the shaft 222b backward, the center line of the drum 201c and optical scan line 232 can be made coincident.

Figure 23:
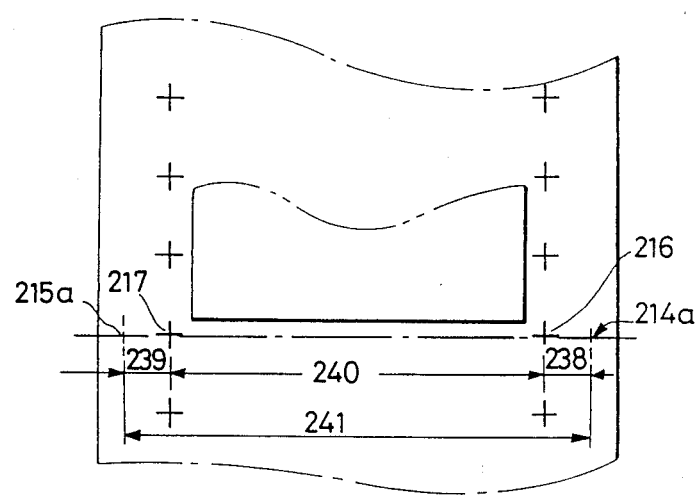

FIG. 23 shows the case where the image magnification is erroneous. In FIG. 23, deviation amounts 238 and 239 between the image pickup points 214a and 215a and the registration marks 216 and 217 are detected by the signals from the image pickup devices. On the basis of these deviation amounts, the error amounts of the image magnification are obtained as a ratio of a length 240 (an interval between the registration marks 216 and 217) and a length 241 (an interval between the image pickup points 214a and 215a).

On the basis of the ratio obtained, a similar triangle in which the ratio of a height (the optical path length 221) and a base (the image size 229) of a triangle in FIG. 19 is set to a constant value is obtained. The movement amount in the vertical direction of the optical box 206 is calculated. On the basis of the calculated value, the shaft 220b of the pulse motor 220 is rotated in the direction of the arrow 228. In this manner, the image magnification can be corrected.

The chromatic aberration of any type can be corrected as explained above. The similar correcting methods can be also used for the other colors.

In the case where one-dimensional sensors are used as the image pickup devices 214 and 215 in the foregoing embodiment, a constitution to detect outputs of these CCD sensors and to obtain the delay amounts DELAY-(YV), DELAY(MV), and DELAY(CV) shown in FIG. 18 can be embodied by a circuit similar to that in FIG. 4 and its description is omitted.

Figure 24:
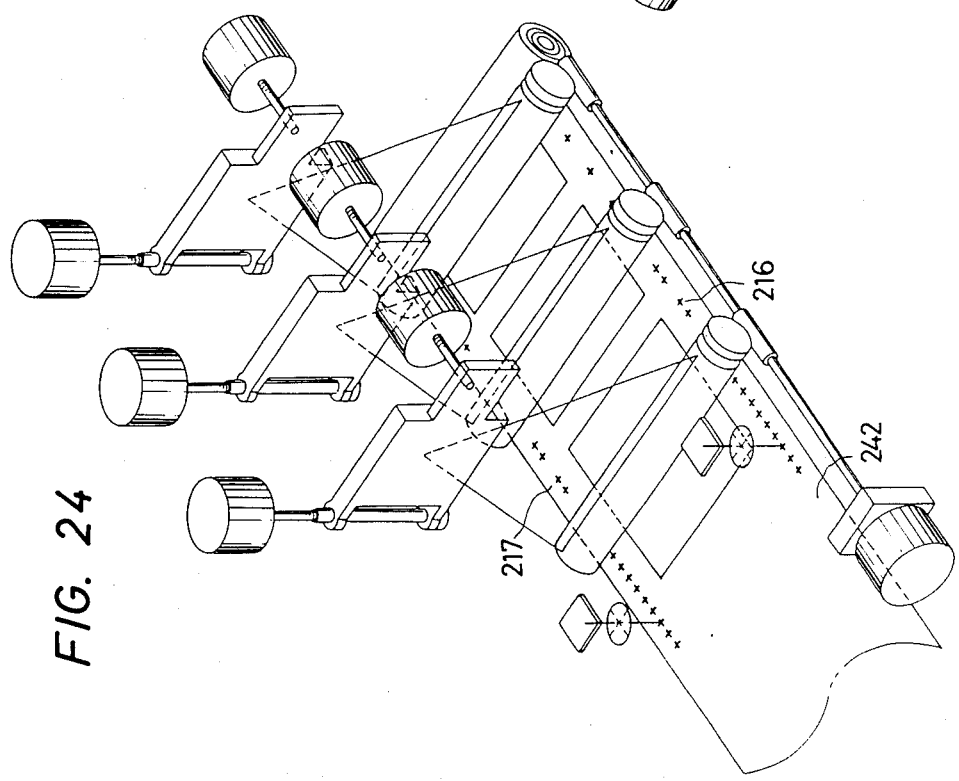

Another embodiment of the invention is shown in FIG. 24.

FIG. 24 shows an example in the case where a continuous roll paper 242 is used as a transfer material.

Although not so essentially different from the first embodiment, it is desirable to eliminate the registration marks 216 and 217 after the images were formed.

Figure 25:
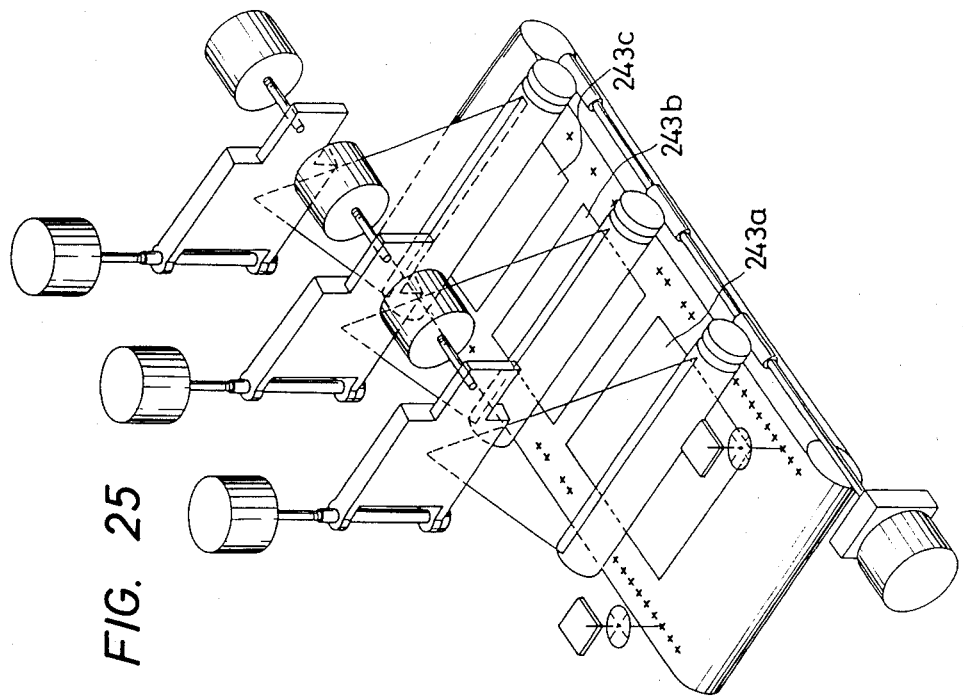
FIGS. 24 and 25 are perspective views showing other embodiments of the invention.

FIG. 25 shows still another embodiment of the invention.

In this embodiment, the belt 208 is used as a conveying device of cut sheets 243a, 243b, and 243c. It is desirable write registration marks in an area out of the image forming areas of the cut sheets 243a, 243b, and 243c.

Figure 26:
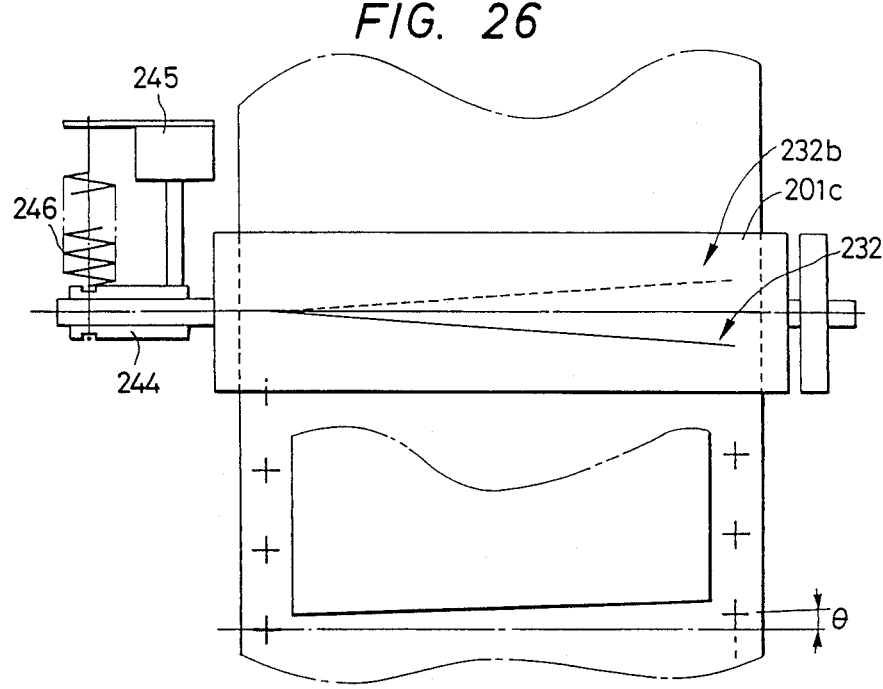
FIGS. 26 and 27 are diagrams showing practical examples of a drum supporting mechanism.
Figure 27:
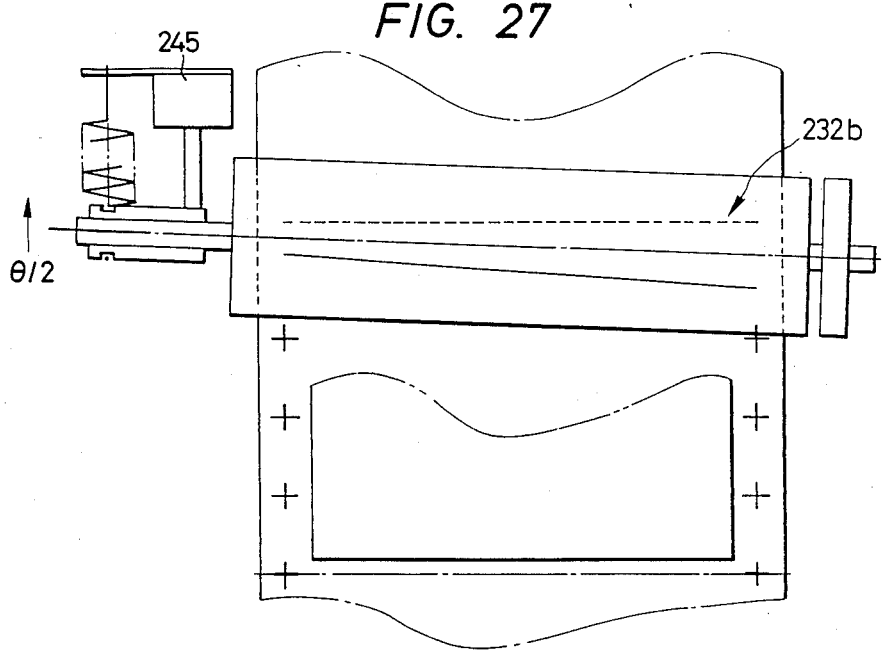

FIGS. 26 and 27 show still another embodiment of the invention.

These diagrams show a practical example of a method of supporting the drum shown in FIG. 22. The drum 201C is axially rotatably supported at one end by a bearing 244. The bearing 244 is pushed by a pulse motor 245 whose shaft is forwardly or backwardly moved. The bearing 244 is stretched by a coil spring 246 to urge it in the direction opposite to the pushing direction of the motor 245. This principle and structure are similar to the pulse motor 222 and coil spring 231 shown in FIG. 19.

When the scan line 232 is inclined as shown in FIG. 26, at the transfer position, a line corresponding to the scan line 232 is as shown at 232b, so that the deviation angle $\theta$ is measured at the image pickup position of the registration mark.

In this case, as shown in FIG. 27, by rotating the center line of the drum by the angle of $\theta/2$ by driving the pulse motor 245, the line 232b at the transfer position is accurately set to be perpendicular to the image moving direction. The image registration marks are set to the correct position.

Although the laser and polygon scanner have been used in the embodiment, the invention is not limited to them. For example, the invention can be also applied to the case where an original image is formed as shown in Japanese Examined Patent Publication (Kokoku) No. 55-6225. On the other hand, a liquid crystal shutter array, an LED array, or an ion beam modulation charging device can be also used.

The invention is not limited to the color image forming apparatus but can be also applied to a monochromatic printer which requires a high accuracy.

According to the invention, all of the distortions and errors of the images formed can be always continuously corrected. Particularly, the chromatic aberration in a color image forming apparatus can be remarkably reduced.

An explanation will now be made with respect to an embodiment to obtain an image forming apparatus in which when a positional deviation of the registration marks is detected, a predetermined signal output which is generated every image sequence of an image forming station is used as a reference detecting timing for the registration mark positional deviation which is detected by the detecting means, and the positional deviation of the image is corrected, so that the reference position of each registration mark image which is formed by each image forming station can be always set to a constant position and the correcting accuracy of the image positional deviation can be remarkably improved.

In this embodiment, the correcting means obtains the relative difference between the output timing of a predetermined reference signal which is generated every image sequence of each image forming station and the detecting timing of each registration mark image which is successively detected by the detecting means, thereby correcting the image positional deviation which is peculiar to each image forming station in accordance with this relative difference.

Figure 28:
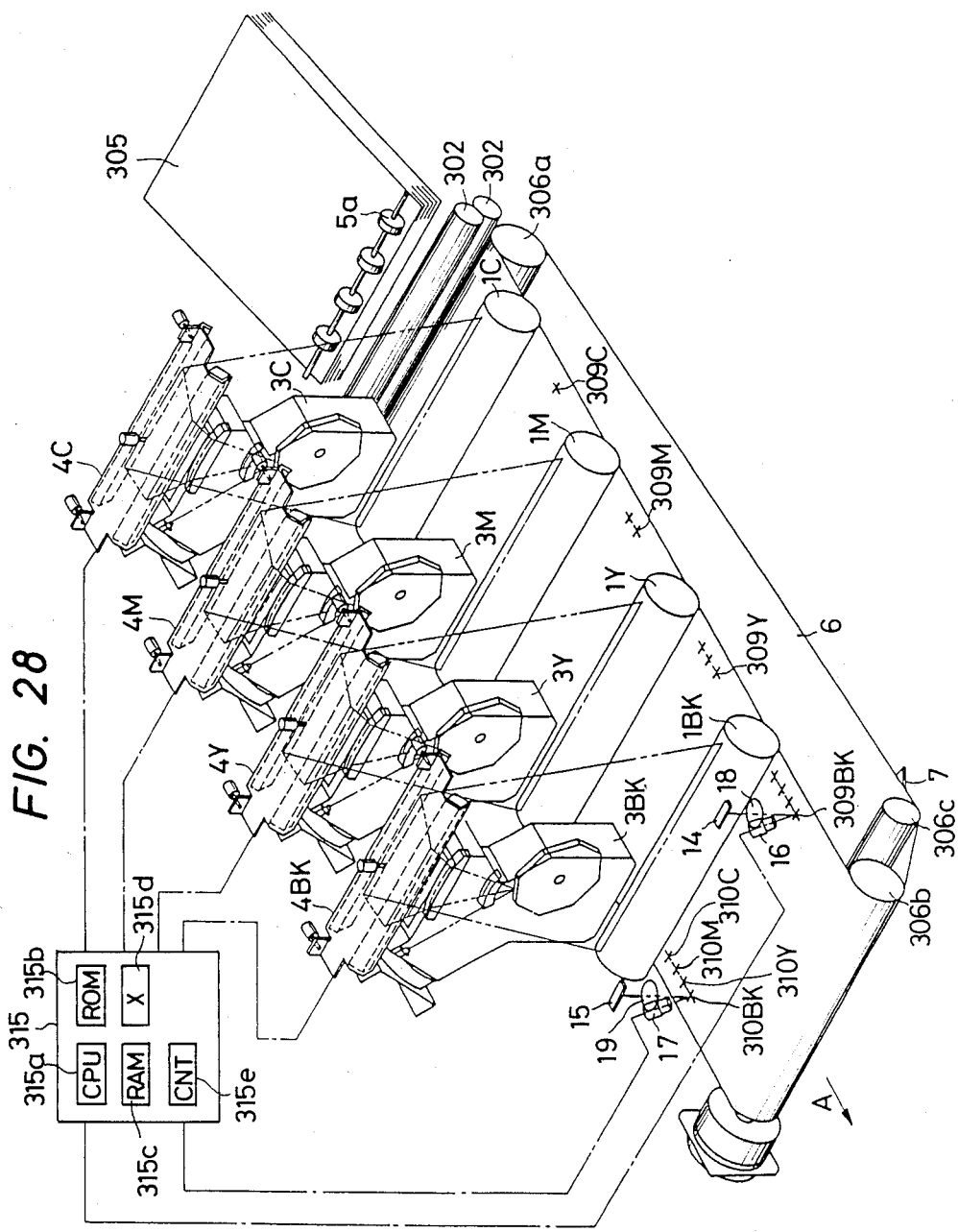
FIG. 28 is a perspective view for explaining a structure of an image forming apparatus showing still another embodiment of the invention.

FIG. 28 is a perspective view for explaining a constitution of an image forming apparatus showing the foregoing embodiment. In FIG. 28, the parts and components having the same functions as those in FIG. 1 are designated by the same reference numerals and their descriptions are omitted.

In FIG. 28, reference numeral 305 denotes a transfer paper which is fed into the main unit by driving paper feed rollers 305a and registration (resist) rollers 302. The transfer paper 305 is conveyed in the direction of the arrow A by a conveying belt 6 which is circulatingly conveyed by driving conveying rollers 306a and 306b. Similarly to FIG. 1, the conveying belt 6 is conveyed in the direction of the arrow A at a constant velocity P (mm/sec).

The conveying device is not limited to the conveying belt 6 but an intermediate transfer device, a roll paper, cut papers, or the like may be also used.

The mark detectors 14 and 15 sequentially detect the marks transferred at predetermined positions on the conveying belt 6 on the most downstream side and send the detected registration mark image data to a controller 315, which will be explained hereinafter. The controller 315 also functions as the correcting means in the embodiment and forms the correction data to correct the positional deviation, magnification deviation, and inclination of scan line of each image forming station on the basis of each registration mark image data which is output from the mark detectors 14 and 15 and the reference registration mark image data which is previously stored. Then, the controller 315 outputs drive commands to drivers to drive actuators, which will be explained hereinlater, thereby correcting the positional deviation, magnification deviation, and inclination of scan line of each image forming staion.

The controller 315 comprises: a CPU 315a; an ROM 315b; an RAM 315c, an oscillator 315d; a counter 315e; and the like. The controller 315 compares each of the registration mark image data which are output from the mark detectors 14 and 15 with the reference registration mark image data stored in the ROM 315b synchronously with the output timings of predetermined reference signals which are generated every image sequence of each image forming station: these reference signals include, for instance, rotation drive signals (registration roller rotation start signals, which will be explained hereinafter) of the registration rollers 302 to obtain the image edge synchronization among the transfer material which is conveyed by the conveying belt 6 and the respective photo sensitive drums 1C, 1M, 1Y, and 1BK; a feed start signal of paper feed rollers 305a to feed the transfer material into the main unit; image writing signals to the photo sensitive drums 1C, 1M, 1Y, and 1BK; an edge passing signal of the transfer material to be fed; and the like. Then, the controller 315 detects the relative image positional deviation in each image forming station and calculates the positional deviation correction amount which is peculiar to each image forming station.

The positional deviation correcting process corresponding to the calculated positional deviation correction amount is performed to each image forming station. For example, the controller 315 controls the driving timings of the actuators, which will be explained hereinafter, and the timings to start the adjustment of the top and left margins.

Registration mark images 309C, 309M, 309Y, and 309BK are transferred to the edge portions of the conveying belt 6 at regular intervals in almost parallel with the belt conveying direction.

Registration mark images 310C, 310M, 310Y, and 310BK are transferred to the edge portions of the conveying belt 6 at regular intervals in almost parallel with the belt conveying direction as shown in the diagram.

Figure 29:
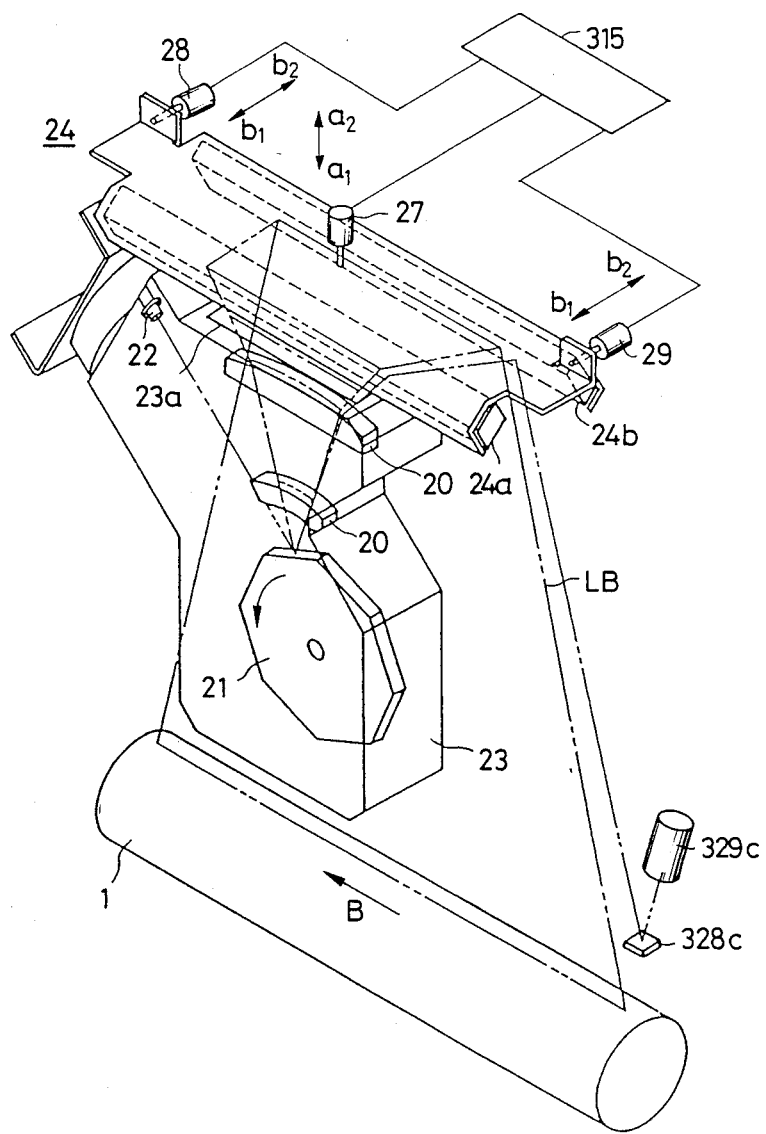
FIG. 29 is a respective view for explaining an arrangement& relation between a scan mirror and an optical scan system shown in FIG. 28.

FIG. 29 is a perspective view for explaining arrangement and structure of the scan mirror and optical scan system shown in FIG. 28. In FIG. 29, the same parts and components as those shown in FIG. 2 are designated by the same reference numerals.

In FIG. 29, a beam scan mirror 328c leads a laser beam LB which is scanned immediately before the image area to a beam detector 329c. The beam detector 329c generates a horizontal sync signal BDC to determine the writing timing in the main scanning direction of the photo sensitive drum 1 for, e.g., cyan. By adjusting the transmission timing of the horizontal sync signal BDC, the left margin can be adjusted.

In this embodiment, the 4-drum type full color printer separately has the reflector 24 and the actuator mechanism to adjust the position of the reflector 24. THe inclination of scan line and the magnification difference based on the optical path length difference, and the top and left margins are individually independently corrected every image holding device as each image forming means in the photo sensitive drums 1C, 1M, 1Y, and 1BK, thereby eliminating the chromatic aberration among the respective color toners which are sequentially transferred onto the transfer material S.

Figure 30:
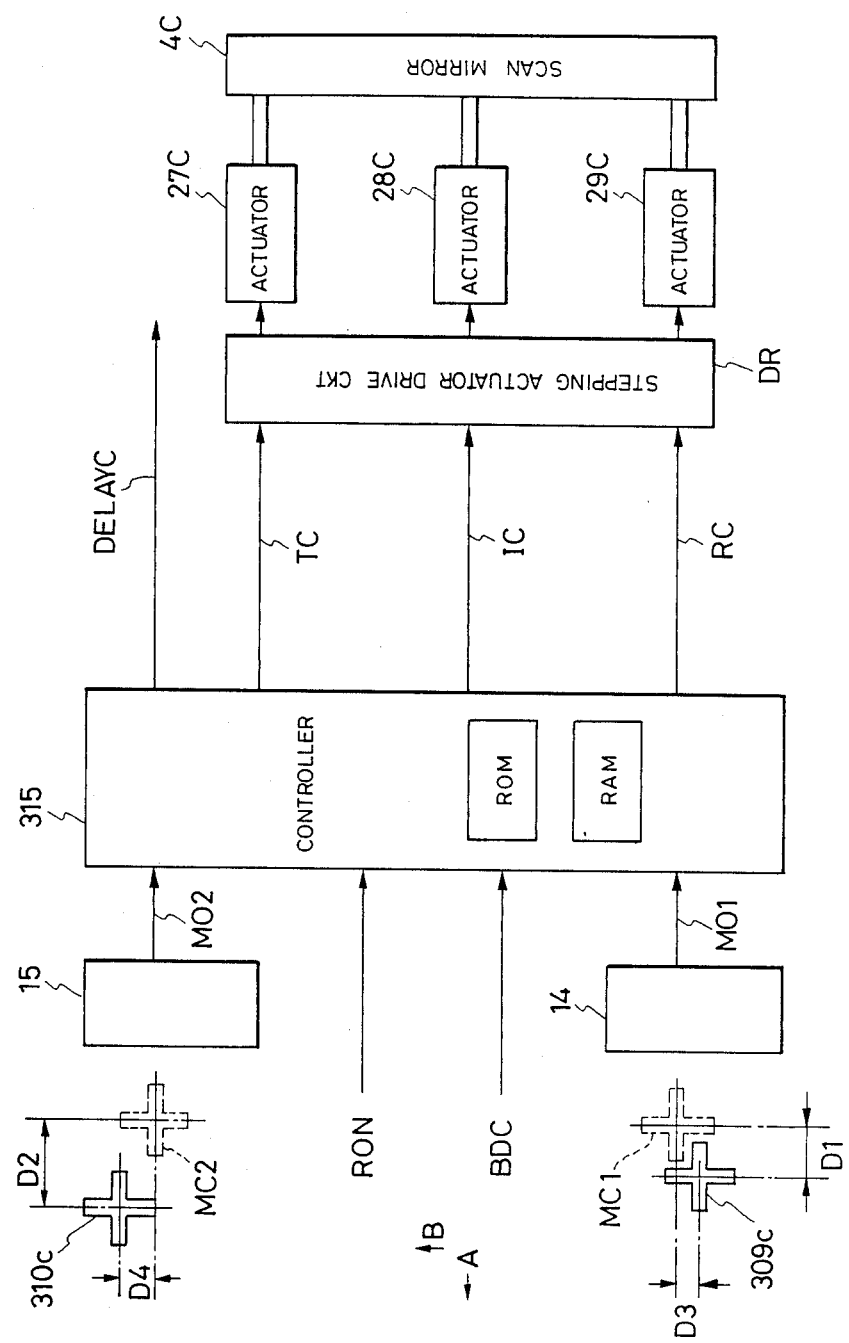
FIG. 30 is a block diagram for explaining a process to correct the image positional deviation by a controller shown in FIG. 28.

FIG. 30 is a block diagram for explaining the image positional deviation correcting processes by the controller 315 shown in FIG. 27. In the diagram, the same parts and components as those shown in FIG. 27 are designated by the same reference materials. Although the cyan image forming station has been described as an example for convenience of explanation, the similar constitution are also used with regard to the other colors of magenta, yellow, and black.

In this diagram, RON denotes a registration (resist) roller rotation start signal (registration roller drive signal). The signal RON is output when the drive of the registration (resist) rollers 302 shown in FIG. 28 is started. BDC denotes a BD signal for cyan. The signal BDC is output when the laser beam LB which is input through the beam scan mirror 328c is detected by the beam detector 329c.

For example, when the laser beam LB from the laser light source 22 in the cyan image forming station is detected by the beam detector 329c, the BD signal BDC is output from the beam detector 329c to the controller 315. By using the BD signal BDC as a reference, the scan of the laser beam LB to the photo sensitive drum 1C in the main scanning direction (the direction of the arrow B shown in FIG. 29) is started.

On the basis of the control program stored in the ROM 315b in the controller 315, the registration mark images 309C and 310C are formed and transferred to predetermined areas on the conveying belt 6 which is conveyed at a constant velocity at a predetermined timing in response to the registration roller drive signal RON. The transferred registration mark images 309C and 310C are sequentially conveyed in the direction of the arrow A and read by the mark detectors 14 and 15 (shown in FIG. 30) arranged in the downstream side of the photo sensitive drum 1BK. The registration mark image data (reference marks $MC_1$ and $MC_2$ indicated by broken lines in FIG. 30) for cyan which are used as reference data to read are previously stored in the controller 315.

The controller 315 stores the registration mark image data regarding the registration mark images 309C and 310C (e.g., the cross-shaped marks) read out by the mark detectors 14 and 15 into, e.g., an image memory for cyan synchronously with a predetermined reference clock from the output timing of, for example, the registration roller drive signal RON, thereby obtaining the central pixel position in the main scanning direction and the central pixel position in the sub scanning direction. Central pixel differences $D_1$ and $D_2$ between the central pixels $A_1$ and $A_2$ obtained in the main scanning direction and the reference marks $MC_1$ and $MC_2$ are derived. Further, central pixel differences $D_3$ and $D_4$ between the central pixels $B_1$ and $B_2$ obtained in the sub scanning direction and the reference marks $MC_1$ and $MC_2$ are calculated.

Thus, the controller 315 recognizes the left margin deviation amount as the central pixel difference $D_3$ and also recognizes the top margin deviation amount as the central pixel difference $D_1$. Further, the controller 315 recognizes the inclination amount of scan line from the subtracted value $(D_2-D_1)$ of the central pixel differences $D_2$ and $D_1$ and also recognizes the magnification difference from the subtracted value $(D_4-D_3)$ of the central pixel differences $D_4$ and $D_3$.

In order to correct the left margin in accordance with the central pixel differences $D_1$ and $D_3$ and the subtracted values $(D_2-D_1)$ and $(D_4-D_3)$, the controller 315 outputs a left margin control output DELAYC so as to set off the central pixel difference $D_3$ after the BD signal BDC was input. When the beam detector 329c detects the laser beam LB, the image writing timing regarding the image data for cyan stored in the image memory is delayed, thereby correcting the left margin position to a preset position.

On the other hand, with respect to the top margin deviation, actuators 28C and 29C are driven in accordance with the central pixel difference $D_1$. A top margin control output TC (a step amount to set off the central pixel difference $D_1$) to adjust the top margin to the central pixel of the reference mark $MC_1$ is output to a stepping motor actuator drive circuit DR. Thus, the actuators 28C and 29C move a scan mirror 4C forwardly and backwardly in the horizontal direction by the same distance, thereby correcting the top margin.

Moreover, with regard to the inclination of scan line, the actuators 28C and 29C are driven in accordance with the subtracted value $(D_2-D_1)$ and an inclination control output IC (a step amount to set off the subtracted value $(D_2-D_1)$) is output to the stepping motor actuator drive circuit DR so as to make the inclination of scan line coincide with a preset reference axial line. Thus, the actuators 28C and 29C move the scan mirror 4C forwardly and backwardly in the horizontal direction by the different distances, thereby correcting the scan line inclination.

On the other hand, with regard to the magnification difference, an actuator 27C is driven in accordance with the subtracted value $(D_4-D_3)$ and a magnification control output RC (a step amount to set off the subtracted value $(D_4-D_3)$) is output to the drive circuit DR so as to make the image magnification coincide with a preset magnification. Thus, the actuator 27C vertically moves the scan mirror 4C and adjusts the optical path length of the laser beam from the laser light source 22, thereby correcting the image magnification.

The operation of FIG. 30 will now be further described with reference to FIG. 31.

Figure 31:
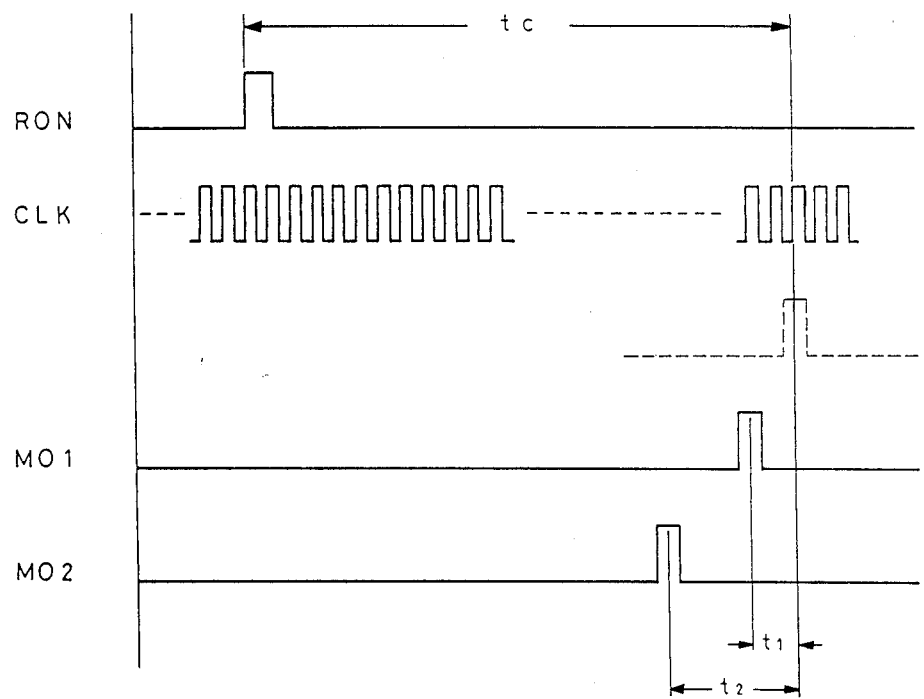
FIG. 31 is a timing chart for explaining the operation of FIG. 30.

FIG. 31 is a timing chart for explaining the operation of FIG. 30.

In the diagram, RON denotes the registration (resist) roller rotation start signal. The counting of reference clocks CLK which are generated from the oscillator 315d is started synchronously with the signal RON. $t_c$ denotes a detection period of time for, e.g., cyan and corresponds to the time from the generation of the signal RON to the time point of the count-up of the counter 315e to count the reference clocks CLK. After the elapse of this detection period of time $t_c$, if the mark detectors 14 and 15 detect the registration mark images 309C and 310C, this means that no image positional deviation occurs. In other words, the time period $t_c$ corresponds to the time interval after the input of the registration roller rotation start signal RON until the detection of the reference marks $MC_1$ and $MC_2$ shown in FIG. 30. $MO_1$ indicates a mark detection output which is generated when the mark detector 14 reads the registration mark image 309C. $MO_2$ represents a mark detection output which is generated when the mark detector 15 detects the registration mark image 310C.

As will be understood from this diagram, for example, if the image positional deviation occurs in the image forming station for cyan having the photo sensitive drum 1C, after the elapse of the detection time period $t_c$ after the input of the signal RON, the imaginary reference marks $MC_1$ and $MC_2$ shown in FIG. 30 cannot be detected. As shown in FIG. 31, a variation occurs in timings when the mark detectors 14 and 15 actually detect the registration mark images 309C and 310C. To prevent this variation, the central pixel differences $D_1$ and $D_3$ shown in FIG. 30 are calculated from time differences $t_1$ and $t_2$ shown in FIG. 31. A correction control signal to correct the image positional deviation from the central pixel differences $D_1$ and $D_2$, for example, the top margin control output TC is output to the drive circuit DR. Thus, the top margin is corrected and arranged to the normal position.

In this manner, by starting the detection of the positional deviation amount of each image forming station synchronously with, e.g., the rotation driving timing of the registration rollers 302, the images of all of the colors can be corrected without any distortion as compared with the conventional correction such that the registration mark positions of either one of the image forming stations are used as reference positions. The width from the edge of the transfer paper to be conveyed to the image edge can be also set to the same value in each image forming station. The image transfer start positions for the transfer papers can be accurately made coincident.

Figure 32:
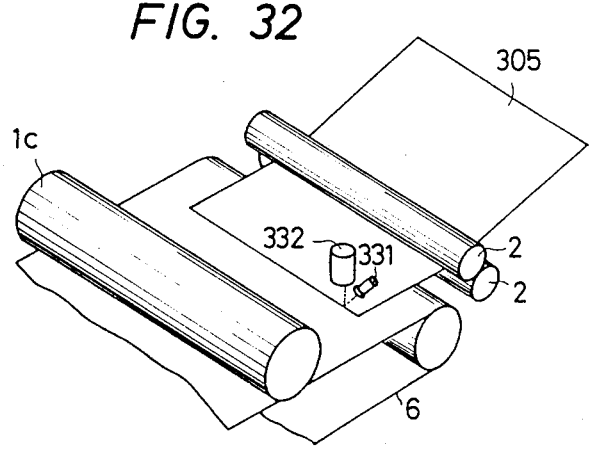
FIG. 32 is a perspective view of the main section for explaining a structure of an image forming apparatus showing still another embodiment of the invention.

The embodiment has been described with respect to the case where the image positional deviation is detected synchronously with the registration roller rotation start signal RON as shown in FIG. 30. However, as shown in FIG. 32, detecting means for detecting the front edge of the transfer paper, for instance, a detecting unit 332 consisting of a lamp 331 and a photodiode is arranged between the registration (resist) rollers 302 and the photo sensitive drum 1C. The front edge of the transfer paper 305 fed is detected. The detection period of time $t_c$ can be also determined synchronously with this detection signal.

Figure 33:
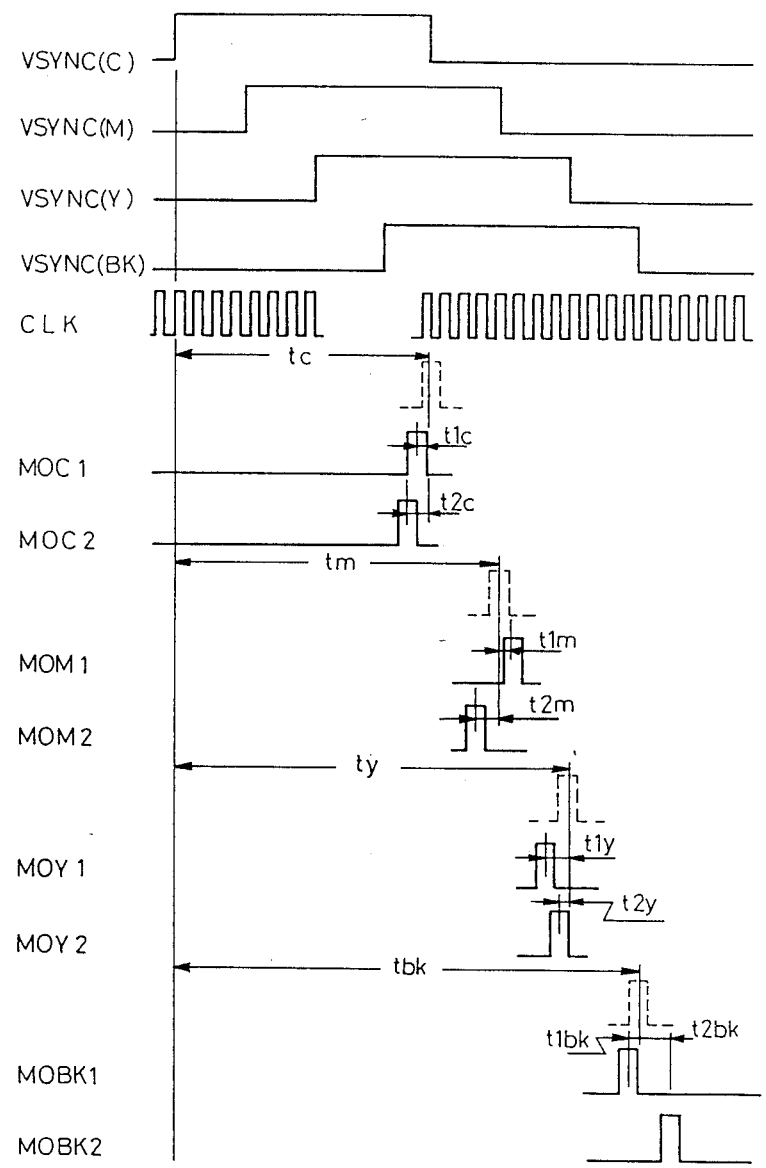
FIG. 33 is a timing chart for explaining the operation of the image forming apparatus showing another embodiment of the invention.

As shown in FIG. 33, among image writing signals VSYNC(C), VSYNC(M), VSYNC(Y), and VSYNC(BK) in each image forming station, the image writing signal VSYNC(C) is used as a reference, and detection forming station are set. The relative differences between the set detection periods of time and the periods of time $t_c$, $t_m$, $t_y$, and $t_{bk}$ of each image time intervals until detection timings $t_{1c}$, $t_{2c}$, $t_{1m}$, $t_{2m}$, $t_{1y}$, $t_{2y}$, $t_{1bk}$, and $t_{2bk}$ (corresponding to mark detection outputs $MOC_1$, $MOC_2$, $MOM_1$, $MOM_2$, $MOY_1$, $MOY_2$, $MOBK_1$, and $MOBK_2$) of the registration mark images 309C, 310C, 309M, 310M, 309Y, 310Y, 309BK, and 310BK which are sequentially detected by the mark detectors 14 and 15 are detected. In this way, the positional deviation of each image forming station can be detected. The reference image writing signal can be arbitrarily set to either one of the image writing signals VSYNC(C), VSYNC(M), VSYNC(Y), and VSYNC(BK).

Further, even when the feeding timing for the paper feed rollers 305a shown in FIG. 28 is set to the reference signal of the detection period of time mentioned above, the positional deviation of each image forming station can be also detected in a manner similar to the above.

By detecting the positional deviation by setting an arbitrary output signal as a reference among the output signals which are generated every image forming sequence of each image forming station, the positional deviation of each image forming station can be detected without a variation.

As described above, according to the embodiment, there is provided the correcting means for correcting the positional deviation of each image forming station in accordance with the relative difference between the output timing of a predetermined reference signal which is generated every image forming sequence of each image forming station and the detection timing of each registration mark image which is successively detected by the detecting means. Therefore, as compared with the method whereby the image positional deviation is detected by detecting the relative difference between an arbitrary transferred registration mark image and another registration mark image, a detection variation is eliminated. The reference detection timing can be always set to a constant timing. The amount of positional deviation can be accurately detected in accordance with this detection timing and each registration mark image detection timing which is output from the detecting means. Therefore, the correcting accuracy of the image positional deviation associated with the detected positional deviation can be also improved. There is an excellent advantage such that a clear color image without an image positional deviation can be always output or the like.

Figure 51:
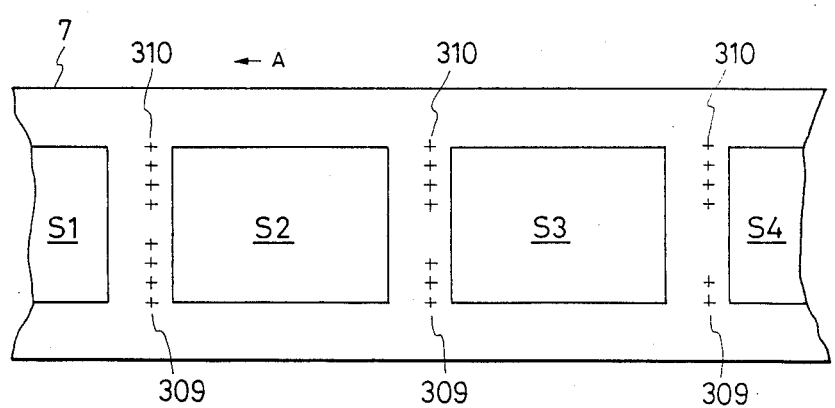
FIG. 51 is a plan view for explaining an example of a registration mark image transfer for explaining another embodiment of the invention.

In the foregoing embodiment, as shown in FIGS. 1, 23, 26, and 28, the marks have been written in the outside of the transfer material. Still another embodiment in which marks are written between the transfer materials as shown in FIG. 51 will now be explained.

Figure 34:
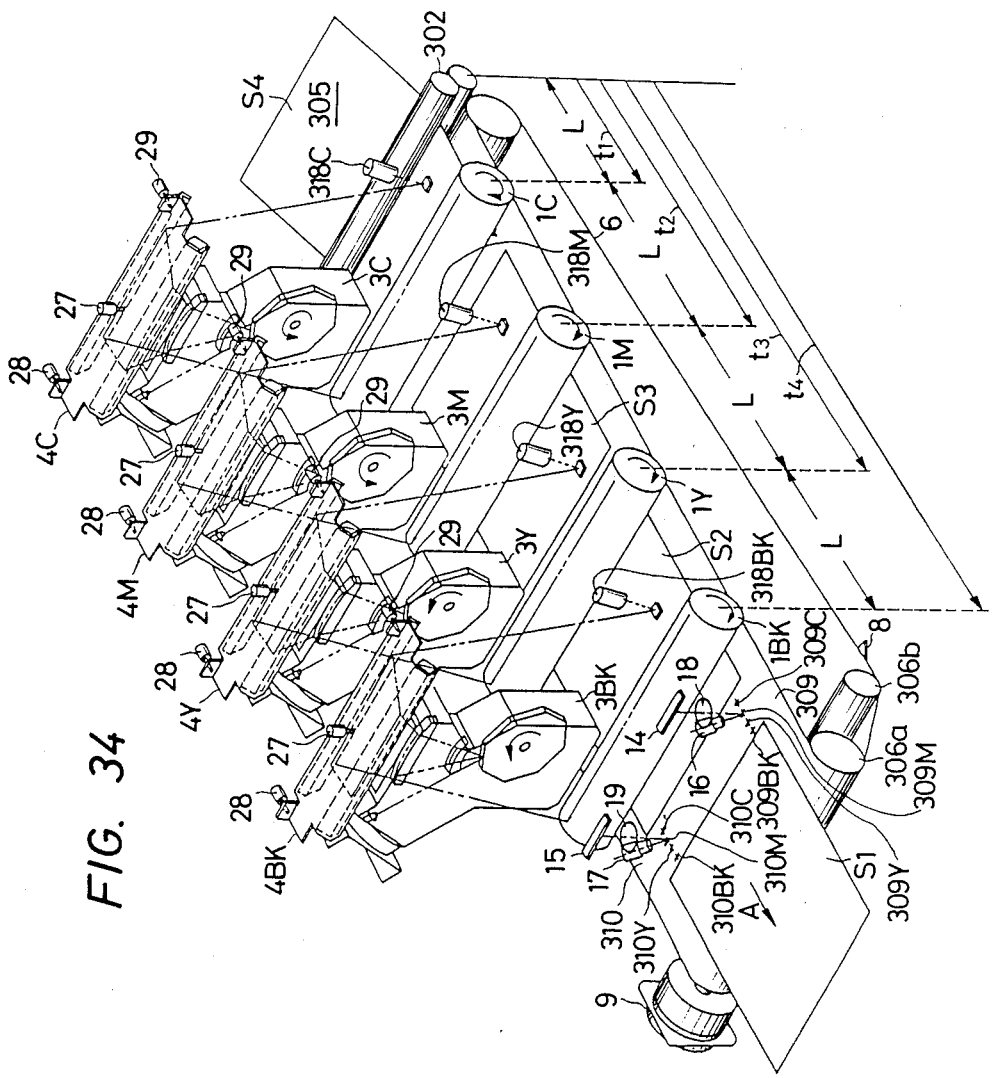
FIG. 34 is a perspective view for explaining a structure of an image forming apparatus showing still another embodiment of the invention.

FIG. 34 is a perspective view showing a structure of an image forming apparatus according to such an embodiment. In the diagram, the parts and components having the same functions as those in FIG. 28 are designated by the same reference numerals and their descriptions are omitted.

In this embodiment, the registration mark images 310C, 310M, 310Y, and 310BK are transferred onto the conveying belt 6 at regular intervals in almost parallel with the belt conveying direction as illustrated in the diagram. The registration mark images 310C, 310M, 310Y, and 310BK are accurately transferred every time or as necessary among transfer papers $S_0$ to $S_4$ which are continuously conveyed on the conveying belt 6 on the basis of the timing management of a synchronizing circuit (also serving as mark transfer means in the invention), which will be explained hereinafter. Further, the mark detector 15 outputs the image data corresponding to the detected registration mark images 310C, 310M, 310Y, and 310BK to a positional deviation correction processing circuit, which will be explained hereinafter.

In FIG. 34, $t_1$ to $t_4$ denote periods of time which are required to form the registration mark images 309C, 309M, 309Y, 309BK, 310C, 310M, 310Y, and 310BK onto the photo sensitive drums 1C, 1M, 1Y, and 1BK by using the rotation of the registration rollers 302 as a reference.

Reference numerals 318C, 318M, 318Y, and 318BK denote beam detectors (BK sensors) consisting of, e.g., photodiodes. These beam detectors receive the laser beams to be scanned from the scan optical devices 3C, 3M, 3Y, and 3BK just before the image writing areas and output BD signals BDC, BDM, BDY, and BDBK to determine the writing positions in the horizontal direction of the photo sensitive drums 1C, 1M, 1Y, and 1BK to the sync circuits, which will be explained hereinlater.

Transfer sequence processes of the registration mark images 309C, 309M, 309Y, 309BK, 310C, 310M, 310Y, and 310BK shown in FIG. 34 will not be described with reference to FIGS. 35 to 37.

Figure 35:
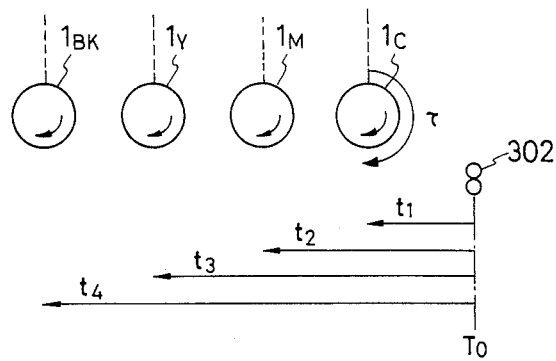
FIG. 35 is a perspective view for explaining an arrangement relation between a scan mirror and an optical scan system shown in FIG. 34.

FIG. 35 is a diagrammatical view for explaining the image transfer timings on the drums 1C, 1M, 1Y, and 1BK shown in FIG. 34. In the diagram, the same parts and components as those shown in FIG. 34 are designated by the same reference numerals.

In FIG. 35, $T_0$ denotes transmission timing. The registration rollers 302 are driven synchronously with the transmission timing $T_0$. Broken lines in the diagram show laser beams which are irradiated onto the photo sensitive drums 1C, 1M, 1Y, and 1BK. $\tau$ represents a (constant) transfer area arrival time corresponding to the period of time until the laser beam irradiating position reaches the transfer area.

Figure 36:
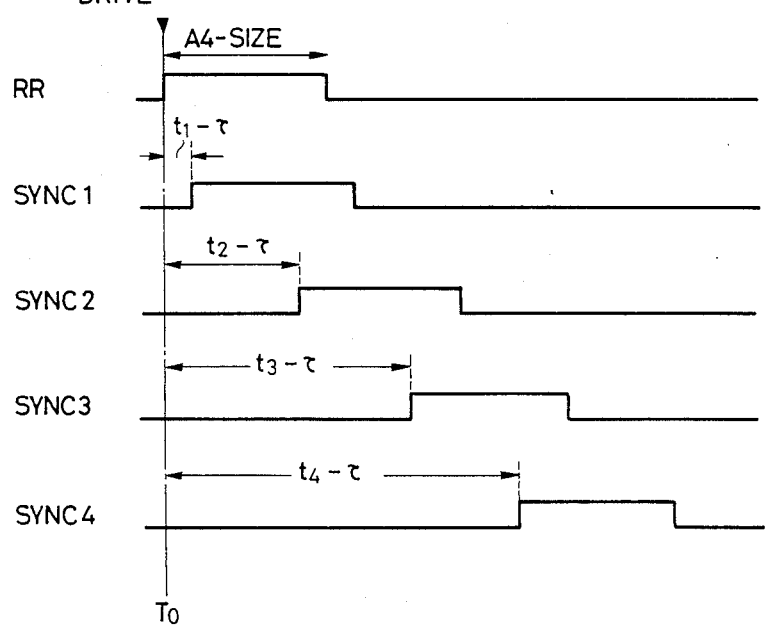
FIG. 36 is a block diagram for explaining the synchronizing process to determine image writing timings for photo sensitive drums shown in FIG. 34.

FIG. 36 is a diagrammatical view for explaining the image writing timings on the drums 1C, 1M, 1Y, and 1BK shown in FIG. 34. In FIG. 36, the same elements as those in FIG. 34 are designated by the same reference numerals.

In FIG. 36, $t_1 - \tau$ denotes a counting time which is counted by a counter CNT 310, which will be explained hereinafter, synchronously with a leading edge of a registration signal RR. After completion of the counting by the counter CNT 310, a laser write signal $SYNC_1$ based on the image signal for cyan is set to the high level.

$t_2\tau$ represents a counting time which is counted by a counter CNT 320, which will be explained hereinlater, synchronously with a leading edge of the registration signal RR. After completion of the counting by the counter CNT 320, a laser write signal $SYNC_2$ based on the image signal for magenta is set to the high level.

$T_3 - \tau$ denotes a counting time which is counted by a counter CNT 330 (consisting of counters 331 and 332), which will be explained hereinlater), which will be explained hereinafter, synchronously with a leading edge of the registration signal RR. After completion of the counting by the counter CNT 330, a laser write signal $SYNC_3$ based on the image signal for yellow is set to the high level.

$t_4 - \tau$ indicates a counting time which is counted by a counter CNT 340 (consisting of counters 341 and 342), which will be explained hereinafter synchronously with a leading edge of the registration signal RR. After completion of the counting by the counter CNT 340, a laser write signal $SYNC_4$ based on the image signal for black is set to the high level.

Figure 37:
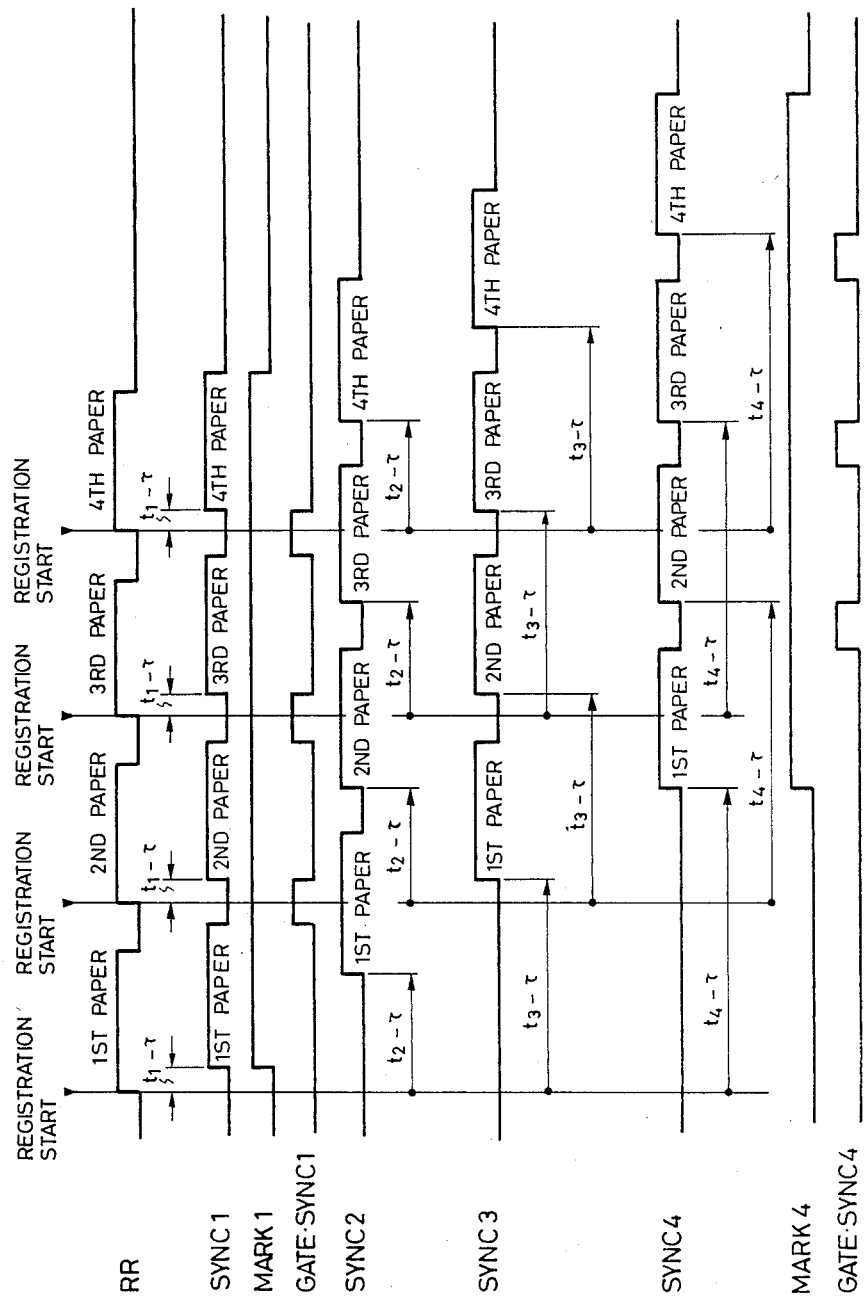
FIG. 37 is an internal circuit diagram for explaining a constitution of a sync circuit shown in FIG. 36.
Figure 46:
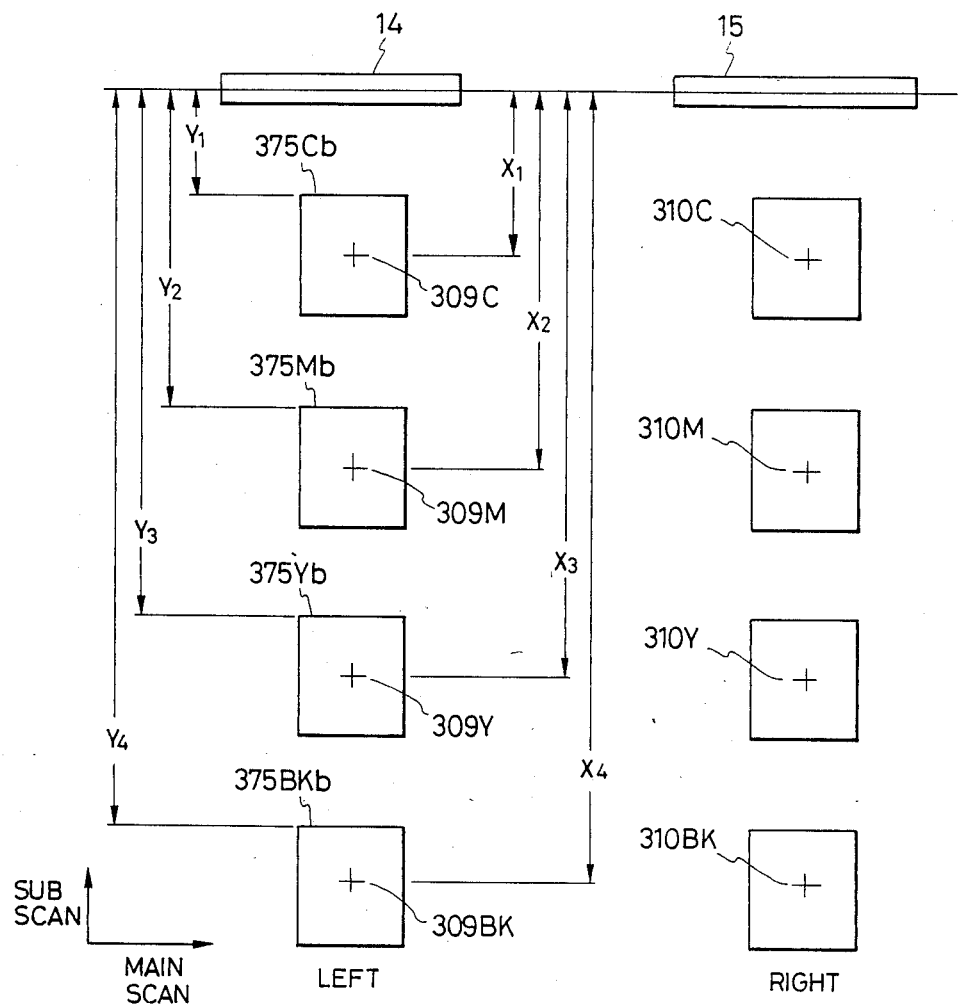
FIG. 46 is a plan view for explaining the registration difference detecting operation.

FIG. 37 is a diagrammatical view for explaining the continuous image writing timings on the drums 1C, 1M, 1Y, and 1BK. In the diagram, the same elements as those in FIGS. 34 and 46 are designated by the same reference numerals.

In FIG. 37, $MARK_1$ denotes an enable signal which is output to the sync circuit from a CPU, which will be explained hereinlater. Only when the enable signal $MARK_1$ is at the high level and the laser write signal $SYNC_1$ is at the low level, a gate signal $GATE.SYNC_1$ to determine the transfer area of the registration mark image 309C is set to the high level.

$MARK_4$ indicates an enable signal which is output to the sync circuit from the CPU, which will be explained hereinlater. Only when the enable signal $MARK_4$ is at the high level and the laser write signal $SYNC_4$ is at the low level, a gate signal $GATE.SYNC_4$ to decide the transfer area of the registration mark image 309BK is set to the high level.

Figure 38:
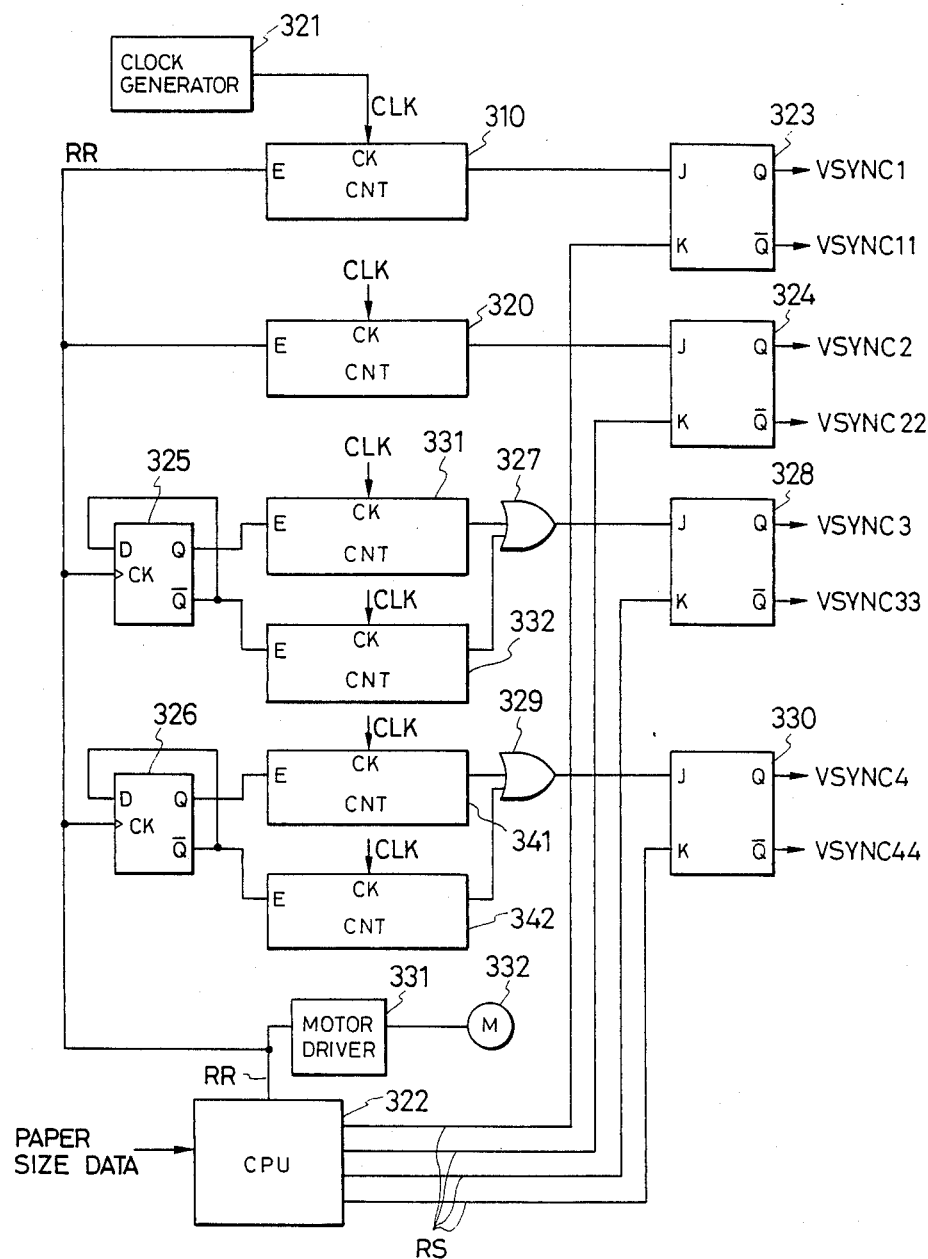
FIG. 38 is a block diagram for explaining a circuit to decide the image writing timing.

FIG. 38 is a block diagram for explaining an image writing timing determining circuit. A clock generator 321 generates the reference clocks CLK to the counters CNT 310, 320, 331, 332, 341, and 342. The counters CNT 310 and 320 start the counting of the counting times ($t_1 - \tau$) and ($t_2 - \tau$) synchronously with the registration signal RR which is output from a CPU 322 as a controller. After completion of the counting, the counters CNT 310 and 320 output a ripple carry to J input terminals of JK-type flip-flops 323 and 324. A reset signal RS is input from the CPU 322 to K input terminals of the flip-flops 323 and 324. The laser write signal (the writing timing signal) $SYNC_1$ and laser write signal $SYNC_2$ are output from Q output terminals of the flip-flops 323 and 324. Further, the inverted output signals $SYNC_{11}$ and $SYNC_{22}$ of the laser write signals $SYNC_1$ and $SYNC_2$ are transmitted from $\overline{Q}$ output terminals of the flip-flops 323 and 324. Toggle circuits 325 and 326 receive at clock ports CK the registration signal RR generated from the CPU 322 and output enable signals to make operative either the counters CNT 331 and 341 or the counters CNT 332 and 342.

Reference numeral 327 denotes an OR gate. Either one of the ripple carries of the counters CNT 331 and 332 is input to a J input terminal of a flip-flop 328 at the post stage by the OR gate 327. The flip-flop 328 outputs the laser write signal $SYNC_3$ from a Q output terminal and also outputs the inverted output signal $SYNC_{33}$ from a $\overline{Q}$ output terminal to the sync circuits, which will be explained hereinafter.

Reference numeral 329 denotes an OR gate. Either one of the ripple carries of the counters CNT 341 and 342 is input to a J input terminal of a flip-flop 330 at the post stage by the OR gate 329. The flip-flop 330 outputs the laser write signal $SYNC_4$ from a Q output terminal and also outputs the inverted output signal $SYNC_{44}$ from a $\overline{Q}$ output terminal to the sync circuits, which will be explained hereinlater.

A motor driver 331 outputs a drive signal to a registration motor 332 to drive the registration rollers 302. The CPU 322 variably sets the ON-time of the registration signal RR in accordance with the size of transfer paper which is selectively input.

For example, the transfer paper $S_1$ shown in FIG. 34 is picked up and conveyed by feed rollers (not shown) and then the timing of the image edge is adjusted by the registration rollers 302. Thereafter, the transfer paper $S_1$ is again fed by the rotation of the registration rollers 302. After the elapse of the periods of time $t_1$ to $t_4$ from the transmission timing $T_0$, the front edge of the paper reaches the corresponding photo sensitive drums 1C, 1M, 1Y, and 1BK and the transfer of each toner image is started at a timing shown in FIG. 36.

The registration rollers 302 start rotating from the transmission timing $T_0$ on the basis of the registration signal RR from the CPU 322 shown in FIG. 38. The period of time (the leading time of the registration signal RR) necessary for the transfer material $S_1$ to pass is output in accordance with the size of the transfer paper $S_1$, thereby allowing the rollers 302 to rotate for this period of time. The images are transferred from the drums 1C, 1M, 1Y, and 1BK after the delay times of $t_1$ to $t_4$ from the transmission timing $T_0$. Therefore, assuming that the period of time (the transfer area arrival time) from the laser writing position of each of the drums to the transfer position is $\tau$, the laser scan based on the image signal is started to each of the photo sensitive drums 1C, 1M, 1Y, and 1BK after the delay times of only $(t_1-\tau)$, $(t_2-\tau)$, $(t_3-\tau)$, and $(t_4-\tau)$. The images are written for only the same period of time as the drive time of the registration rollers 302.

In particular, in the case of continuously printing out the four transfer papers $S_1$ to $S_4$ as shown in FIG. 34, the image writing timings are set as shown in FIG. 37. That is, for the drums 1C and 1M, the counters CNT 310 and 320 count the counting times $(t_1-\tau)$ and $(t_2-\tau)$ by the sequence which coincides with the timings in FIG. 36, so that the write timing signals $SYNC_1$ and $SYNC_2$ are derived.

However, with regard to the photo sensitive drums 1Y and 1BK, the second transfer paper $S_2$ is sent before the counting times $(t_3-\tau)$ and $(t_4-\tau)$ of the first transfer paper $S_1$ are counted up.

Therefore, when the second transfer paper $S_2$ is fed, the counters CNT 332 and 342 start counting the counting times $(t_3-\tau)$ and $(t_4-\tau)$ of the second transfer paper. That is, by alternately counting by the counters CNT 331 and 332 and the counters CNT 341 and 342, respectively, the image writing timing signals $SYNC_3$ and $SYNC_4$ can be also derived from the circuit shown in FIG. 38 even in the case of the second or subsequent, e.g., third transfer paper.

The number of counters CNT 310 and 320 corresponding to the photo sensitive drums 1C and 1M can be set to one. However, the number of counters corresponding to the drums 1Y and 1BK is set to two, respectively. Although these numbers are determined in dependence on the paper size or intervals among the photo sensitive drums 1C, 1M, 1Y, and 1BK, by reducing the number of counters near the paper feeding side (the upstream side of the conveying path), the cost can be decreased.

In the embodiment, the counting processes of the counters CNT 310, 320, 331, 332, 341, and 342 have been started by using the registration signal RR as a reference. However, detecting means of the transfer material is provided in the upstream side than the transfer position of the first photo sensitive drum, e.g., the drum 1C and its detection output can be also used as a reference.

Further, although the counter has been used as the counting means, a CR timer can be also used.

Figure 39:
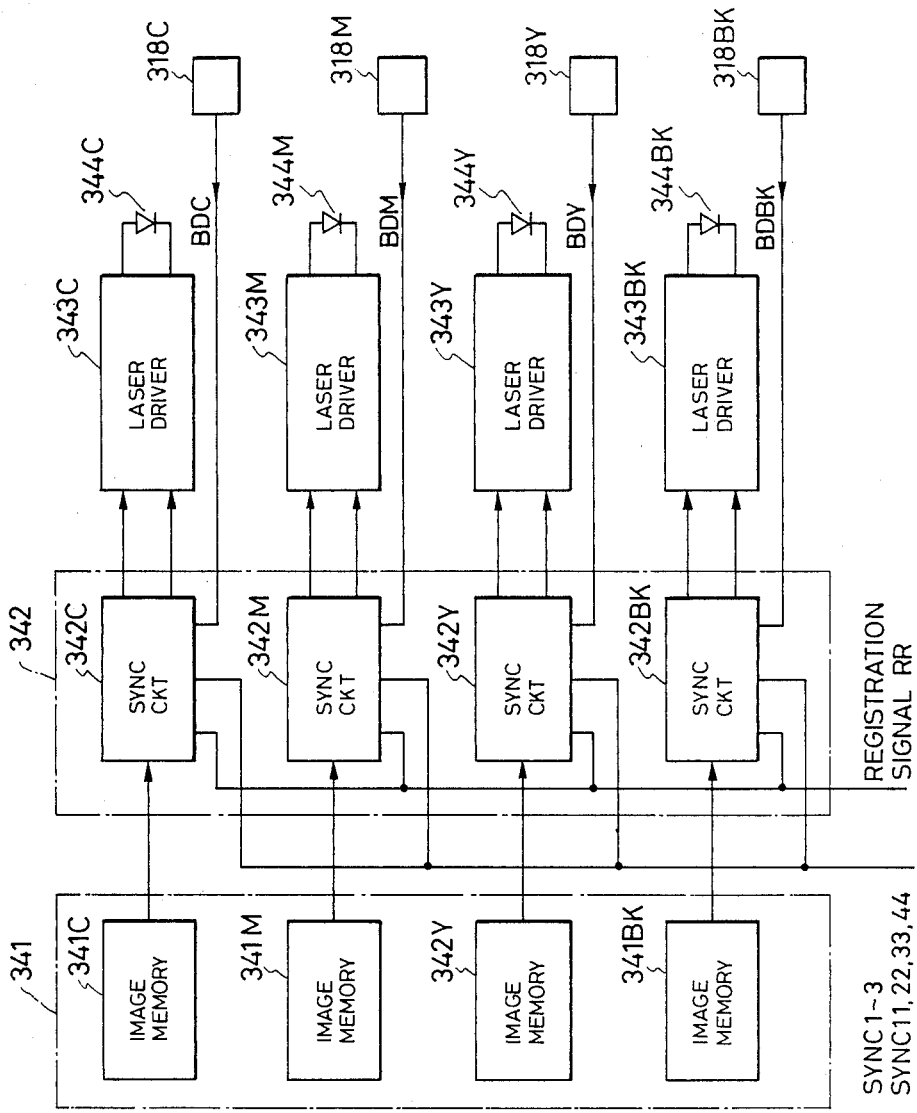
FIG. 39 is a block diagram for explaining the synchronizing process to decide image writing timings for the photo sensitive drums shown in FIG. 34.

FIG. 39 is a block diagram for explaining the synchronizing processes to determine the image writing timings on the photo sensitive drums 1C, 1M, 1Y, and 1BK shown in FIG. 34. In the diagram, the same parts and components as those in FIG. 34 are designated by the same reference numerals.

In FIG. 39, an image memory unit 341 comprises image memories 341C, 341M, 341Y, and 341BK to store the color image signals of the respective colors which are input from an external apparatus (not shown). The image memory unit 341 synchronously outputs video signals of the respective colors to synchronizing circuits 342C, 342M, 342Y, and 342BK at the post stages, respectively. These sync circuits adjust the timings for the left and top margins on the basis of: the left margin set data and top margin set data which are input from the CPU 322 shown in FIGS. 40A and 40B; the registration signal RR indicative of the driving of the registration rollers 302 shown in FIG. 34; the BD signals BDC, BDM, BDY, and BDBK which are sequentially output from the beam detectors 318C, 318M, 318Y, and 318BK; and the positional deviation amounts which are detected by the mark detectors 14 and 15. Reference numerals 344C, 344M, 344Y, and 344BK denote semiconductor lasers indicated at "22" in FIG. 29. These semiconductor lasers scan the laser beams LB onto the photo sensitive drums 1C, 1M, 1Y, and 1BK in response to drive signals from laser drivers 343C, 343M, 343Y, and 343BK.

For example, when the registration signal RR is input to the sync circuit 342C, the sync circuit 342C limits the reading operation of the video signal for cyan stored in the image memory 341C in a manner such that the blank portion from the front edge of the transfer paper S which is conveyed in accordance with preset left margin and top margin set data to the image forming area is set to be constant. By a predetermined counting process, the semiconductor laser 344C is on/off modulated in accordance with the video signal and the scan of the laser beam is started in the image forming area.

Figure 40A:
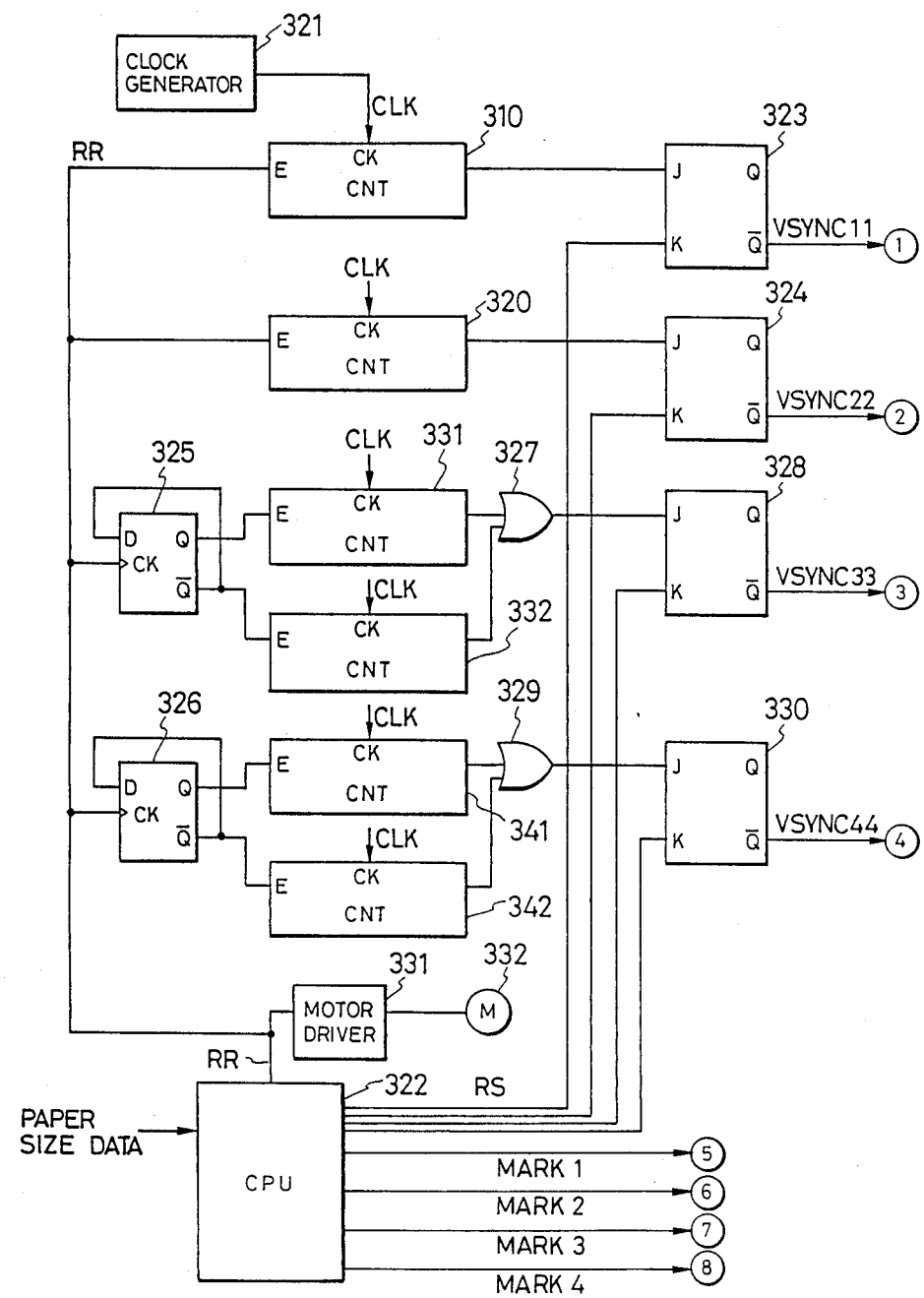
FIGS. 40A and 40B are internal circuit diagrams for explaining a constitution of a synchronizing circuit shown in FIG. 39.
Figure 40B:
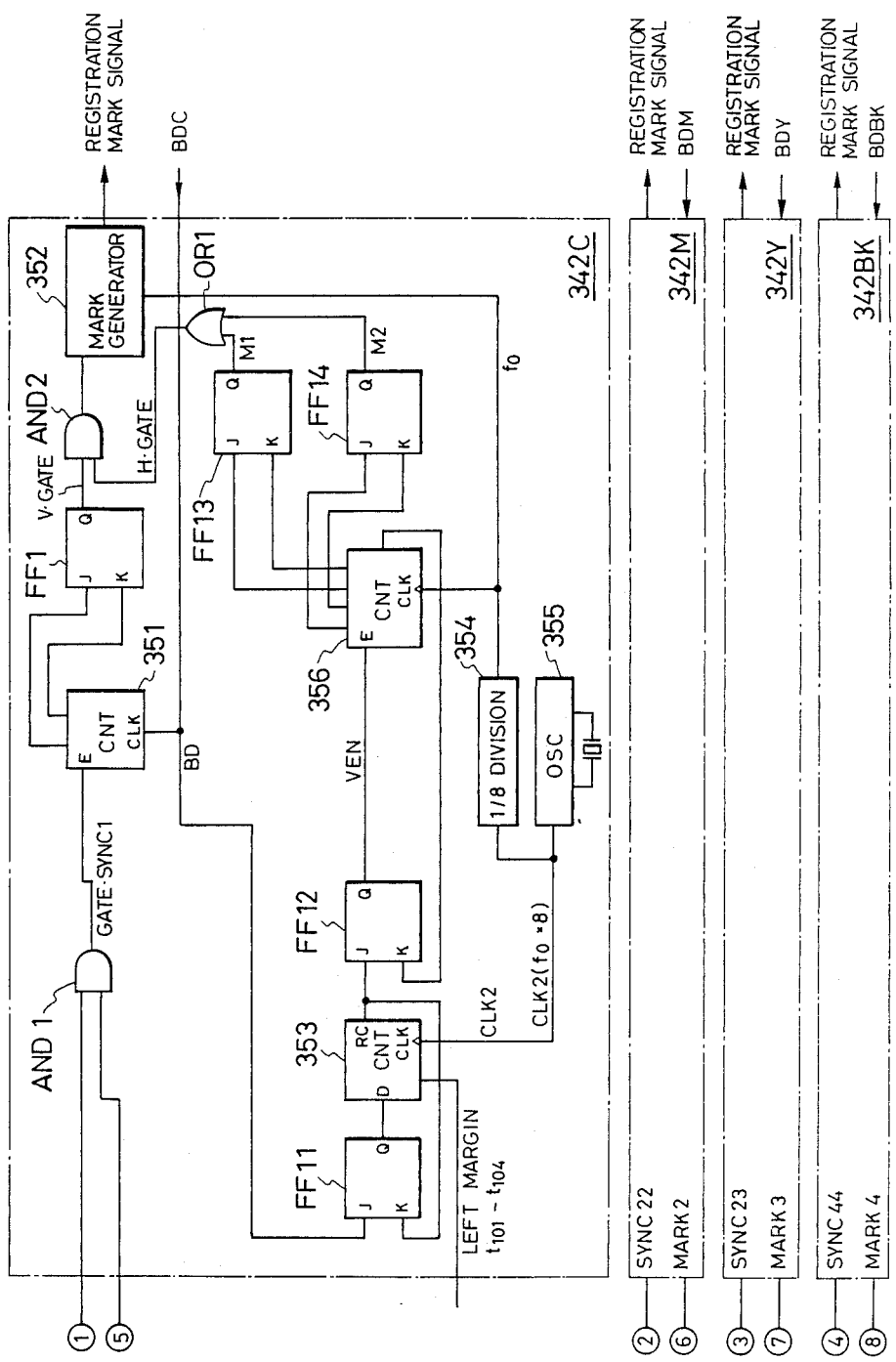

FIGS. 40A and 40B are internal circuit diagrams for explaining constitutions of the sync circuits 342C, 342M, 342Y, and 342BK shown in FIG. 39. In these diagrams, the same parts and components as those shown in FIG. 39 are designated by the same reference numerals.

In FIGS. 40A and 40B, a gate counter 351 is made operative by the AND output of the enable signal $MARK_1$ (which is output from the CPU 322) which is input to an AND gate $AND_1$ and the inverted signal $SYNC_{11}$ of the laser write signal $SYNC_1$, thereby counting the BD signal BDC input to a clock port CK. When the gate counter 351 counts a predetermined number of BD signals BDC input, it outputs a ripple carry to a J input terminal of a flip-flop $FF_1$ at the post stage. A gate signal V.GATE is output from a Q output terminal of the flip-flop $FF_1$ to an AND gate $AND_2$. A mark generator 352 stores pattern mark data to form registration mark images 309C, 309M, 309Y, 309BK, 310C, 310M, 310Y, and 310BK corresponding to each image forming station shown in FIG. 34.

A left margin counter 353 is made operative by a Q output signal from a flip-flop $FF_{11}$, thereby starting the counting of the left margin data on the basis of a reference clock (whose frequency is eight times as high as a video clock $f_0$) $CLK_2$ which is generated from an oscillator 355. After completion of the counting, a flip-flop $FF_{12}$ at the post stage is set by a ripple carry RC.

The reason why the frequency of the reference clock $CLK_2$ is set to be eight times as high as the video clock $f_0$ is to improve the positional accuracy of the left margin.

A Q output of the flip-flop $FF_{12}$ is set to the low level by ripple carry RC of the left margin counter 353. However, a K input is set to the high level, so that a video enable signal VEN is output to an enable terminal E of a one-line counter 356 at the post stage. A frequency divider 354 frequency divides the reference clock $CLK_2$ generated from the oscillator 355 into ⅛ and outputs the resultant video clock $f_0$ to the one-line counter 356. The one-line counter 356 outputs address data $M_1$ and $M_2$ as left margin addresses in the registration mark image drawing area to flip-flips $FF_{13}$ and $FF_{14}$ at the post stage to the AND gate $AND_2$ through an OR gate $OR_1$.

Figure 41:
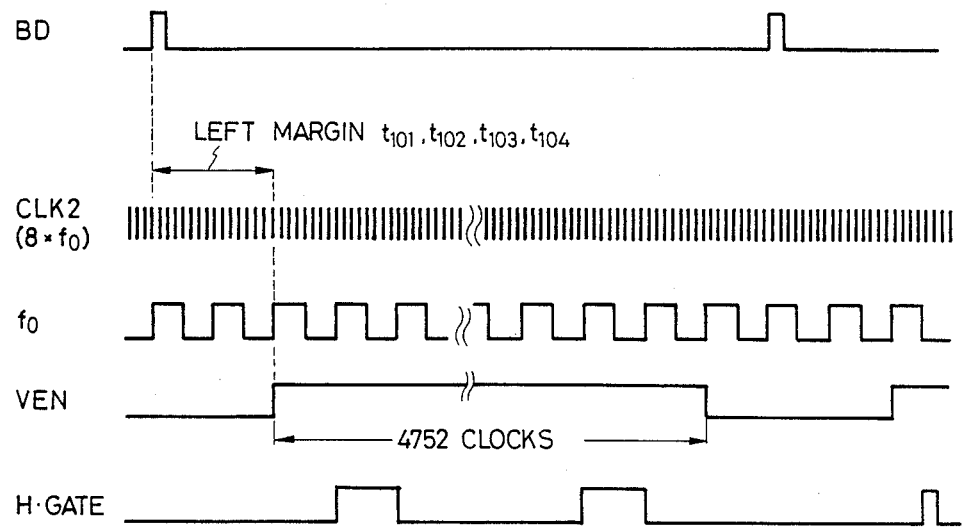
FIG. 41 is a timing chart for explaining the operations in FIGS. 40A and 40B.

FIG. 41 is a timing chart for explaining the operation of FIGS. 40A and 40B. In the diagram, the same elements as those in FIGS. 40A and 40B are designated by the same reference numerals.

FIG. 41 shows the case where the video enable signal (horizontal sync signal) VEN is generated, the ON-time is varied depending on the size of the transfer material which is conveyed by the conveying belt 6, the size of the transfer material is set to the longitudinal size of A4, the number of pixels is set to 4752 (=297×16) pixels assuming that the recording density is set to sixteen pixels/mm.

Figure 42:
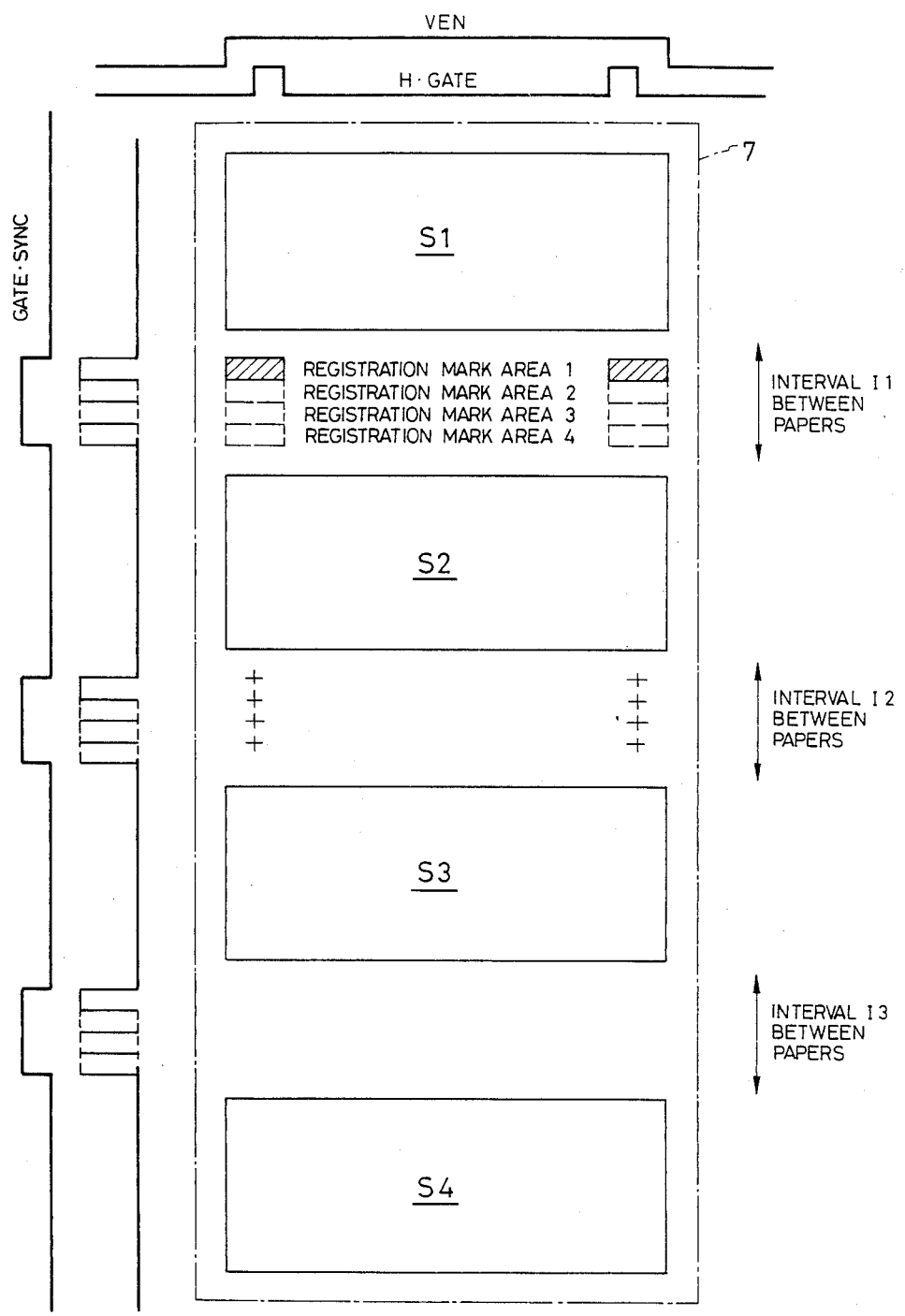
FIG. 42 is a diagrammatical view for explaining mark areas of registration mark images which are transferred to a conveying belt shown in FIG. 34 and their image forming positions.

FIG. 42 is a diagrammatical view for explaining the mark area of the registration mark image which is transferred to the conveying belt 6 shown in FIG. 34 and its image forming position. In FIG. 42, the same elements as those in FIGS. 34 and 41 are designated by the same reference numerals.

The operation to form a registration mark image will now be described.

In FIG. 42, $I_1$ to $I_3$ represent intervals among the transfer papers. These intervals correspond to the intervals among the transfer papers $S_1$ to $S_4$ which are put on the conveying belt 6 and conveyed.

The transfer papers $S_1$ to $S_4$ correspond to the image transfer areas. On the other hand, in the diagram, an explanation has been made with regard to the case where the registration mark images 309C, 309M, 309Y, 309BK, 310C, 310M, 310Y, and 310BK (e.g., the cross-shaped marks) corresponding to each image forming station are successively formed in the transfer paper intervals $I_1$ and $I_2$. However, these marks can be also formed every time or each time a constant image forming process was finished. The timings to form the registration mark images are not limited.

When the registration signal RR is output from the CPU shown in FIG. 40A, the counters CNT 310, 320, 331, 332, 341, and 342 as the top margin counters are made operative, thereby starting the preset peculiar counting processes, that is, the counting operations of the counting times $t_1$ to $t_4$ (which are not always constant) shown in FIG. 34. The period of the reference clocks $CLK_1$ which are input to the counters CNT 310, 320, 331, 332, 341, and 342 is shorter than the period of the BD signals BDC, BDM, BDY, and BDBK, thereby enabling the counting times $t_1$ to $t_4$ to be accurately counted.

For example, when the counter CNT 310 finishes the measurement of the predetermined time $t_1$, the ripple carry RC is input to the J input terminal of the flip-flop 323. The reset signal RS (which is output at the timing which differs depending on the size of transfer paper) is input from the CPU 322 to a K input terminal of the flip-flop 323.

When the ripple carry RC is input to the flip-flop 323, the laser write signal $SYNC_1$ from the Q output terminal is set to the high level, thereby allowing the ordinary image formation to be executed.

When the reset signal RS to set the laser write signal $SYNC_1$ to the low level is input from the CPU 322 to the K input terminal of the flip-flop 323, the inverted signal $SYNC_{11}$ (corresponding to the transfer paper interval $I_1$) is set to the high level. Thus, the AND gate $AND_1$ is set to the high level and the gate counter 351 starts counting the BD signals BDC. When a predetermined number of BD signals BDC are counted, the gate signal V.GATE is output from the Q output terminal of the flip-flop $FF_1$ to one input terminal of the AND gate $AND_2$ at the timing as shown in FIG. 42.

On the other hand, since the BD signal BDC generated from the beam detector 318C is input to the J input terminal of the flip-flop $FF_{11}$, the Q output of the flip-flop $FF_{11}$ is set to the high level every time the BD signal BDC is input. The left margin counter 353 at the post stage is made operative in accordance with the status of the Q output, thereby starting the counting process of left margins $t_{101}$, $t_{102}$, $t_{103}$, and $t_{104}$ shown in, e.g., FIG. 41 on the basis of reference clocks $CLK_2$ generated from the oscillator 355.

When the left margin counter 353 finishes the counting process of the left margins $t_{101}$, $t_{102}$, $t_{103}$, and $t_{104}$, the ripple carry RC is sent to a K input terminal of flip-flop $FF_{11}$, so that this flip-flop is reset and at the same time, a K input terminal of the flip-flop $FF_{12}$ is set. The horizontal sync signal VEN is output from the flip-flop $FF_{12}$ to the one-line counter 356. The one-line counter 356 starts counting the video clocks $f_0$ which are input by the number of clocks as many as the pixels of one line. J input terminals of flip-flops $FF_{13}$ and $FF_{14}$ are set so as to send a gate signal H.GATE to the AND gate $AND_2$ at timings as shown in FIG. 41.

Thus, the gate signal H.GATE is output twice (refer to FIG. 41) in one line to the other input terminal of the AND gate $AND_2$ through the OR gate $OR_1$ from Q output terminals of the flip-flops $FF_{13}$ and $FF_{14}$ Thus, the gate signal V.GATE is output from the AND gate $AND_2$ to the mark generator 352 for the period of time when the gate signal H.GATE is at the high level (twice in one line). In response to the gate signal V.GATE, a registration mark signal corresponding to the cyan image forming station is output from the mark generator 352 to the laser driver 343C. The laser driver 343C drives the semiconductor laser 344C in accordance with the registration mark signal, thereby forming an electrostatic latent image correspondence to the registration mark image onto the photo sensitive drum 1C. By developing this latent image by using the cyan toner by the well-known electrophotographic system, the registration mark images 309C and 310C (hatched portions in the diagram) for cyan are formed between the transfer papers $S_1$ and $S_2$ and on the conveying belt 6 as the conveying device as shown in FIG. 42.

By executing these processes to each image forming station, the registration mark images 309C, 309M, 309Y, 309BK, 310C, 310M, 310Y, and 310BK shown in FIG. 34 can be formed among the transfer papers $S_1$ to $S_4$. The mark detectors 14 and 15 arranged in the downstream of the black station start to read the registration mark images 309C, 309M, 309Y, 309BK, 310C, 310M, 310Y, and 310BK. The detection of the positional deviation amount and its correcting processes, which will be explained hereinlater, are started.

Figure 43:
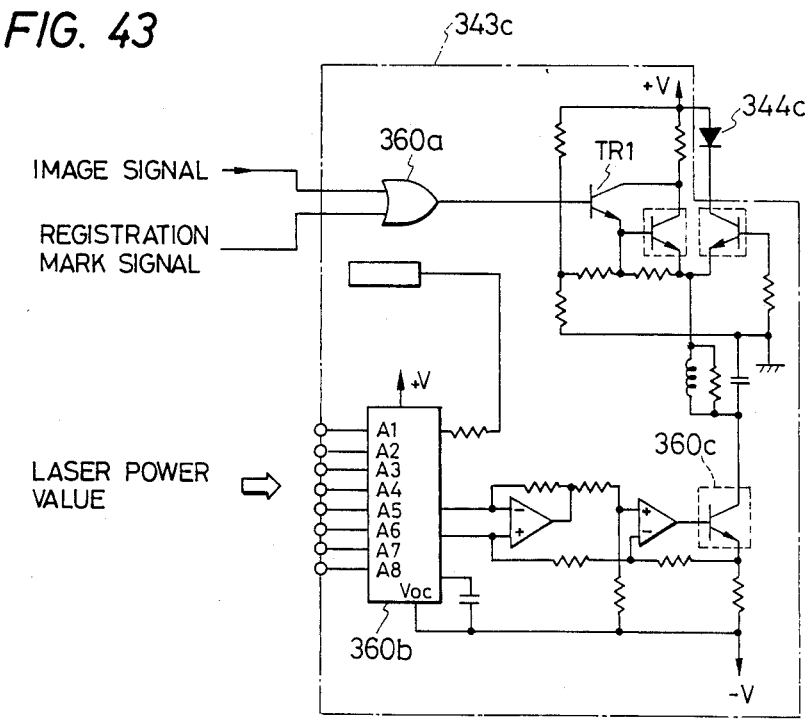
FIG. 43 is a circuit diagram for explaining an example of a laser driver shown in FIG. 39.

FIG. 43 is a circuit diagram for explaining an example of the laser drivers 343C, 343M, 343Y, and 343BK shown in FIG. 39. In this diagram, the same parts and components as those in FIG. 39 are designated by the same reference numerals.

In this diagram, reference numeral 360a denotes an OR gate. The registration mark signal generated from the mark generator 352 shown in FIG. 40 or the image signal stored in, e.g., the image memory 341C is gated by the OR gate 360a, thereby on/off modulating a transistor $TR_1$ to drive the semiconductor laser 344C. Reference numeral 360b denotes an A/D converter of, e.g., eight bits. In accordance with a laser power value which is output from a controller (not shown), a drive current which is applied to the semiconductor laser 344C is controlled to a constant value by a transistor 360c.

The operation to detect the registration marks 309 and 310 will now be described with reference to FIGS. 44 to 49.

FIG. 44 is a block diagram for explaining an example of a registration correction processing circuit.

In FIG. 44, a CPU 361 has an ROM and an RAM and integrally controls the registration mark positional deviation correcting processes and the drive control signal outputting processes necessary for image formation on the basis of control programs stored in the ROM.

A positional deviation detecting unit 362a has the mark detector 15 shown in FIG. 34. The detecting unit 362a optically receives each of the registration mark images (which are transferred at regular intervals so as to be away from each other) in the registration marks 310 transferred to predetermined right end positions with respect to the conveying direction of the conveying belt 6. That is, the detecting unit 362a receives the reflected light of the light irradiated from the right lamp 17 to the conveying belt 6 through a filter 363a. Thus, the detecting unit 362a outputs a positional deviation detection image analog signal to an amplifier 366a.

A low pass filter 367a eliminates the high frequency component included in the right positional deviation detection image analog signal which is output from the amplifier 366a. An A/D converter 368a A/D converts the right positional deviation detection image analog signal which is output from the low pass filter 367a and outputs the right positional deviation detection image data of, e.g., eight bits. A right image data memory unit 369a comprises right image data memories 369Ca, 369Ma, 369Ya, and 369BKa each having a memory capacity of, e.g., 32 kbytes. The memory unit 369a individually stores the right image data corresponding to the right positional deviation detection images (registration mark images) for cyan, magenta, yellow, and black which are transferred at regular intervals onto the conveying belt 6 so as to be away from each other.

A positional deviation detecting unit 362b has the mark detector 14 shown in FIG. 34. The detecting unit 362b optically receives the registration mark images (which are transferred at regular intervals so as to be away from each other) in the registration marks 309 transferred to predetermined left end positions with regard to the conveying direction of the conveying belt 6. That is, the detecting unit 362b receives the reflected light of the light irradiated from the left lamp 16 onto the conveying belt 6 through a filter 363b. Thus, the detecting unit 362b outputs a positional deviation detection image analog signal to an amplifier 366b.

A low pass filter 367b eliminates the high frequency component included in the left positional deviation detection image analog signal which is output from the amplifier 366b. An A/D converter 368b A/D converts the left positional deviation detection image analog signal which is output from the low pass filter 367b and outputs the left positional deviation detection image data of, e.g., eight bits. A left image data memory unit 369b comprises left image data memories 369Cb, 369Mb, 369Yb, and 369BKb each having a memory capacity of, e.g., 32 kbytes. The memory unit 369b individually stores the left image data corresponding to the left positional deviation detection images (registration mark images) for cyan, magenta, yellow, and black which are transferred to the conveying belt 6 at regular intervals so as to be away from each other.

A lamp drive circuit 365a irradiates the right lamp 17 on the basis of a drive signal which is output from the CPU 361. A lamp drive circuit 365b irradiates the left lamp 16 on the basis of a drive signal which is output from the CPU 361.

A timer counter 370 outputs count data to a comparator 371. The comparator 371 outputs a control signal for allowing a memory control circuit 372 to switch memory banks of the right image data memory unit 369a and left image data memory unit 369b at the timing when the count data which is output from the timer counter 370 coincides with the read start control data (which will be explained hereinafter) which is output from the CPU 361.

FIG. 46 is a plan view for explaining the registration difference detecting operation. In the diagram, the same parts and components as those in FIG. 34 are designated by the same reference numerals.

In FIG. 46, reference numerals 375C$b$, 375M$b$, 375Y$b$, and 375BK$b$ denote left registration mark image detection areas and indicate ranges which can be detected by the mark detector 14. A time point when the registration mark image 309BK for black constituting the registration marks 309 is drawn is used as a reference. In the range from the arrangement position of the mark detector 14 to the front edge of the left registration mark image detection area 375C$b$ for cyan in the progressing direction (the sub scanning direction), the distances from the mark detector 14 corresponding to the periods of time $Y_1$ to $Y_4$ at the (constant) conveying velocity of the conveying belt 6 are shown.

In this case, the distances from the arrangement position of the mark detector 14 to the centers of the registration mark images 309C, 309M, 09Y, and 309BK are set to $x_1$ to $x_4$ First, the CPU 361 reads out the registration mark data stored in the mark generator 352 in accordance with the foregoing registration mark forming timings. Then, the CPU 361 makes operative the laser drivers 343C, 343M, 343Y, and 343BK shown in FIG. 39, thereby sequentially forming each pair of registration marks 309 and 310 by the semiconductor lasers 344C, 344M, 344Y, and 344BK in correspondence to the photo sensitive drums 1C, 1M, 1Y, and 1BK, respectively. These registration marks are transferred at regular intervals to the right and left symmetrical positions on the conveying belt 6 among the transfer papers $S_1$ to $S_4$ by using the peculiar color toners. Thus, as shown in FIG. 46, the registration mark images 309C, 309M, 309Y, and 309BK are transferred. The transferred papers are conveyed in the sub scanning direction. In this manner, the preparing steps for the registration difference detecting processes by the mark detectors 14 and 15 are finished.

Therefore, a control signal indicative of the completion of the drawing operation of the registration mark image 309BK is input to the CPU 361. In response to this control signal, the CPU 361 outputs an illumination signal to the lamp drive circuits 365$a$ and 365$b$. The right and left lamps 17 and 16 are lit on, thereby preparing to start the registration difference detecting processes by the mark detectors 14 and 15. Thereafter, the time $Y_1$ is set into the comparator 371 and the timer counter 370 is started. In this state, the mark detectors 14 and 5 start the reading operations of the images and read the registration mark images 309C, 309M, 309Y, 309BK, 310C, 310M, 310Y, and 310BK transferred onto the conveying belt 6. These mark detectors individually output the analog signals corresponding to the images to the amplifiers 366$a$ and 366$b$. Outputs of the amplifiers 366$a$ and 366$b$ are supplied to the low pass filters 367$a$ and 367$b$ at the post stage, by which the high frequency components are eliminated. The analog signals are then A/D converted into the digital signals of, e.g., eight bits by the A/D converters 368$a$ and 368$b$ and stored into image data memories 369C$a$ and 369C$b$.

However, since the image data is meaningless until the elapse of the time $Y_1$, the memory control circuit 372 disenables the writing operation of the image data.

At the timing when the count data which is output from the timer counter 370 coincides with the time $Y_1$ output from the CPU 361, the comparator 371 outputs a write control signal to enable the writing operation to the memory control circuit 372. In response to this control signal, the memory control circuit 372 makes operative the image data memories 369C$a$ and 369C$b$, thereby storing the image data corresponding to the registration mark images 309C and 310C for cyan which are output from the A/D converters 368$a$ and 368$b$ by the amount of, e.g., 32 kbytes.

Next, the CPU 361 sets the period of time $Y_2$ into the comparator 371. When the count data from the timer counter 370 reaches the time $Y_2$, the CPU 361 outputs the write control signal to enable the writing operation to be performed to the memory control circuit 372. In response to this control signal, the memory control circuit 372 enables image data memories 369M$a$ and 369M$b$, thereby storing the image data corresponding to the registration mark images 309M and 310M for magenta which are output from the A/D converters 368$a$ and 368$b$ by the amount of, e.g., 32 kbytes.

In a manner similar to the above, the image data of the registration mark images 309Y, 310Y, 309BK, and 310BK$b$ are sequentially written into image data memories 369Y$a$, 369Y$b$, 369BK$a$, and 369BK$b$ in accordance with the order of yellow and black.

Next, the CPU 361 searches the matched patterns by checking the image data in the image data memories 369C$a$, 369C$b$, 369M$a$, 369M$b$, 369Y$a$, 369Y$b$, 369BK$a$, and 369BK$b$ and the known pattern data stored in the mark generator 352. The CPU 361 detects the registration mark images 309C, 310C, 309M, 310M, 309Y, 310Y, 309BK, and 310BK which were actually transferred onto the conveying belt 6, thereby obtaining each center address $O_1$ shown in FIG. 47. The center may be also set to the center of gravity of the image. It is sufficient that the addresses of special portions of the registration mark images 309C, 310C, 309M, 310M, 309Y, 310Y, 309BK, and 310BK correspond to the center addresses.

From the X and Y addresses of the center address $O_1$ obtained in this manner, a right scanning direction address (address) RYc and a left scanning direction address LYc as components x and y in the scanning direction of the registration mark images 309C, 310C, 309M, 310M, 309Y, 310Y, 309BK, and 310BK are used as a reference position, and the differences (scan positional deviation amounts) among respective addresses RYm, LYm, RYy, LYy, RYbk, LYbk are obtained and stored into the RAM.

The kind of registration difference will now be described with reference to FIG. 45.

Figure 45:
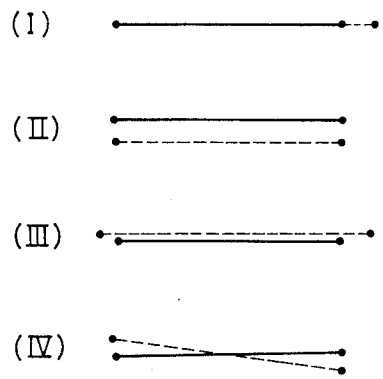
FIG. 45 is a diagrammatical view for explaining the kind of registration difference.

FIG. 45 is a diagrammatical view for explaining the kind of registration difference. (I) shows the case where a registration line (indicated by a broken line) to be corrected is deviated from a reference registration line (shown by a solid line) in the main scanning direction. (II) shows the case where a registration line (broken line) to be corrected is deviated from the reference registration line (solid line) in the sub scanning direction. (III) shows the case where the magnification of a registration line (broken line) to be corrected is changed (i.e., magnified in this example) from the reference registration line (solid line). (IV) shows the case where a registration line (broken line) to be corrected is inclined from the reference registration line (solid line) by a predetermined angle.

When such a registration difference occurs, particularly, for the cases of (I) and (II), by adjusting the image output timings (horizontal and vertical sync timings) for the semiconductor lasers 344C, 344M, 344Y, and 344BK, such registration differences can be corrected. For the case of (III), for example, by controlling the actuator 27 so as to vertically (in the diagram) move the scan mirrors of the scan optical devices 3C, 3M, 3Y, and 3BK shown in FIG. 34, the registration difference can be corrected. In the case of (IV), by controlling the driving of the actuators 28 and 29, the photo sensitive drums 1C, 1M, 1Y, and 1BK are rotated to the horizontal direction, so that the registration difference can be corrected.

Therefore, if the differences among the addresses RYm, LYm, RYy, LYy, RYbk, and LYbk are obtained by using the address Yc as a reference, this means that some of the positional differences shown in (I) to (IV) in FIG. 45 occur. Thus, correcting processes (registration difference correcting processes) which will be explained hereinlater are started.

First, by using the right scanning direction address (address) RYc and left scanning direction address (address) LYc stored in the RAM as reference addresses, the CPU 361 obtains the right relative differences $\Delta(RYc-RYm)$, $\Delta(RYc-RYy)$, and $\Delta(RYc-RYbk)$ and left relative difference $\Delta(LYc-LYm)$, $\Delta(LYc-LYy)$, and $\Delta(LYc-LYbk)$ among the addresses RYm, LYm, RYy, LYy, RYbk, and LYbk and those reference addresses. Then, the CPU 361 compares the right and left relative differences obtained with reference relative differences which have previously been stored, thereby obtaining each registration difference. When the right and left differences are "0" as the result of the calculations, this means that the registration line to be corrected is coincident with the reference registration line.

If any difference is extracted by the calculations, each registration difference shown in FIG. 45 is obtained. Therefore, the image output timing for, e.g., the semiconductor laser 434M for magenta and the step amounts of the actuators 26, 27, and 28 to rotate or vertically move the reflectors are determined in accordance with the difference values. The registration correcting processes are executed in accordance with the step amounts decided.

In a manner similar to the above, the correcting processes for yellow and black are sequentially performed.

Figure 48:
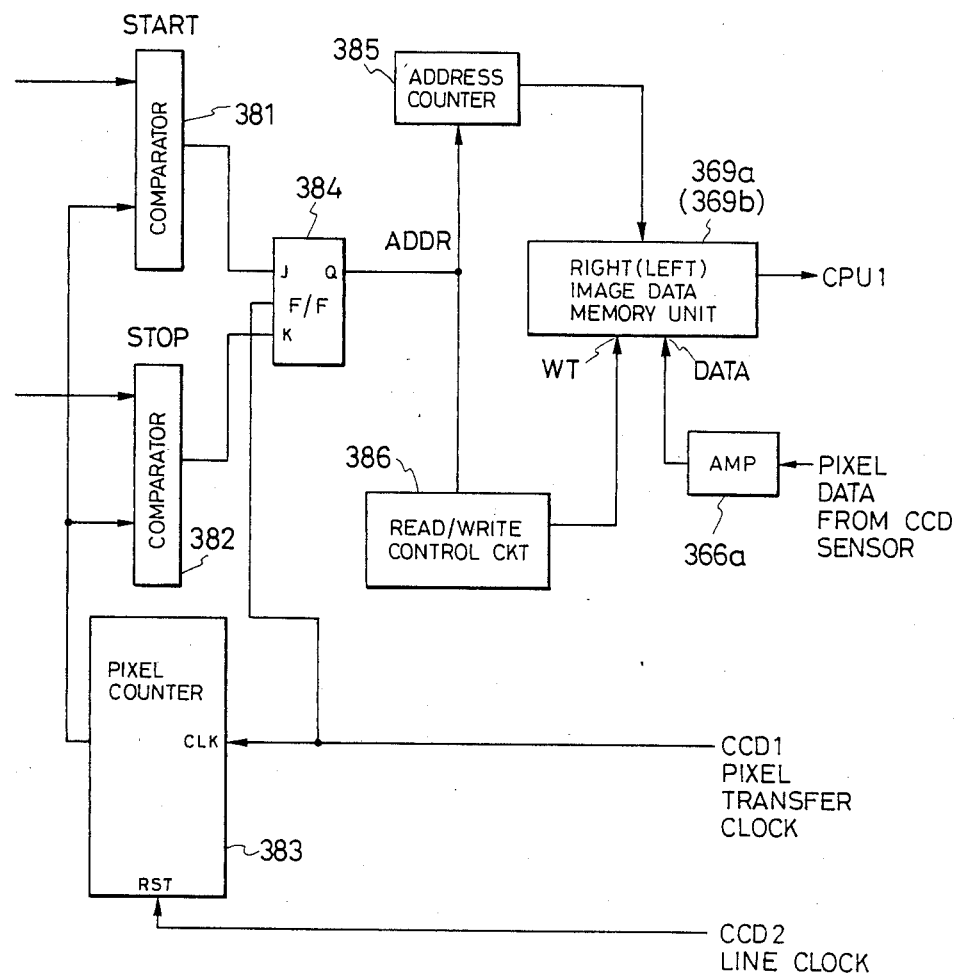
FIG. 48 is a block diagram for explaining a constitution of a memory writing control circuit in right/left image data memory units shown in FIG. 44.

FIG. 48 is a block diagram for explaining a constitution of a memory writing control circuit of the right image data memory unit 369a and left image data memory unit 369b shown in FIG. 44. In FIG. 48, the same parts and components as those in FIG. 44 are designated by the same reference numerals.

In FIG. 48, a comparator 381 inputs a start signal to a J input terminal of a flip-flop (FF) 384 and sets the FF 384. The start signal is used to determine, for example, into which number of pixel in one line of the mark detector 14 the writing operation is enabled on the basis of count data which is output from a pixel counter 383 and a control signal which is output from the CPU 361. A comparator 382 outputs an end signal to a K input terminal of the FF 384. The end signal is used to decide, for example, into which number of pixel in one line of the mark detector 14 the writing operation is finished on the basis of the count data which is output from the pixel counter 383 and the control signal which is output from the CPU 361. The pixel counter 383 sequentially counts up (on a pixel unit basis) pixel transfer clocks $CCD_1$ which are generated from the CPU 361 and is reset by a line clock $CCD_2$. The FF 384 is set by a start signal which is output from the comparator 381 and enables an address counter 385 and a read/write control circuit 386. For example, the read/write control circuit 386 outputs a write enable signal to a WT terminal of the right image data memory 369Ca in the right image data memory unit 369a. The address counter 385 outputs a write address to an address terminal Addr.

For example, to write the image data into the right image data memory 369Ca (having the memory capacity of 32 kbytes) in the right image data memory unit 369a, the CPU 361 sets the read timing to the mark detector 15 (after the elapse of the foregoing period of time $Y_1$). Thus, the transfer of the image data detected by the mark detector 15 is started through the amplifier 366a, low pass filter 367a, and A/D converter 368a.

The circuit shown in FIG. 48 is activated. The pixel counter 383 starts counting the pixel transfer clocks $CCD_1$ and outputs the count data to the comparators 381 and 382. At this time point, no image data is written into the right image data memory 369Ca and the address counter 385 is also held to the initial value.

When the count value of the pixel counter 383 coincides with the value (which can be arbitrarily set) designated in the comparator 381, the FF 384 is set, thereby enabling the address counter 385 and read/write control circuit 386. For example, the read/write control circuit 386 outputs a write enable signal to a WT terminal of the right image data memory 369Ca in the right image data memory unit 369a. The address counter 385 outputs write addresses to an address terminal Addr.

Thus, the right image data memory 369Ca stores the input pixel data on a pixel unit basis in accordance with the addresses which are output from the address counter 385. When an end signal is output from the comparator 382 to the FF 384, the writing operation of the pixel data of one line is finished.

Next, the pixel counter 383 is reset by the line clock $CCD_2$ and restarts the counting operation. After the start signal was output from the comparator 381, the pixel data is written into the right image data memory 369Ca on a pixel unit basis until the end signal is output from the comparator 382 in a manner similar to the above. When the count value of the address counter 385 reaches the value corresponding to memory capacity of 32 kbytes, the completion of the writing operation of the pixel data for, e.g., cyan is sent to the CPU 361. Thus, the writing operation of the pixel data of one color is finished.

Next, the CPU 361 outputs a switching signal to switch the write bank memory of the right image data memory 369Ca to the right image data memory 369Ma and sequentially executes the foregoing image writing operations.

Figure 49:
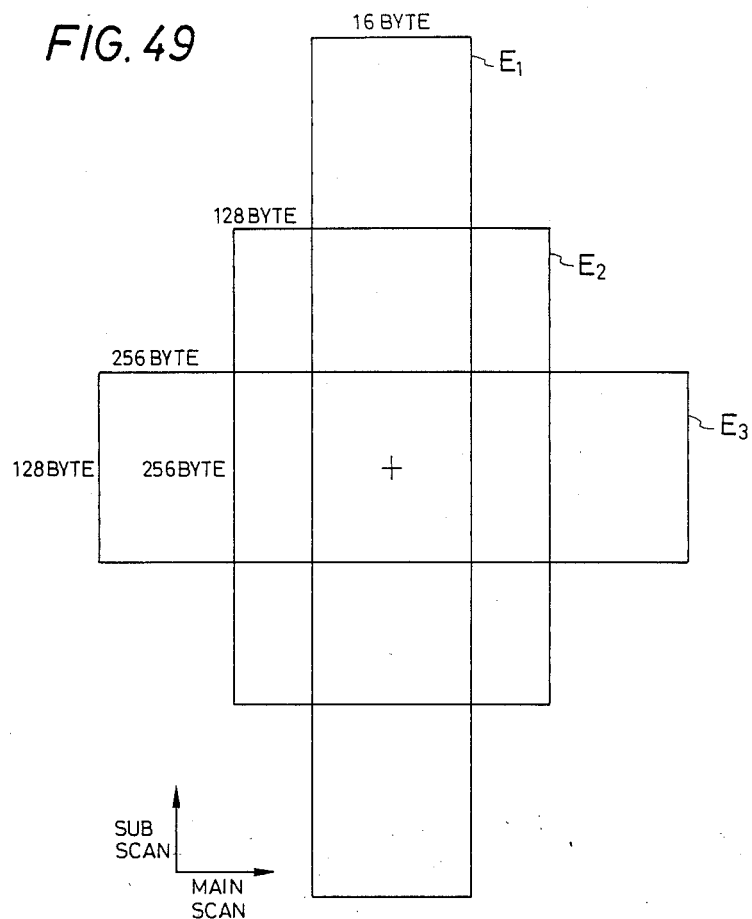
FIG. 49 is a diagrammatical view for explaining a detection area which is detected by a mark detector shown in FIG. 44.

FIG. 49 is a diagrammatical view for explaining the detection areas for detection by the mark detectors 14 and 15 shown in FIG. 44. $E_1$ denotes a detection area. In correspondence to the detection area $E_1$, the image data of total 32 kbytes consisting of 256 bytes in the main scanning direction including the registration marks 309 and 310 and 128 bytes in the sub scanning direction is stored into the right and left image data memories 369Ca, 369Ma, 369Ya, 369BKa, 369Cb, 369Mb, 369Yb, and 369BKb in the right image data memory unit 369a and left image data memory unit 369b shown in FIG. 44, respectively.

$E_2$ indicates a detection area. In correspondence to the detection area $E_2$, the image data of total 32 kbytes consisting of 128 bytes in the main scanning direction including the registration marks 309 and 310 and 256 bytes in the sub scanning direction is stored into the right and left image data memories 369Ca, 369Ma, 369Ya, 369BKa, 369Cb, 369Mb, 369Yb, and 369BKb in the right image data memory unit 369a and left image data memory unit 369b shown in FIG. 44, respectively.

E₃ represents a detection area. In correspondence to the detection area E₃, the image data of total 32 kbytes consisting of 16 bytes in the main scanning direction including the registration marks 309 and 310 and 512 bytes in the sub scanning direction is stored into the right and left image data memories 369Ca, 369Ma, 369Ya, 369BKa, 369Cb, 369Mb, 369Yb, and 369BKb in the right image data memory unit 369a and left image data memory unit 369b shown in FIG. 44, respectively.

Figure 47:
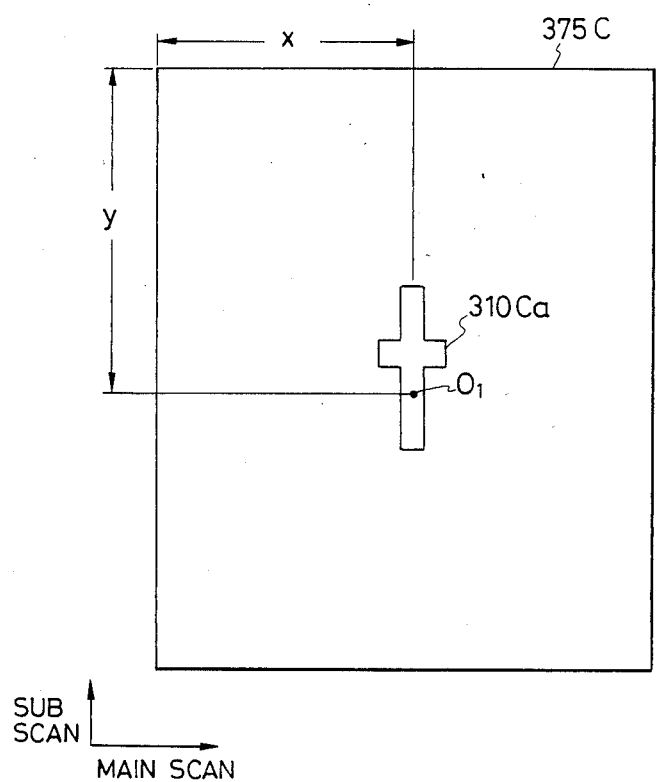
FIG. 47 is a diagrammatical view for explaining the center to registration mark image data.

As will be understood from this diagram, the numbers of pixels in the main scanning direction of the mark detectors 14 and 15 can be arbitrarily set in accordance with values which are set into the comparators 381 and 382 as shown in FIG. 47. By automatically setting the numbers of pixels in the sub scanning direction in accordance with those set values and the memory capacity, the image data in arbitrary detection areas can be stored into the right and left image data memories 369Ca, 369Ma, 369Ya, 369BKa, 369Cb, 369Mb, 369Yb, and 369BKb each having the memory capacity of 32 kbytes. By making the positional deviation detection ranges variable in the main and sub scanning directions, the deterioration of a relatively large registration line can be also corrected by the memory medium having a constant memory capacity. The reliable correction of the registration difference can be performed.

Each image which is stored into the right and left image data memories 369Ca, 369Ma, 369Ya, 369BKa, 369Cb, 369Mb, 369Yb, and 369BKb is set to the size corresponding to about 13 micrometers on the conveying belt 6 per byte. Therefore, the registration difference can be detected at the accuracy of up to 13 micrometers.

Figure 50:
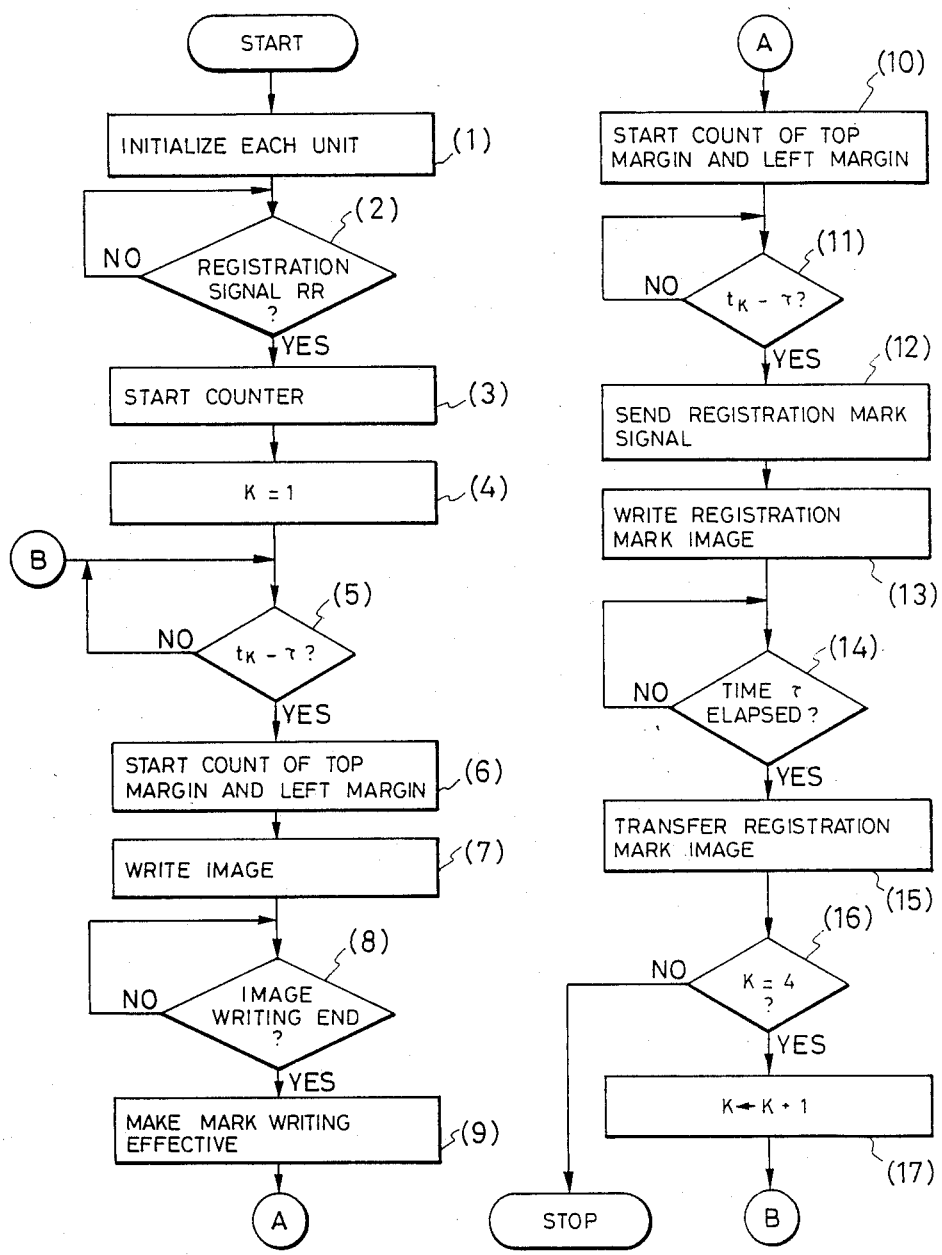
FIG. 50 is a flowchart for explaining an example of a registration mark image forming processing procedure according to the invention.

FIG. 50 is a flowchart for explaining an example of a procedure for the registration mark image forming processes according to the present invention. Reference numerals (1) to (17) denote processing steps.

First, the CPU 322 initializes each section (1). Next, a check is made to see if the registration signal RR regarding the registration rollers 302 has been transmitted or not (2). After the registration signal RR was sent, the counters for top margin and left margin are started (3). Then, a count parameter K is set to 1 (4).

A check is then made to see if the period of time $t_k - \tau$ (initially, $t_1 - \tau$) has been elapsed or not after the registration rollers 302 had been driven (5). After the elapse of this time, the counting operations of the top margin and left margin are started (6). Next, the writing operation of the image based on the image data stored in the image memory is started (7). A check is made to see if the image has completely been written or not (8). After completion of the writing of the image, the ordinary horizontal sync signal $SYNC_K$ to write the image is set to the low level and the mark writing is made effective (9).

Next, the counting operations of the top margin and left margin to make the marks are started (10).

A check is made to see if the time $t_k - \tau$ (initially, $t_1 - \tau$) has been elapsed or not after the registration rollers 302 had been driven (11). After the elapse of this time, the registration mark signal is sent from the mark generator 352 to the laser driver circuit (laser drivers 343C, 343M, 343Y, and 343BK) (12). The registration mark images are written onto the corresponding photosensitive device (13). After the elapse of a predetermined time $\tau$ (14), the developed registration mark images 309C and 310C are transferred between the transfer materials which are successively conveyed by the conveying belt 6 (15).

A check is made to see if the parameter K is "4" or not (16). If YES, the processing routine is finished. If NO, the parameter K is increased by "1" (17) and step (5) follows again. The subsequent registration mark images 309M, 310M, 309Y, 310Y, 309BK, and 310BK for magenta, yellow, and black are sequentially formed between the transfer materials which are conveyed by the conveying belt 6 so as to be away from each other at regular intervals.

The embodiments have been described with respect to the case where the registration marks 309 and 310 are formed in almost parallel with the conveying direction of the conveying belt 6 as the conveying device, the reading width of the mark detectors 14 and 15 is set to coincide with the detection width between the registration marks 309 and 310, and the costs of the sensors are reduced. However, as shown in FIG. 51, the registration marks 309 and 310 can be also formed in the direction which is almost perpendicular to the conveying direction of the conveying belt 6 as the conveying device and between the transfer papers S which are conveyed by the conveying belt 6. With this constitution, the positional deviation of each image forming station can be detected by the same timing by the single reading control. The image positional deviation correcting processes in each image forming station can be finished in a short time.

The embodiments have been described with respect to the case where the registration marks 309 and 310 are transferred among the transfer papers $S_1$ to $S_4$ as cut papers and are read. However, a continuous paper such as a roll paper or an intermediate transfer material can be also used in place of the cut papers.

As described above, according to the embodiments, there is provided the mark transfer means for transferring each registration mark image which is formed on each image holding device between the image transfer areas which are formed on each image holding device and continuously transferred on the conveying device. Therefore, there are excellent advantages such that the registration mark images to detect the positional deviation of each image forming station can be accurately transferred without providing any special transfer area, the positional deviation of each image forming station can be accurately detected, and the like.

On the other hand, as will be best understood from FIGS. 1, 7A, 8A, 17, 25, 34, etc., the position matching marks have been read from the stable belt surface, for instance, near the belt drive rollers as illustrated in the diagram. This is because those marks need to be read at the more stable position on the belt surface. For example, it is now considered the case where the belt surface is deviated in the direction of the optical axis of the system to read the marks for sheet position matching. In this case, the inherent sharp signal becomes the dim signal since the image becomes blurred. Thus, the contrast deteriorates and the image can be hardly discriminated and it is also difficult to discriminate the edge of the signal. Even if they could be discriminated, a problem such that the discrimination accuracy of the position of the center point deteriorates also occurs. However, in the image forming apparatus according to the foregoing embodiments, the sheet position matching marks are read near the belt drive rollers. Therefore, such a deviation of the belt surface in the direction other than the progressing direction of the belt is suppressed. The blur of the image due to the deviation of the belt surface can be prevented as little as possible. Thus, the sheet position matching marks can be accurately read.

What is claimed is:

1. An image forming apparatus comprising:
   (a) conveying means for conveying a transfer material, marks for position matching being formed on said conveying means;
   (b) image forming means for forming an image onto said transfer material which is conveyed by said conveying means, wherein said image forming means includes an optical system for image formation; and
   (c) means for controlling said image forming means in accordance with detection of said marks, wherein said controlling means controls said optical system.

2. An apparatus according to claim 1, wherein said marks are formed on said conveying means by said image forming means.

3. An apparatus according to claim 1, wherein said conveying means includes a belt to convey said transfer material, and said image forming means transfers the marks onto said belt.

4. An apparatus according to claim 1, wherein said marks are formed at positions which do not overlap with the transfer material on said conveying means.

5. An apparatus according to claim 1, wherein said image forming means forms an image onto said transfer material by an electrophotographic process.

6. An apparatus according to claim 1, wherein said control means includes:
   (a) means for detecting the positions of the marks formed on said conveying means; and
   (b) means for controlling the position of the image formed on said transfer material by said image forming means in accordance with the positions of the marks detected by said detecting means.

7. An apparatus according to claim 1, wherein said image forming means includes:
   (a) means for forming different images onto a plurality of image holding devices; and
   (b) means for forming the images on said plurality of image holding devices onto said transfer material which is conveyed by said conveying means,
   and wherein said marks are marks to control the image forming positions on said image holding devices.

8. An image forming apparatus comprising:
   (a) image forming means for forming different images onto a plurality of image holding devices;
   (b) transfer means for transferring the images on said plurality of image holding devices onto a same transfer material;
   (c) control means for controlling the image forming means so as to form a mark to match the positions of said images onto the plurality of image holding devices; and
   (d) detecting means for detecting the recording position of said mark and correcting means for correcting a plurality of positional deviation elements among said images on the basis of a detection output of said detecting means.

9. An apparatus according to claim 8, wherein said transfer means includes conveying means for moving said transfer material among said plurality of image holding devices.

10. An apparatus according to claim 8, wherein said detecting means detects the mark transferred onto a conveying belt constituting said conveying means.

11. An apparatus according to claim 9, wherein said detecting means detects a positional deviation in a moving direction by said conveying means as one of said plurality of positional deviation elements.

12. An apparatus according to claim 9, wherein said detecting means detects a positional deviation in the direction almost perpendicular to the moving direction by said conveying means as one of said plurality of positional deviation elements.

13. An apparatus according to claim 10, wherein said detecting means detects an inclination of said mark as one of said plurality of positional deviation elements.

14. An apparatus according to claim 10, wherein said detecting means detects a size of said mark as one of said plurality of positional deviation elements.

15. An apparatus according to claim 14, wherein a plurality of said marks are formed and said detecting means detects an interval between said plurality of marks.

16. An apparatus according to claim 10, wherein said mark is formed by said image forming means to a position so as to be transferred onto said belt on $ said image holding devices without being transferred onto said transfer materials.

17. An apparatus according to claim 8, wherein said image holding device has a drum shape.

18. An image forming apparatus comprising:
   (a) image writing means for writing registration marks at regular intervals while an image is being written onto an image holding device;
   (b) transfer means which moves so as to transfer the image and said registration marks on said image holding device at transfer positions;
   (c) detecting means for detecting the positions of said registration marks on said transfer means during the formation of the image; and
   (d) correcting means for correcting the position of the image on the image holding device during the image formation on the basis of a detection signal from said detecting means.

19. An apparatus according to claim 18, wherein the two or more writing means and the two or more image holding devices are arranged in parallel, respectively.

20. An apparatus according to claim 18, wherein said image writing means is used to write the image onto said image holding device.

21. An apparatus according to claim 20, wherein said correcting means corrects the position of the image on said image holding device by correcting the writing position of said writing means.

22. An apparatus according to claim 18, wherein said transfer means includes conveying means for moving the transfer material onto which the image on said image holding device is transferred, and said conveying means includes a conveying belt to move the transfer material.

23. An apparatus according to claim 22, wherein said mark is formed at a plurality of positions on said belt.

24. An apparatus according to claim 22, wherein said mark is formed by said image writing means to a position so as to be transferred onto said belt on said image holding device without being transferred onto said transfer material.

25. An apparatus according to claim 18, wherein said correcting means corrects the position of the image on said image holding device on the basis of an image forming timing in the moving direction of said transfer means.

26. An apparatus according to claim 18, wherein said correcting means corrects the position of the image on said image holding device on the basis of an image forming timing in the direction almost perpendicular to the moving direction of said transfer means.

27. An apparatus according to claim 18, wherein said correcting means corrects the position of the image on said image holding device on the basis of the direction perpendicular to the moving direction of said transfer means.

28. An image forming apparatus comprising:
(a) image forming means for forming different images onto a plurality of image holding devices;
(b) means for moving among said image holding devices a transfer material onto which the images formed on the image holding devices are transferred, a mark for position matching being formed on said moving means;
(c) means for generating a predetermined reference signal in association with an image forming sequence of said image forming means, said generating means including means for detecting the position of said transfer material which is moved by said moving means, said detecting means generating said reference signal when the transfer material is moved to a predetermined position; and
(d) means for controlling said image forming means on the basis of the result of the detection of said mark and said reference signal.

29. An apparatus according to claim 28, wherein said mark is formed onto said moving means by said image forming means.

30. An apparatus according to claim 28, wherein said moving means includes a belt to move said transfer material and said image forming means transfers said mark onto said belt.

31. An apparatus according to claim 28, wherein said reference signal is a timing signal to start the movement of said transfer material by said moving means.

32. An apparatus according to claim 28, wherein said control means includes:
(a) means for detecting said mark; and
(b) means for controlling said image forming means on the basis of the detection timing of said mark by said detecting means and a timing of said reference signal.

33. An apparatus according to claim 32, wherein said control means controls an image forming timing of said image forming means.

34. An apparatus according to claim 28, wherein said image forming means starts the writing operations of the images onto said image holding devices in response to an image writing start signal and said generating means generates said reference signal at a timing relative to said writing start signal.

35. An apparatus according to claim 28, wherein said image forming means forms an image onto said transfer material by an electrophotographic process.

36. An apparatus according to claim 28, wherein said image holding device has a drum shape.

37. An image forming apparatus comprising:
(a) a plurality of image forming stations which are constituted around image holding devices so as to have image forming means;
(b) detecting means, formed by each of the image holding devices of each of the image forming stations, for detecting registration mark images corresponding to each of the image holding devices which are sequentially transferred to a conveying material or a transfer material which are conveyed adjacently to each of the image holding devices; and
(c) correcting means for correcting a positional deviation of each of the image forming stations in accordance with a relative difference between an output timing of a predetermined reference signal which is generated every time in association with an image sequence of each of the image forming stations and a detection timing of each of the registration mark images which are sequentially detected by said detecting means.

38. An apparatus according to claim 37, further comprising means for generating said reference signal, and wherein said detecting means generates the reference signal when said transfer material is moved to a predetermined position.

39. An image forming apparatus comprising:
(a) an image forming station which is constituted around each image holding device so as to have image forming means;
(b) detecting means for detecting each of registration mark images which are formed by said image forming station and transferred to a conveying device; and
(c) mark transfer means for transferring each of the registration mark images which are formed on each of the image holding devices between image transfer areas which are formed on the image holding devices and continuously transferred onto said conveying device.

40. An apparatus according to claim 39, wherein said mark transfer means directly transfers each of the registration mark images onto the conveying device.

41. An apparatus according to claim 39, wherein said mark transfer means transfers each of the registration mark images onto a transfer material which is conveyed by said conveying device.

42. An image forming apparatus comprising:
a plurality of image forming means including a plurality of optical means for forming different images on a plurality of image holding members;
transfer means for transferring the images on said plurality of image holding means to the same transfer material;
detecting means for detecting a quantity corresponding to positional deviations of said images formed by said plurality of image forming means; and
control means for controlling said optical means of said plurality of image forming means on the basis of the detection of said means.

43. An apparatus according to claim 42, wherein said transfer means includes conveying means for moving said transfer material among said plurality of image holding members.

44. An apparatus according to claim 43, wherein detecting means detects a pattern for positional determination transferred onto a conveying belt constituting said conveying means.

45. An apparatus according to claim 42, wherein said optical means includes a mirror for reflecting onto said image holding member an optical image for formation of said image, and said control means controls a position of said mirror on the basis of the detection of said detecting means.

46. An apparatus according to claim 42, wherein said detecting means detects a positional deviation in a moving direction by said conveying means.

47. An apparatus according to claim 42, wherein said detecting means detects a positional deviation in the direction almost perpendicular to the moving direction by said conveying means.

48. An apparatus according to claim 44, wherein said detecting means detects an inclination of said pattern.

49. An apparatus according to claim 44, wherein said detecting means detects a size of said pattern.

50. An apparatus according to claim 49, wherein a plurality of said patterns are formed and said detecting means detects an interval between a plurality of said patterns.

51. An apparatus according to claim 49, wherein said pattern is formed by said image forming means to a position so as to be transferred onto said belt on said image holding members without being transferred onto said transfer materials.

52. An apparatus according to claim 42, wherein said image holding member has a drum shape.

53. An image forming apparatus comprising:

an optical system for guiding onto a photosensitive member a bundle of light for formation of image;
  detecting means for detecting a positional deviation of an image formed on said photosensitive member; and
  control means for controlling said optical system on the basis of the detection of said detecting means.

54. An apparatus according to claim 53, wherein said photosensitive member includes a drum.

55. An apparatus according to claim 53, wherein said bundle of light includes a laser beam which scans said photosensitive material.

56. An apparatus according to claim 53, further comprising developing means for visually developing an image formed on said photosensitive material.

57. An apparatus according to claim 53, wherein said detecting means detects a positional deviation of an image developed by said developing means.

58. An apparatus according to claim 53, wherein said optical system includes a mirror reflecting said bundle of light.

59. An apparatus according to claim 53, wherein said control means includes an actuator for controlling a position of said mirror.

* * * * *

UNITED STATES PATENT AND TRADEMARK OFFICE
CERTIFICATE OF CORRECTION

PATENT NO. : 4,903,067
DATED : February 20, 1990
INVENTOR(S) : YASUSHI MURAYAMA ET AL.

It is certified that error appears in the above-identified patent and that said Letters Patent is hereby corrected as shown below:

COLUMN 4

Line 4, "respective" should read --perspective--.
Line 5, "rangement&" should read --rangement--.

COLUMN 8

Line 36, "a /\" should read --a /\ shape--.

COLUMN 10

Line 34, "and $t_2$," should read --and $\Delta t_2$,--.

COLUMN 11

Line 5, "which" (second occurrence) should be deleted.

COLUMN 12

Line 9, "axis (" should read --axis $\ell$--.

COLUMN 19

Line 66, "materials" should read --numerals--.

COLUMN 22

Line 34, "detection" should read --detection periods of time $t_c$, $t_m$, $t_y$, and $t_{bk}$ of each image--.
Line 36, "periods of time $t_c$, $t_m$, $t_y$, and $t_{bk}$ of each image" should be deleted.

UNITED STATES PATENT AND TRADEMARK OFFICE
CERTIFICATE OF CORRECTION

PATENT NO. : 4,903,067
DATED : February 20, 1990
INVENTOR(S) : YASUSHI MURAYAMA ET AL.   Page 2 of 2

It is certified that error appears in the above-identified patent and that said Letters Patent is hereby corrected as shown below:

COLUMN 23

Line 32, "transfer papers Sto $S_4$" should read --transfer papers $S_1$ to $S_4$--.
 Line 59, "not" should read --now--.

COLUMN 26

Line 67, "transfer paper S" should read --transfer paper $S_1$--.

COLUMN 31

Line 20, "09Y," should read --309Y,--.
 Line 51, "and 5" should read --and 15--.

COLUMN 38

Line 25, "$" should be deleted.

Signed and Sealed this

Twenty-fifth Day of February, 1992

Attest:

HARRY F. MANBECK, JR.

*Attesting Officer*   *Commissioner of Patents and Trademarks*